United States Patent
Shah et al.

(10) Patent No.: US 9,652,320 B2
(45) Date of Patent: *May 16, 2017

(54) DEVICE VALIDATION, DISTRESS INDICATION, AND REMEDIATION

(71) Applicant: InterDigital Patent Holdings, Inc., Wilmington, DE (US)

(72) Inventors: Yogendra C. Shah, Exton, PA (US); Lawrence Case, Austin, TX (US); Dolores F. Howry, Malvern, PA (US); Inhyok Cha, Gangnam-Ku (KR); Andreas Leicher, Frankfurt (DE); Andreas Schmidt, Frankfurt am Main (DE)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,301

(22) Filed: Dec. 15, 2014

(65) Prior Publication Data

US 2015/0099510 A1 Apr. 9, 2015

Related U.S. Application Data

(63) Continuation of application No. 13/289,154, filed on Nov. 4, 2011, now Pat. No. 8,914,674.

(Continued)

(51) Int. Cl.
*G06F 11/00* (2006.01)
*G06F 11/08* (2006.01)
(Continued)

(52) U.S. Cl.
CPC .......... *G06F 11/08* (2013.01); *G06F 11/0709* (2013.01); *G06F 21/10* (2013.01);
(Continued)

(58) Field of Classification Search
CPC .. G06F 11/08; G06F 11/1012; G06F 11/0709; G06F 11/181; G06F 11/3006;
(Continued)

(56) References Cited

U.S. PATENT DOCUMENTS 6,731,932 B1 5/2004 Rune et al.
6,779,120 B1 8/2004 Valente
(Continued)

FOREIGN PATENT DOCUMENTS

CN 1933651 3/2007
CN 101043338 9/2007
(Continued)

OTHER PUBLICATIONS

U.S. Appl. No. 14/699,509, filed Apr. 29, 2015, Schmidt et al.
(Continued)

*Primary Examiner* — Joseph D Manoskey
(74) *Attorney, Agent, or Firm* — Baker & Hostetler LLP

(57) ABSTRACT

A wireless communications device may be configured to perform integrity checking and interrogation with a network entity to isolate a portion of a failed component on the wireless network device for remediation. Once an integrity failure is determined on a component of the device, the device may identify a functionality associated with the component and indicate the failed functionality to the network entity. Both the wireless network device and the network entity may identify the failed functionality and/or failed component using a component-to-functionality map. After receiving an indication of an integrity failure at the device, the network entity may determine that one or more additional iterations of integrity checking may be performed at the device to narrow the scope of the integrity failure on the failed component. Once the integrity failure is isolated, (Continued)

the network entity may remediate a portion of the failed component on the wireless communications device.

34 Claims, 27 Drawing Sheets

Related U.S. Application Data

(60) Provisional application No. 61/410,781, filed on Nov. 5, 2010.

(51) Int. Cl.
| | |
|---|---|
| *G06F 11/07* | (2006.01) |
| *G06F 21/10* | (2013.01) |
| *G06F 21/57* | (2013.01) |
| *H04W 12/10* | (2009.01) |
| *H04M 1/24* | (2006.01) |
| *H04W 8/22* | (2009.01) |
| *H04W 24/02* | (2009.01) |
| *H04L 29/06* | (2006.01) |

(52) U.S. Cl.
CPC .......... *G06F 21/575* (2013.01); *H04L 63/123* (2013.01); *H04M 1/24* (2013.01); *H04W 8/22* (2013.01); *H04W 12/10* (2013.01); *H04W 24/02* (2013.01); *G06F 2221/2103* (2013.01); *G06F 2221/2111* (2013.01)

(58) Field of Classification Search
CPC .............. G06F 21/10; G06F 21/575; G06F 2221/2103; G06F 2221/2111; H04M 1/24; H04W 8/22; H04W 12/10; H04W 24/02; H04L 62/123
USPC .......... 714/27, 4.1, 4.3, 4.4, 25, 33, 36, 38.1, 714/47.1
See application file for complete search history.

(56) References Cited

U.S. PATENT DOCUMENTS

| | | | |
|---|---|---|---|
| 6,980,830 B2 | 12/2005 | Ahonen | |
| 7,017,155 B2 | 3/2006 | Peev et al. | |
| 7,027,808 B2 | 4/2006 | Wesby | |
| 7,096,014 B2 | 8/2006 | Haverinen et al. | |
| 7,580,701 B2 | 8/2009 | Ross | |
| 7,610,619 B2 | 10/2009 | Kastelewicz et al. | |
| 7,634,807 B2 | 12/2009 | Yan et al. | |
| 7,653,819 B2 | 1/2010 | Bade et al. | |
| 7,711,960 B2 | 5/2010 | Scarlata | |
| 7,725,703 B2 | 5/2010 | Hunter et al. | |
| 7,747,862 B2 | 6/2010 | Ovadia | |
| 7,752,465 B2 | 7/2010 | Ebringer et al. | |
| 7,809,777 B2 | 10/2010 | Dodge | |
| 7,853,804 B2 | 12/2010 | Cromer et al. | |
| 7,907,531 B2 | 3/2011 | Jha et al. | |
| 7,908,483 B2 | 3/2011 | Iliev et al. | |
| 7,930,733 B1 | 4/2011 | Iftode et al. | |
| 8,064,597 B2 | 11/2011 | Gehrmann | |
| 8,108,668 B2 | 1/2012 | Rozas | |
| 8,266,676 B2 | 9/2012 | Hardjono et al. | |
| 8,300,829 B2 | 10/2012 | Ekberg et al. | |
| 8,914,674 B2 | 12/2014 | Shah et al. | |
| 9,253,643 B2 | 2/2016 | Pattar et al. | |
| 2003/0119481 A1 | 6/2003 | Haverinen et al. | |
| 2004/0023689 A1 | 2/2004 | Ahonen | |
| 2004/0153667 A1 | 8/2004 | Kastelewicz et al. | |
| 2005/0033987 A1 | 2/2005 | Van et al. | |
| 2005/0132358 A1 | 6/2005 | Peev et al. | |
| 2005/0223007 A1 | 10/2005 | Zimmer | |
| 2006/0074600 A1 | 4/2006 | Sastry et al. | |
| 2006/0137022 A1 | 6/2006 | Kilian-Kehr et al. | |
| 2007/0050678 A1 | 3/2007 | Estes et al. | |
| 2007/0075216 A1 | 4/2007 | Tohma | |
| 2007/0113120 A1 | 5/2007 | Dodge | |
| 2007/0143629 A1 | 6/2007 | Hardjono | |
| 2007/0150524 A1 | 6/2007 | Eker et al. | |
| 2007/0157022 A1 | 7/2007 | Blom et al. | |
| 2007/0239748 A1 | 10/2007 | Smith | |
| 2007/0242638 A1* | 10/2007 | Arkko ................ H04L 63/0823 370/331 |
| 2008/0046786 A1 | 2/2008 | Patel et al. | |
| 2008/0076419 A1 | 3/2008 | Khetawat et al. | |
| 2008/0076425 A1 | 3/2008 | Khetawat et al. | |
| 2008/0101400 A1* | 5/2008 | Auterinen ............... H04L 12/66 370/463 |
| 2008/0155673 A1 | 6/2008 | Jung et al. | |
| 2008/0233963 A1 | 9/2008 | Alanara et al. | |
| 2008/0301784 A1 | 12/2008 | Zhu et al. | |
| 2009/0013210 A1 | 1/2009 | Mcintosh et al. | |
| 2011/0010543 A1 | 1/2011 | Schmidt et al. | |
| 2011/0041003 A1 | 2/2011 | Pattar et al. | |
| 2011/0044454 A1 | 2/2011 | Baek et al. | |
| 2011/0265158 A1 | 10/2011 | Cha et al. | |
| 2011/0302638 A1* | 12/2011 | Cha ........................ G06F 21/57 726/6 |
| 2015/0237502 A1 | 8/2015 | Schmidt et al. | |
| 2016/0044440 A1 | 2/2016 | Cha et al. | |

FOREIGN PATENT DOCUMENTS

| | | |
|---|---|---|
| EP | 1 533 695 | 5/2005 |
| EP | 2 076 071 | 7/2009 |
| JP | 2003-208316 | 7/2003 |
| JP | 2003-208404 | 7/2003 |
| JP | 2005-521928 | 7/2005 |
| JP | 2005-536934 | 12/2005 |
| JP | 2006-513609 | 4/2006 |
| JP | 2006-287339 | 10/2006 |
| JP | 2007-072909 | 3/2007 |
| JP | 2007/515708 | 6/2007 |
| JP | 2007-215235 | 8/2007 |
| JP | 2007-522695 | 8/2007 |
| JP | 2011-509575 | 3/2011 |
| JP | 2012/520024 | 8/2012 |
| KR | 10-2005-0051223 | 6/2005 |
| KR | 10-2006-0118464 A | 11/2006 |
| KR | 10-2009-0000065 | 1/2009 |
| KR | 10-2009-0091184 A | 8/2009 |
| WO | WO 02/056133 | 7/2002 |
| WO | WO 03-069922 | 8/2003 |
| WO | WO 2004-019582 | 3/2004 |
| WO | WO 2004-062248 | 7/2004 |
| WO | WO 2005/050441 | 6/2005 |
| WO | WO 2007-039757 | 4/2007 |
| WO | WO 2007-110094 | 10/2007 |
| WO | WO 2008-001322 | 1/2008 |
| WO | WO 2008-082587 | 7/2008 |
| WO | WO 2008-125657 | 10/2008 |
| WO | WO 2009-092115 | 7/2009 |
| WO | WO 2010/102222 | 9/2010 |
| WO | WO 2010/102259 | 9/2010 |
| WO | WO 2010-102259 | 9/2010 |

OTHER PUBLICATIONS

3rd Generation Partnership Project, 3GPP TR33.820 v8.3.0 Technical Specification Group Service and Systems Aspects; Security of H(e)NB; (Release 8), Dec. 2009.

3rd Generation Partnership Project, 3GPP TR 33.820 v1.3.0 , Technical Specification Group Service and Systems Aspects; Security of H(e)NB; (Release 8), Jan. 2009.

3rd Generation Partnership Project, (3 GPP)TS 33.310 V9.1.0, "Technical Specification Group Service and System Aspects; Network Domain Security (NOS); Authentication Framework (AF)" (Release 9), Dec. 2009.

3rd Generation Partnership Project, (3GPP)TS.33.310 V8.2.1 , "Technical Specification Group Service and System Aspects; Network Domain Security (NOS); Authentication Framework (AF)" (Release 9), Mar. 2008.

(56) References Cited

OTHER PUBLICATIONS

3rd Generation Partnership Project, (3GPP) TS 33.234 V8.1.0, "Technical Specification Group Service and System Aspects; 3G Security; Wireless Local Area Network (WLAN) Interworking Security" (Release 8), Mar. 2008.
3rd Generation Partnership Project, (3GPPP) TS 33.234 V9.0.0, "Technical Specification Group Service and System Aspects; 3G Security; Wireless Local Area Network (WLAN) Interworking Security", (Release 9), Sep. 2009.
3rd Generation Partnership Project, (3GPP) TR 33.812 V9.0.0, "Technical Specification Group Services and System Aspects; Feasibility Study on the Security Aspects of Remote Provisioning and Change of Subscription for M2M Equipment"; (Release 9), Dec. 2009.
3rd Generation Partnership Project, (3GPP) TR 33.812 V9.0.0, "Technical Specification Group Services and System Aspects; Feasibility Study on the Security Aspects of Remote Provisioning and Change of Subscription for M2M Equipment"; (Release 8), Sep. 2008.
3rd Generation Partnership Project, (3GPP) TS 32.583 V9.2.0, "Technical Specification Group Services and System Aspects; Telecommunication management; Home Node B (HNB) Operations, Administration, Maintenance and Provisioning (OAM&P); Procedure flows for Type 1 interface HNB to HNB Management System (HMS)", (Release 9), Dec. 2009.
3rd Generation Partnership Project (3GPP), S3-090159, "pCR for Text on Device Validation in the Conclusion Section", Nokia Siemens Network, 3GPP TSG SA WG3 Security, SA#54, Firenze, Italy, Jan. 19-23, 2009, 3 pages.
3rd Generation Partnership Project (3GPP), TR 33.812, V0.0.2, "3rd Generation Partnership Project; Technical Specification Group Services and System Aspects; Feasibility Study on Remote Management of USIM Application on M2M Equipment"; (Release 8), Oct. 12, 2007, 14 pages.
3rd Generation Partnership Project (3GPP), TR 33.812, V1.2.0, "3rd Generation Partnerhsip Project; Technical Specification Group Services and System Aspects; Feasibility Study on Remote Management of USIM Application on M2M Equipment"; (Release 8), Nov. 1, 2008, 61 pages.
3rd Generation Partnership Project (3GPP), TR 33.820 V1.3.0, 3rd Generation Partnership Project; Technical Specification Group Service and System Aspects; Security of H(e)NB; (Release 8), Jan. 2009, 75 pages.
3rd Generation Partnership Project (3GPP), TR 33.820, V1.2.0, "3rd Generation Partnership Project; Technical Specification Group Service and Systems Aspects; Security of H(e)NB"; (Release 8), Dec. 2008, 67 pages.
3rd Generation Partnership Project, "System Architecture of HNB (Release 8)", 3GPP TSG RAN WG3 Meeting, Sophia Antipolis, France, Jun. 11-12, 2008, 1 page.
3rd Generation Partnership Project: Technical Specification Group Service and System Aspects; Security of H(e)NB; (Release 8), 3GPP TR 33.820 V2.0.0, SP-090130.zip,URL, http://www.3gpm2.org/ftg/tsg sa/TSG SA/TSGS 43/docs/, Mar. 4, 2009.
Gallery and Mitchell, "Trusted Mobile Platforms", Foundations of Security Analysis and Design, IV; Lecture Notes in Computer Science, Springer Berlin Heidelberg, Berlin, Heidelberr, Aug. 18, 2007, pp. 282-323.
International Patent Application No. PCT/US2010/026384: International Search Report, dated Sep. 2, 2010, 15 pages.
International Patent Application No. PCT/US2010/026436: International Search Report, dated Sep. 2, 2010, 18 pages.
Kaufman, "Internet Key Exchange (IKEv2) Protocol," Network Working Group, RFC-4306 Dec. 2005.
Pearson, et al. (Trusted Computing Platforms: TCPA Technology in Context by: Siani, Pub. Date: Jul. 22, 2002), Chapter 6, pp. 106-107.
Pearson, et al. Trusted Computing Platforms: TCPA Technology in Context by: Siani, Pub. Date: Jul. 22, 2002, p. 39.
Pearson, et al. Trusted Computing Platforms: TCPA Technology in Context by: Siani, Pub. Date: Jul. 22, 2002, Chapter 6, pp. 106-109.
Sailer et al, "Design and Implementation of a TCG-Based Integrity Measurement Architecture," Proceedings of the 13th USENIX Security Symposium, 2004.
Schmidt et al ., "Trust for Location-Based Authorization," IEEE Communication Society, 2008.
TCG, "TCG Specification Architecture Overview", Specification, Revision 1.4, Aug. 2, 2007, 54 pages.
Trusted Computing Group, "TCG Mobile Reference Architecture," Specification version 1.0, Revision 1, Jun. 2007, 87 pages.
Trusted Computing Platforms: TCPA Technology in Context, Siani Pearson, et al., Jun. 22, 2002, Prentice Hall; pp. 40,50,52,57,59,60,111'143;144;153;184;209.
Trusted Computing Group et al, "TCG Specification Architecture Overview Passage", TCG Specification Architecture Overview, Trusted Computing Group, US, No. revision 1.2, Apr. 28, 2004.
U.S. Appl. No. 12/718,480: Final office action dated May 22, 2013, 15 pages.
U.S. Appl. No. 12/718,480: Final office action dated Sep. 27, 2012, 16 pages.
U.S. Appl. No. 12/718,480: Non-final office action dated Mar. 4, 2013, 17 pages.
U.S. Appl. No. 12/718,572: Final office action dated Dec. 19, 2012, 15 pages.
U.S. Appl. No. 12/718,572: Non-final office action dated Jun. 21, 2012, 15 pages.
Van Dijk et al, "Securing Shared Untrusted Storage by using TPM 1.2 Without Requiring a Trusted OS. Technical Report", MIT CSAIL CSG Technical Memo 498, May 2007.
Trusted Computing Challenges, AMD Presentation, Leendert van Doom, Nov. 2007, 45 pages.
Yoshihama, "Platform Trust Based Access Control Framework," The 2006 Symposium on Cryptography and Information Security, 3B2 Access Control, 3B2-5, SCIS 2006 Organizing Committee, Japan, Jan. 17, 2006.
Cabuk et al, "Improving Policy Verification Capabilities of Trusted Platforms", HPL-2008-71, Jun. 21, 2008, 21 pages.
European Application No. EP 15 19 3998: Extended European Search Report dated Mar. 16, 2015, 9 pages.
Japanese Application No. 2015-011755: Notice of Rejection dated Jan. 12, 2016.
Korean Application No. 10-2015-7030014: Office Action dated Feb. 2, 2016, 5 pages.
U.S. Appl. No. 12/718,480: Non-Final office Action dated Jun. 7, 2012, 20 pages.
Zheng et al, "Secure ORM Scheme for Future Mobile Networks Based on Trusted Mobile Platform", 2005, IEEE, pp. 1164-1167.
3rd Generation Partnership Project, (3 GPP) TS 33.320, 9.0.0, 3rd Generation Partnership Project; Technical Specification Group Services and System Aspects; Security of Home Node B (HNB)/ Home evolved Node B (HeNB) (Release 9), Dec. 2009, 31 pages.
3rd Generation Partnership Project (3GPP) TSG SA WG3 Security-S3#55, S3-090746, Shanghai, China, May 11-15, 2009, 4 pages, www.3GPP.org-/ftp/tsg_sa/WG3_Security/TSG33_55_Shanghai/docs.
3rd Generation Partnership Project (3GPP) TSG-SA3-Security-SA3#57, S3-091947, Dublin, Ireland, Nov. 16-20, 2009, 4 pages, www.3GPP.org-/ftp/tsg_sa/WG3_Security/TSGS3_57_Dublin/docs.
Japanese Application No. 2015-159857: Notice of Rejection dated Sep. 6, 2016, 6 pages.
Balfe et al, "Challenges for Trusted Computing", Research Workshop on Challenges for Trusted Computing at: 3rd European Trusted Infrastructure Summer school [ETISS Sep. 2008], Feb. 26, 2008, 1-24.
Korean Application No. 10-2014-7014163: Notice of Allowance dated Oct. 31, 2016, 1 page.

* cited by examiner

DEVICE VALIDATION, DISTRESS INDICATION, AND REMEDIATION

CROSS REFERENCE TO RELATED APPLICATIONS

This application is a continuation of U.S. patent application Ser. No. 13/289,154 filed Nov. 4, 2011 which claims the benefit of U.S. Provisional Patent Application Ser. No. 61/410,781, filed Nov. 5, 2010, the contents of which are hereby incorporated by reference in their entirety.

BACKGROUND

Wireless communications systems may use unnecessary resources to perform integrity checking and/or repair of integrity failures on wireless communication devices within the system. Current integrity checks may be performed on large monolithic blocks of code to determine whether the integrity of a wireless communications device has been compromised. For example, unauthorized modifications, tampering, and/or compromised software may be detected on the wireless communications device through integrity checking. Once an integrity failure is determined for the large block of code, the network may download updates to the wireless communications device in the form of large monolithic blocks to repair the failure. This may require unnecessary bandwidth and add needless computational burden on the system.

Additionally, multiple types and/or models of wireless communications devices may be used to communicate with or over a network, each having various forms of software and hardware. These various devices may make it difficult to standardize reporting of failed components on a wireless communications device, as hardware and software development practices may differ from one company to the next.

SUMMARY

This Summary is provided to introduce various concepts in a simplified form that are further described below the Detailed Description.

Systems, methods, and apparatus embodiments are described herein for performing integrity checking one or more components of a wireless communications device. As described herein, a first integrity check may be performed on a component associated with a wireless communication device. It may be determined that the component has failed the first integrity check. An indication may be sent, to a network entity, of a functionality that corresponds to the failed component. A request may be received from the network entity to perform a second integrity check on the failed component to determine a portion of the failed component that caused the component to fail the first integrity check. The second integrity check may be performed on the failed component to isolate the portion of the failed component for remediation by the network entity.

According to an example embodiment, a loader may be configured to perform the first integrity check on the component associated with a wireless communication device. The loader may also be configured to determine that the component has failed the first integrity check, and perform a second integrity check on the failed component to isolate a portion of the failed component for remediation by the network entity.

According to an example embodiment, a platform integrity policy engine (PIPE) may be configured to receive the indication of the failed component from the loader and receive a network functionality that corresponds to the failed component. The PIPE may be further configured to report, to a network entity, an indication of the functionality that corresponds to the failed component, and receive a request from the network entity to perform a second integrity check on the failed component to determine that the portion of the failed component caused the component to fail the first integrity check.

According to an example embodiment, a device remediation server may be described herein. The device remediation server may reside on a wireless communication network and be configured to remediate a portion of a component that has failed an integrity check on a wireless communication device. For example, the device remediation server may be configured to receive, from the wireless communication device, an indication of a network functionality associated with the failed component of the integrity check on the wireless communication device. The failed component may be determined based on the received indication of the network functionality. The device remediation server may also be configured to perform an interrogation with the wireless communication device to isolate the portion of the failed component for remediation. The device remediation server may be further configured to determine a repair or replacement for the portion of the failed component to be sent to the wireless communication device based on one or more criteria. Once determined based on the criteria, the device remediation server may then send the repair or replacement for the portion of the failed component to the wireless communication device. A variety of different criteria may be used to determine the repair or replacement for the failed component. For example, the criteria may be based on the size of the failed component or some other factor. In an example embodiment, the remediation server may replace a specific component based on an OS software version. Other exemplary criteria include, but are not limited to, version numbers; date/time of last update or successful remediation per device/component/code portion; ownership of code or components; conditions of a code license (e.g., digital rights management); number of failed components, bits, or bytes; size of failed code portions; and an assigned or calculated risk or damage impact value of a code portion or component.

This Summary is provided to introduce a selection of concepts in a simplified form that are further described below the Detailed Description. This Summary is not intended to identify key features or essential features of the claimed subject matter, nor is it intended to be used to limit the scope of the claimed subject matter. Furthermore, the claimed subject matter is not limited to in limitations that solve any or all disadvantages noted in any part of this disclosure

BRIEF DESCRIPTION OF THE DRAWINGS

A more detailed understanding may be had from the following description, given by way of example in conjunction with the accompanying drawings wherein.

DETAILED DESCRIPTION

FIGS. 1A-24B relate to exemplary embodiments in which the disclosed systems, methods and instrumentalities may be implemented. The embodiments described herein are meant to be exemplary and non-limiting. As protocol flows may be illustrated and described herein, the order of the flows may be varied, portions may be omitted, and/or additional flows may be added.

Figure 1A:
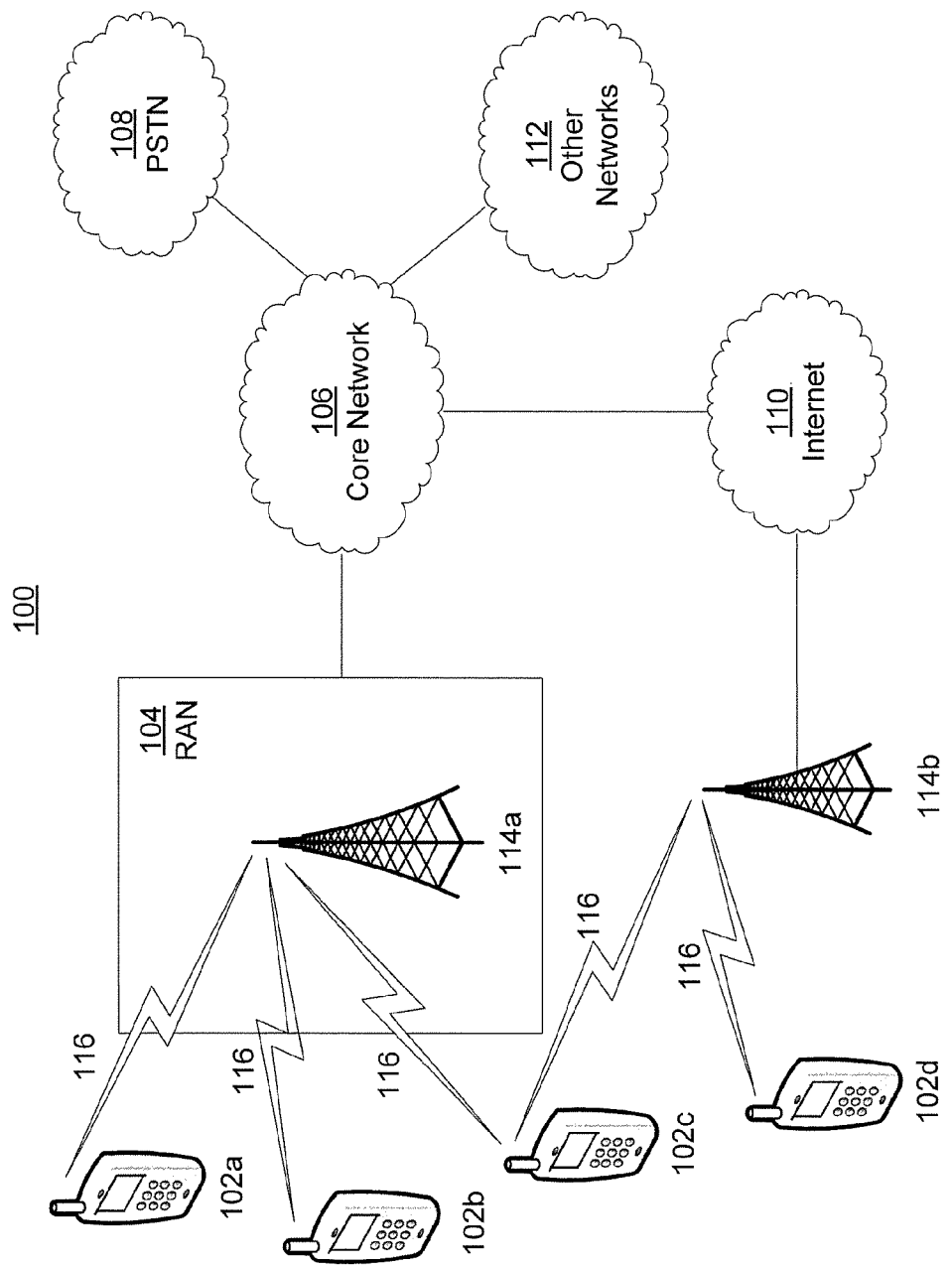
FIG. 1A illustrates an example communications system in which one or more disclosed embodiments may be implemented.
Figure 1B:
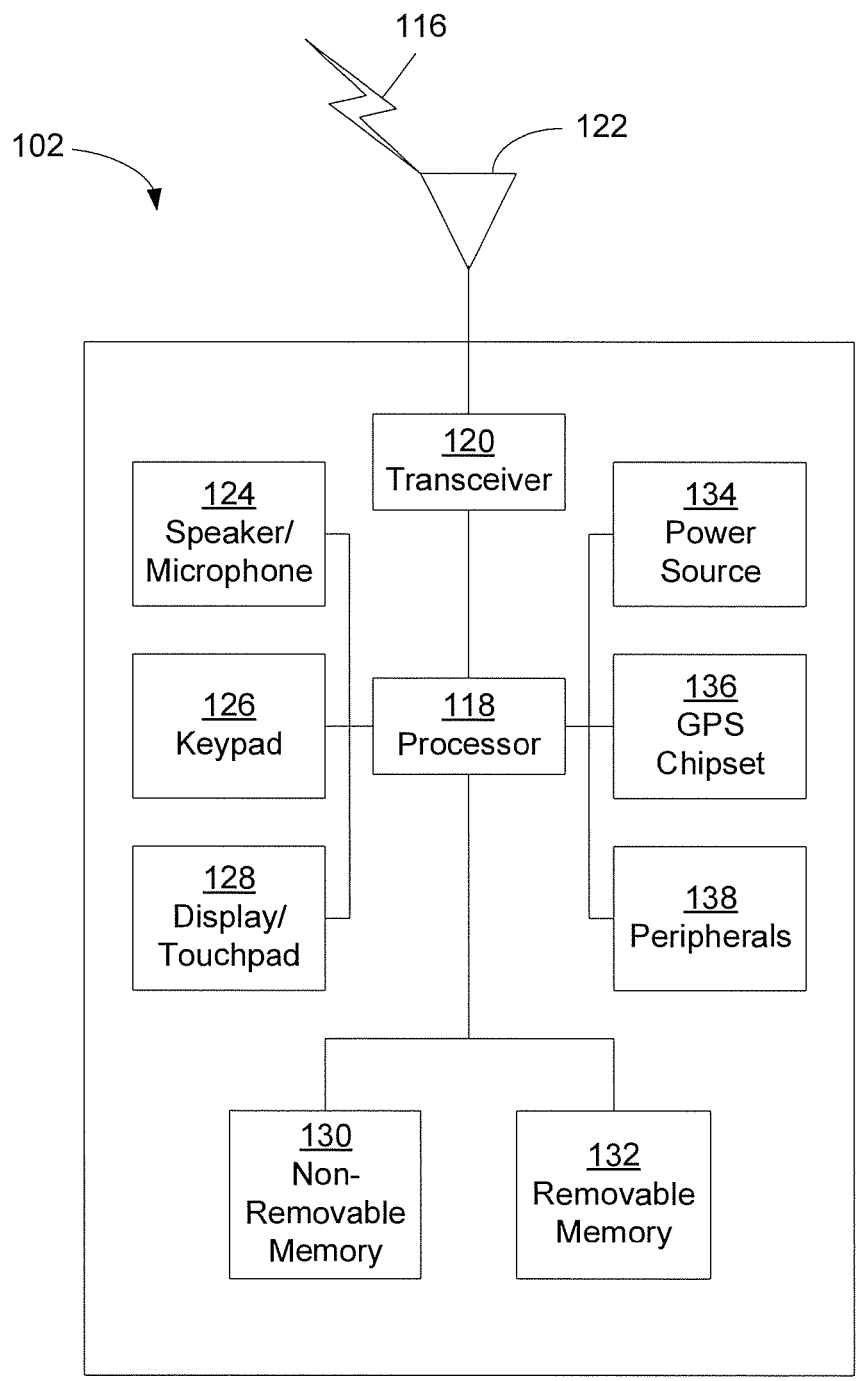
FIG. 1B illustrates an example wireless transmit/receive unit in which one or more disclosed embodiment may be implemented.
Figure 1C:
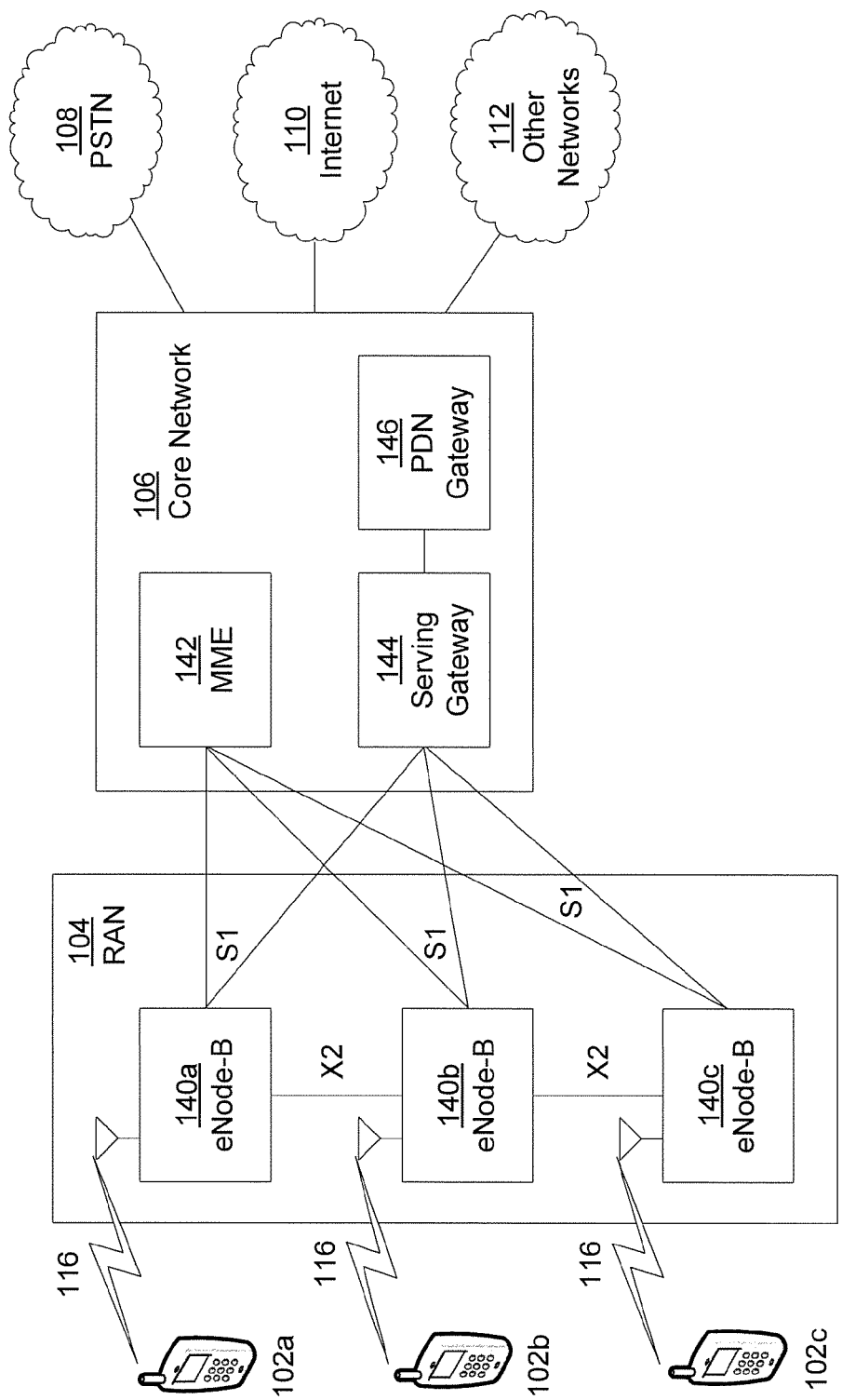
FIG. 1C illustrates an example system radio access network in which one or more disclosed embodiment may be implemented.

FIGS. 1A, 1B, and 1C illustrate exemplary communication systems and devices that may be used in the embodiment described herein. FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 is in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The communications systems and devices described herein may be used to manage software of a communications device, manage configurations of a communications device, and/or provide remediation of the software and/or configuration information to restore the device to a pristine condition. Also described herein are implementations for using software development and code release tools that may embed mechanisms and references in devices for attestable reporting and remediation through the automatic generation and management of references of the software aspects of the trusted code base through the use of software tools, network protocols, device policy and software management, and/or remote debugging techniques. Further described herein are techniques that may assure the indication of a failure of an integrity check by a device, including a description of indications that a device may be trusted to report a failure.

As describe herein, a wireless communications device may be configured to perform an integrity check at each stage of a multi-stage secure boot process. During the multi-stage secure boot process, each stage may verify a subsequent stage thereby creating a chain of trust. During each stage of the multi-stage secure boot process, a determination may be made whether a component associated with the stage may be trusted. An integrity measurement associated with the component may be determined. The component may have an associated trusted reference value. The trustworthiness of the component may be determined (e.g., tested) by comparing the integrity measurement to the trusted reference value. If the integrity measurement matches the trusted reference value, the component may be deemed trustworthy. If the integrity measurement fails to match the trusted reference value, the component may not be trustworthy. While it is described herein that an integrity check may be performed by comparing integrity measurements to a trusted reference value, it will be appreciated that integrity checking may be performed in other ways to determine the trustworthiness of a component.

As a component may not be recognized by an external entity, functionalities may be defined and/or standardized across multiple networks and/or devices, so as to align with standards specifications for example and/or in an implementation independent manner. A component may relate to a functionality. The relationship between components and functionalities may be given in a component-to-functionality map. A functionality failure may be identified by comparing the failed component to the component to functionality map.

The device may send an alarm associated with the functionality failure to an external entity. The external entity may determine replacement code associated with the functionality that may be used to repair or replace the failed component. That is, the replacement code may be a replacement component. The device may receive the replacement component and replace the failed component with the replacement component.

A secure boot process may provide a foundation for a validation procedure. A chain of trust initiated by an immutable hardware root of trust (RoT) may verify validity of the initial code loaded. The boot process may continue, as illustrated in FIG. 2 for example, as each stage verifies a subsequent stage through a chain of trust.

Figure 2:
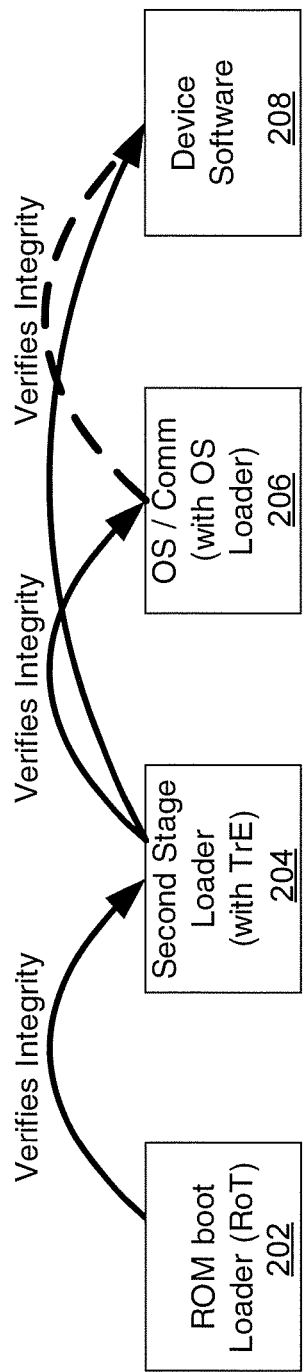
FIG. 2 is a diagram illustrating an example embodiment of a boot sequence on a wireless communications device.

Following power up and hardware initialization procedures, a device may initiate a secure boot process, as illustrated in FIG. 2 for example. An initial RoT may be represented by a boot loader 202, which may reside in secure memory in ROM. A ROM boot loader 202 may initially execute some initialization functions. The ROM boot loader 202 may have access to a security credential (e.g., fused keying information) that it may use to verify the integrity of a second stage boot loader 204, (e.g., residing in external memory). The second stage loader 204 may be checked either by hardware or software cryptographic means to ensure its integrity. The computed hash measurement of the second stage loader 204 may be compared to a trusted reference value (TRV) measurement, which may signed by the security credential and stored in external memory. If the computed measurement matches the signed TRV, then the second stage loader 204 may be verified and loaded into internal memory (e.g., RAM). The Boot ROM may jump to the start of the second stage loader 204 and the chain of trust may continue. A failure in the initial stage of the verification process may indicate that subsequent verifications may be compromised (e.g., a failure in the initial stage may indicate a fatal breakdown in the chain of trust). If there is a failure indicated in the initial stage of the verification process, the device may be shutdown.

The second stage boot loader 204 may comprise trusted execution environment (TrE) code along with code that may check and load additional code to internal memory. The TrE may establish a trusted environment and secure storage area where additional integrity reference values may be calculated and stored. The TrE integrity may check, load, and/or start the operating system and communications code. The chain of trust may continue as each stage is checked and loaded (e.g., the boxes 202, 204, 206, and 208 illustrated in FIG. 2 may each represent a stage). For example, the second stage loader 204 may verify the integrity of the OS/Comm 206 and/or the device software 208. Alternatively, or additionally, the OS/Comm 206 may verify the integrity of the device software 208. OS/Comm 206 may include an OS loader. According to an embodiment, the entities illustrated in FIG. 2 may be verified and/or verify one another in the order of execution to maintain the chain of trust.

A chain of trust may be maintained by an executing process having the ability to verify subsequent processes securely. The verification process may use both cryptographic computation and/or trusted reference values. Code that resides in unsecure memory may be vulnerable to attack and may be verified before loading. With no fine-grained validation, the second stage boot loader 204 may verify the remaining code as a bulk measurement. If the measured value does not match the TRV for the monolithic block, it may be determined that the code may not be trusted and the code may not be loaded. The device may not be capable of communications and a result may include remediation of the entire code base via an expensive truck roll or shipment of the device back for repairs.

The methods, systems, and instrumentalities described herein may render a device capable of validating smaller components of stored code, as well as providing a detailed description of which components have failed and which may or may not be remediated remotely. This fine-grained information may be made available to a remediation manager.

Policies may be established that determine which failed components may be capable of remote remediation. For example, if a device has checked and loaded the TrE along with a minimum set of communications code, the device may retain the functionality to act as a proxy for the remediation manager to identify and report specific failed component information to the remediation manager. If remediation capabilities exist and are part of the proxy function of the device, subsequent remote remediation procedures may be initiated, which may reduce the use of costly onsite personnel updates.

According to an embodiment, an executable image may be partitioned and validated to enable fine-grained reporting. The generation of an executable image may occur in multiple stages. A component may refer to a file consisting of subroutines and/or parameters/data. A developer may write a program captured in component source and header files. From these component source files, a compiler and assembler may produce object files (e.g., *.o) that contain both machine binary code and program data. A linker may take these object files as input and produce an executable image or an object file that may be used for additional linking with other object files. A linker command file may instruct the linker on how to combine the object files and where to place the binary code and data in the target embedded system.

A function of the linker may be to combine multiple object files into a larger relocatable object file, a shared object file, or a final executable image. The global variables and non-static functions may be referred to as global symbols. In the final executable binary image, a symbol may refer to an address location in memory. The content of this memory location may be data for variables or executable code for functions.

The compiler may create a symbol table with the symbol name to address mappings as part of the object file it produces. When creating a relocatable output, the compiler may generate the address that, for each symbol, is relative to the file being compiled. The linking process performed by the linker may involve symbol resolution and/or symbol relocation. Symbol resolution may be the process in which the linker goes through each object file and determines, for the object file, in which (other) object file or files the external symbols are defined. Symbol relocation may be the process in which the linker maps a symbol reference to its definition. The linker may modify the machine code of the linked object files so that code references to the symbols reflect the actual addresses assigned to these symbols.

Object and executable files may come in several formats, such as ELF (Executable and Linking Format) and COFF (Common Object-File Format) for example. Object files may be divided into areas or sections. These sections may hold one or more of: executable code, data, dynamic linking information, debugging data, symbol tables, relocation information, comments, string tables, or notes for example. These sections may be used to provide instruction to the binary file and allow inspection. Function sections may include one or more of the following: a Global Offset Table (GOT) that may store addresses of system functions, a Procedure Linking Table (PLT) that may store indirect links to the GOT, .init/fini that may be used for internal initialization, and .shutdown, or .ctors/.dtors that may be used for constructors and destructors. The data sections may include one or more of: .rodata for read only data, .data for initialized data, or .bss for uninitialized data. ELF sections may include one or more of the following: .init for startup, .text for strings, .fini for shutdown, .rodata for read only data, .data for initialized data, .tdata for initialized thread data, .tbss for uninitialized thread data, .ctors for constructors, .dtors for destructors, .got for global offset tables, or .bss for uninitialized data.

Some sections may be loaded into the process image. Some sections may provide information that may be used in the building of a process image. Some sections may be limited to use in linking object files. Some object files may include references to symbols located in other object files. The linker may create a symbol table that may comprise a list of symbol names and their corresponding offsets in the text and data segments for each object file. After linking the object files together, the linker may use relocation records to find unresolved symbol addresses that may not be filled in. After multiple source files (e.g., C/C++ and assembly files) have been compiled and assembled into ELF object files, the linker may combine these object files and merge the sections from the different object files into program segments, e.g., as shown in FIG. 3.

Figure 3:
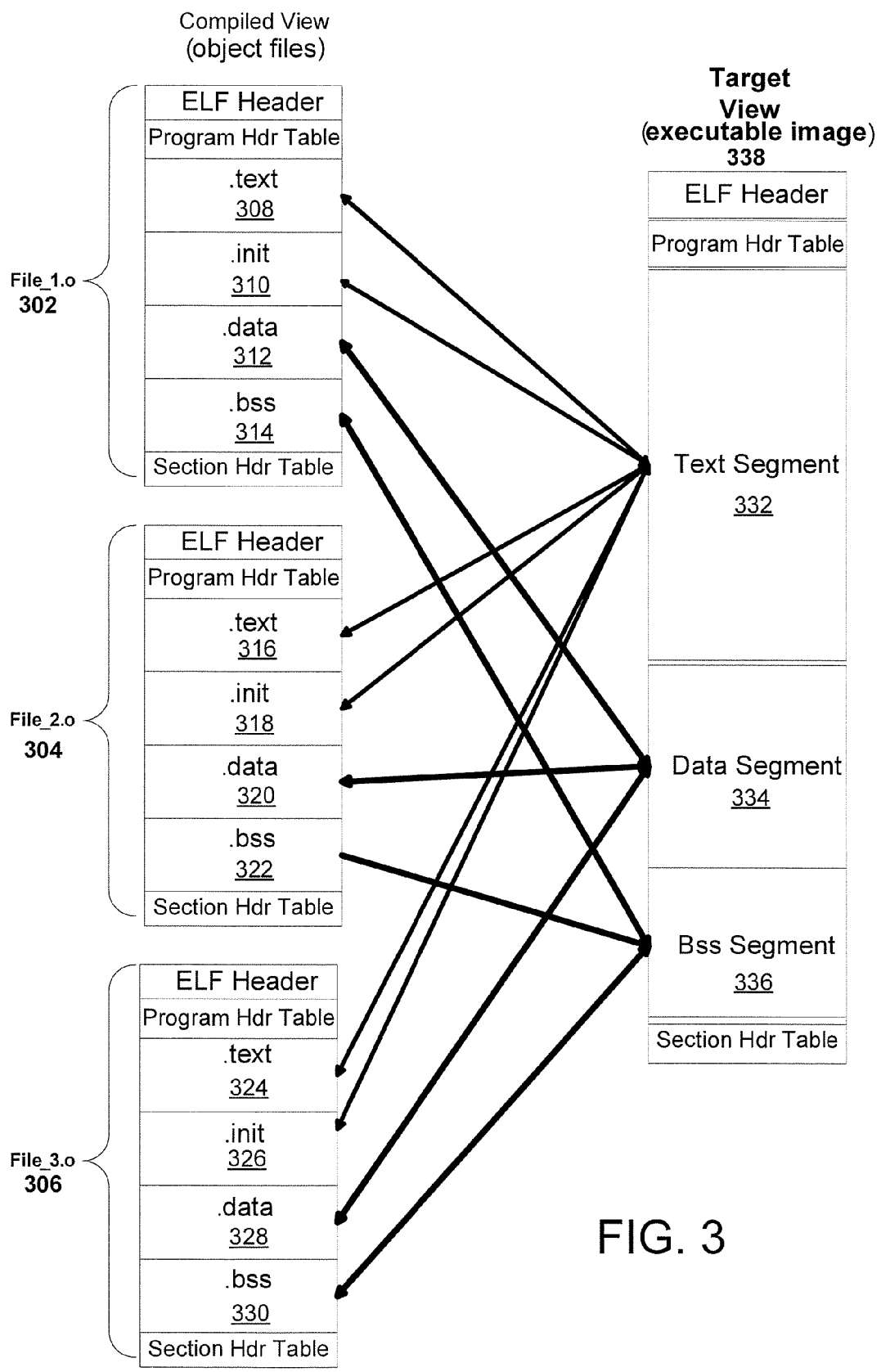
FIG. 3 is a diagram illustrating a linking between object files and an executable image.

As illustrated in FIG. 3, text sections 308, 316, and 324 of object files 302, 304, and 306, respectively, may be merged into text segment 332 of executable image 338. Additionally, or alternatively, startup sections 310, 318, and 326 may be merged into text segment 332 of executable image 338. Similarly, data sections 312, 320, and 328 of object files 302, 304, and 306, respectively, may be merged into data segment 334 of executable image 338. Finally, uninitialized data sections 314, 322, and 330, of object files 302, 304, and 306, respectively, may be merged into uninitialized data segment 336 of executable image 338. While FIG. 3 illustrates a number of sections of object files 302, 304, and 306 that may be merged into segments in executable image 338, it is to be understood that any number and/or combination of sections may be merged into segments of an executable image.

As illustrated in FIG. 3, segments may provide a way of grouping related sections. Each segment may comprise one or more sections of the same or different type (e.g., text, data, or dynamic sections). The operating system may logically copy a file's segment according to the information provided in the program header table. The executable and read-only data sections may be combined into a single text segment. The data and uninitialized data sections may be combined into the data segment or into their own individual segments. These segments may be called load segments because they may be loaded in memory at process creation. Other sections, such as symbol information and debugging sections, may be merged into other, non-load segments. The text sections may comprise the source code along with initialized static variables. Multiple sections defined by a compiler may be loaded into a single combined segment defined by the linker.

A final executable image may be generated using linker commands (that may be called linker directives) to control how the linker combines the sections and/or allocates the segments into the target system memory map. The linker directives may be kept in the linker command file. The embedded developer may use the linker command file to map the executable image into the target system.

The ability to perform validation and fine-grained reporting of failed components may use additional information available in the executable image, and there may be modifications to the development and code release tool chains. Reference measurements for each component as well as an information element that identifies which component the measurement is associated with may be identifiable within the executable image.

The remediation of failed components may rely on the ability of the device to report a standard functionality failure. Functionalities, as well as the actions to take based on a failure, may be defined by network operators. Software developers may determine how functionalities defined by the operators may map to software components in their system. Functionality mapping may be visible in the executable image and may use tool chain enhancements.

The software tool chain used during the development phase may be modified to accommodate one or more of the following: generation of component sections, secure generation and embedding of TRVs, insertion of component-to-functionality definitions, or insertion of policies and policy configuration files.

The loader functionality may be modified to accommodate validation and/or remediation. The loader may be modified to perform one or more of the following: perform integrity check of components as they are loaded, quarantine or unload failed components, administer policies, or store failed component IDs in memory for policy manager to report failures.

Described herein are exemplary embodiments that may be applied to the software development and code release tool chains described herein to illustrate desired functionality. However, the embodiments are not limited to the examples provided herein.

A role of the linker may be to take the input objects and combine the various sections into a segment. Since the object code may be combined during the linking process, the ability to identify functions or variables in the object file may be held in the symbol table information. The resulting merged code sections may not provide the validation scheme that may be used to trigger validation procedures as described herein.

To facilitate identification of individual components, the loader may have a way to identify where the code originated, which may include defining components or generating TRVs for individual components that may be identified by the loader. The tool chain used to generate an executable image may be enhanced, e.g., to be able to identify code associated with a specific object file component for the loader validation function to identify a specific component and perform integrity checks. Rearrangement of the code image may change TRVs for input objects (e.g., modifying one input object may result in changing TRVs for other input objects). The tool chain may be precluded from using optimization methods to preclude a change of TRVs.

Specific section names may be generated for components that may be desired for integrity checking. The section name may appear in the section header table included in the final ELF executable file for example. By grouping the user defined sections, the loader may identify components and perform integrity checks. The loader may report pass or fail status of the components to the policy manager. Isolating the specific functions that pass/fail the integrity check may allow the policy manager to report at a fine-grained or detailed level those functionalities that may be affected by the failed components.

Figure 4:
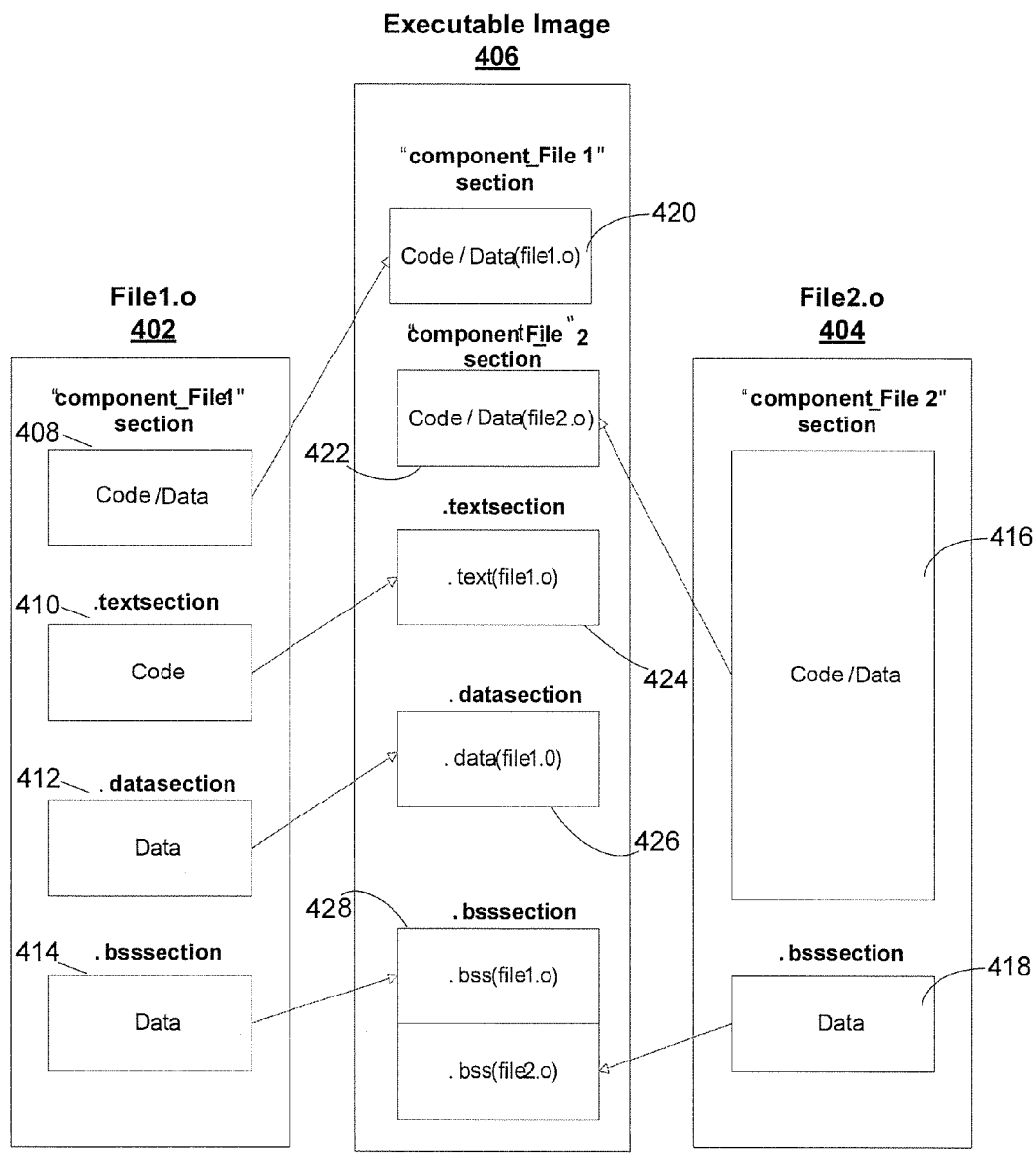
FIG. 4 is another diagram illustrating a linking between object files and an executable image.

FIG. 4 illustrates two object files 402 and 404 that may be linked together to form a single executable image 406. Object file 402 has two distinct code segments, component file section 408 and text section 410. Object file 404 has a single code segment, component file section 416, that may include code and/or constant data. The user defined code sections, component file section 408 and component file section 416, may appear in the section header along with the size and/or memory location relative to the type of segments to which they are mapped. An example of such a mapping relationships are depicted by the arrows in FIG. 4. For example, component file section 408, text section 410, data section 412, and bss section 414 of object file 402 may map, respectively, to component file section 420, text section 424, data section 426, and bss section 428 of executable image 406. Similarly, component file section 416 and bss section 418 of object file 404 may map, respectively, to component file section 422 and bss section 428 of executable image 406. The executable image 406 may be linked to include the user defined sections at the beginning of the executable image 406 at a predefined location so they may be checked sequentially. The checking for integrity by validation may be limited to a subset of the codebase. The remaining code that is grouped into a larger text segment may not be integrity checked and/or may be loaded.

The addition of the user defined sections may be made identifiable, e.g., by inserting a #PRAGMA into the component code. Still referring to the example of FIG. 4, the instruction #PRAGMA section (e.g., component file section 408) may be inserted at the top of the source file. The compiler may be enhanced to include the user defined section by means of a compiler flag. The compiler may be enhanced to insert the PRAGMA automatically if a specific flag was set. The user defined section concept may be extended so that the user defined section is restricted to those functions within a component that may be integrity checked. The functions that may be used for the trusted execution of the device may be partitioned or isolated into a component that may be integrity checked first or early in the startup process.

The sections may be mapped to specific segments of memory via a linker command file. The ELF object may be viewed in terms of source and destination addresses. The sections identified in the section header table may inform the loader where to find the start of code and/or data to move. The segments identified in the segment header may inform the loader where to copy the component. A format of the section and program headers is illustrated below.

| Section header | Program header |
|---|---|
| typedef struct { | typedef struct { |
| • Elf32_Word sh_name; | • Elf32_Word p_type; |
| • Elf32_Word sh_type; | • Elf32_Off p_offset; |
| • Elf32_Word sh_flags; | • Elf32_Addr p_vaddr; |
| • Elf32_Addr sh_addr; | • Elf32_Addr p_paddr; |
| • Elf32_Off sh_offset; | • Elf32_Word p_filesz; |
| • Elf32_Word sh_size; | • Elf32_Word p_memsz; |
| • Elf32_Word sh_link; | • Elf32_Word p_flags; |
| • Elf32_Word sh_info; | • Elf32_Word p_align; |
| • Elf32_Word sh_addralign; | } Elf32_Phdr; |
| • Elf32_Word sh_entsize; | |
| } Elf32_Shdr; | |

The sh_addr may be the address where the program section may reside in the target memory. The p_paddr may be the address where the program segment may reside in the target memory. The sh_addr and the p_paddr fields may refer to the load addresses. The loader may use the load address field from the section header as the starting address for the image transfer from non-volatile memory to RAM.

It may be possible to extend the concepts of component section identification to more than one specific component contained within a file. Such extension may allow for further granularity of access control by a policy manager through identification of specific subroutines to be checked for integrity rather than a complete file.

A TRV may be the expected measurement (e.g., a hash of the component computed in a secure manner) of a particular component or object file. The validation process may rely on a TRV for each component to be checked to be present, e.g., in the executable image or loaded in a secure manner separately, for integrity verification purposes. This may be achieved in many ways. By way of illustration, the tool chain that builds the executable image may be modified to securely compute the hash value of a component or an object file and to securely insert the computed TRV into an appropriate section of the same object file. This computation may be performed as part of the linking process. The order in which the TRV hash is computed may match the order in which the component is to be loaded and measured, otherwise the measurement values may not match correctly. The hash value may be available to the loader or contained within the executable. To maintain the chain of trust, the TRV may be generated and/or stored securely. TRVs may be secured by signing the TRV values, e.g., with a private key that corresponds to a public key, such as a public key of the manufacturer of the software/firmware for example.

Figure 5:
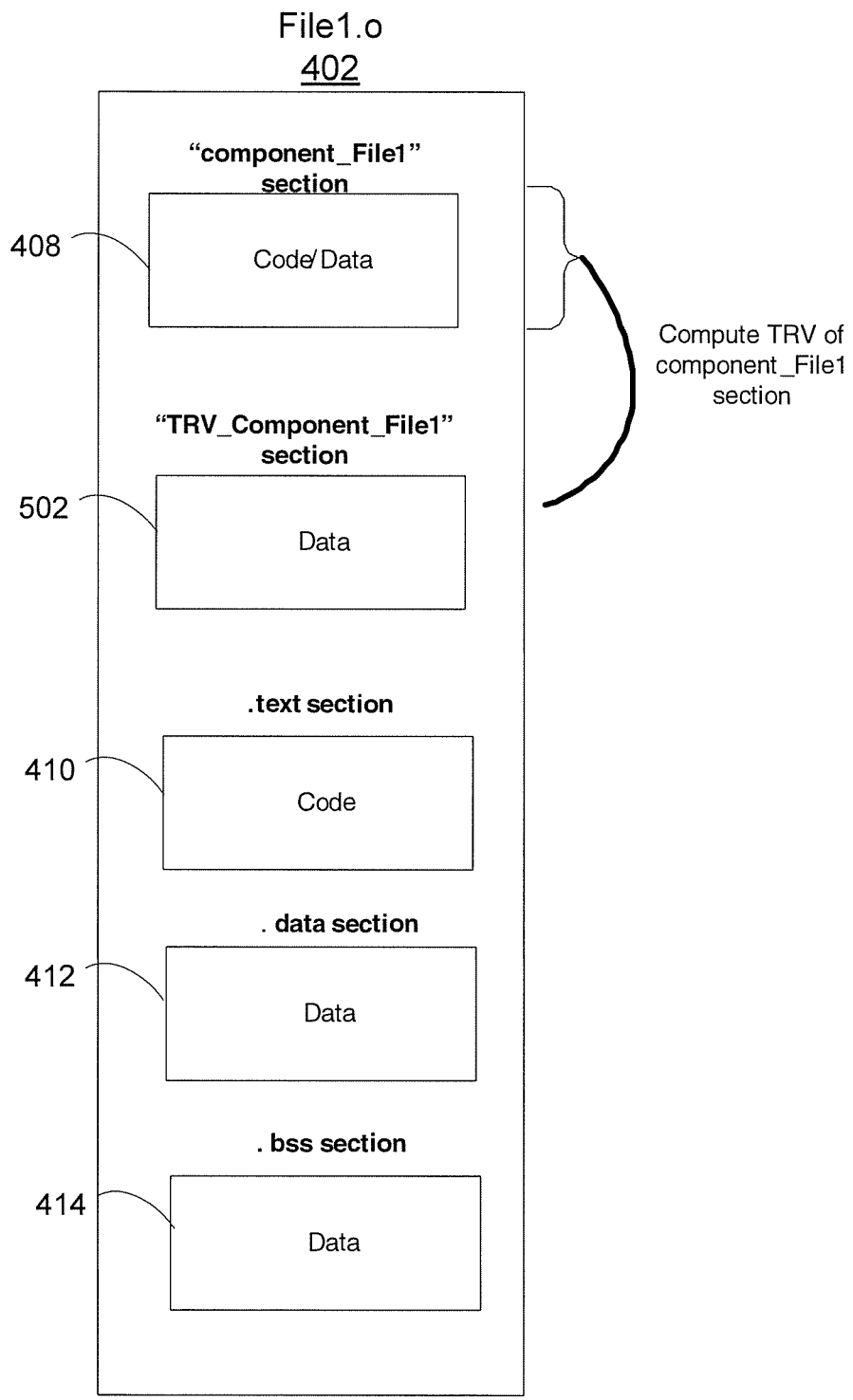
FIG. 5 illustrates an example of a component TRV section of a file.

The component object file may include a separate user defined section as a placeholder for its associated TRV as illustrated in FIG. 5. For example, as illustrated in FIG. 5, a TRV of the component object file 408 may be computed and stored in component TRV section 502. The section header may identify the start address and/or size of the sections, which may include the user defined sections described herein. At the object file 402, the linker may compute the hash value of the component object file 408 at the end of the symbol resolution phase and locate the corresponding component TRV section 502. The component TRVs may be inserted into the executable image at the specified location in memory (e.g., component TRV section). The section header may allow the loader to locate the TRV for a particular section during the validation process.

As described herein, device validation may focus on the integrity status of components. It may be difficult to standardize reporting of failed components as software development practices may differ from one company to the next.

Disclosed herein are systems, methods, and instrumentalities to standardize a way of grouping components with respect to the functions they perform. Functionalities may be standardized so as to align with standards specifications and/or in an implementation independent manner A list of functionalities may be pre-defined for a device function that may be standardized. References between the functionalities and the components may be used to enable a mapping of the faults found during integrity checking to specific functionalities for reporting, an example of which is depicted in FIG. 6.

Figure 6:
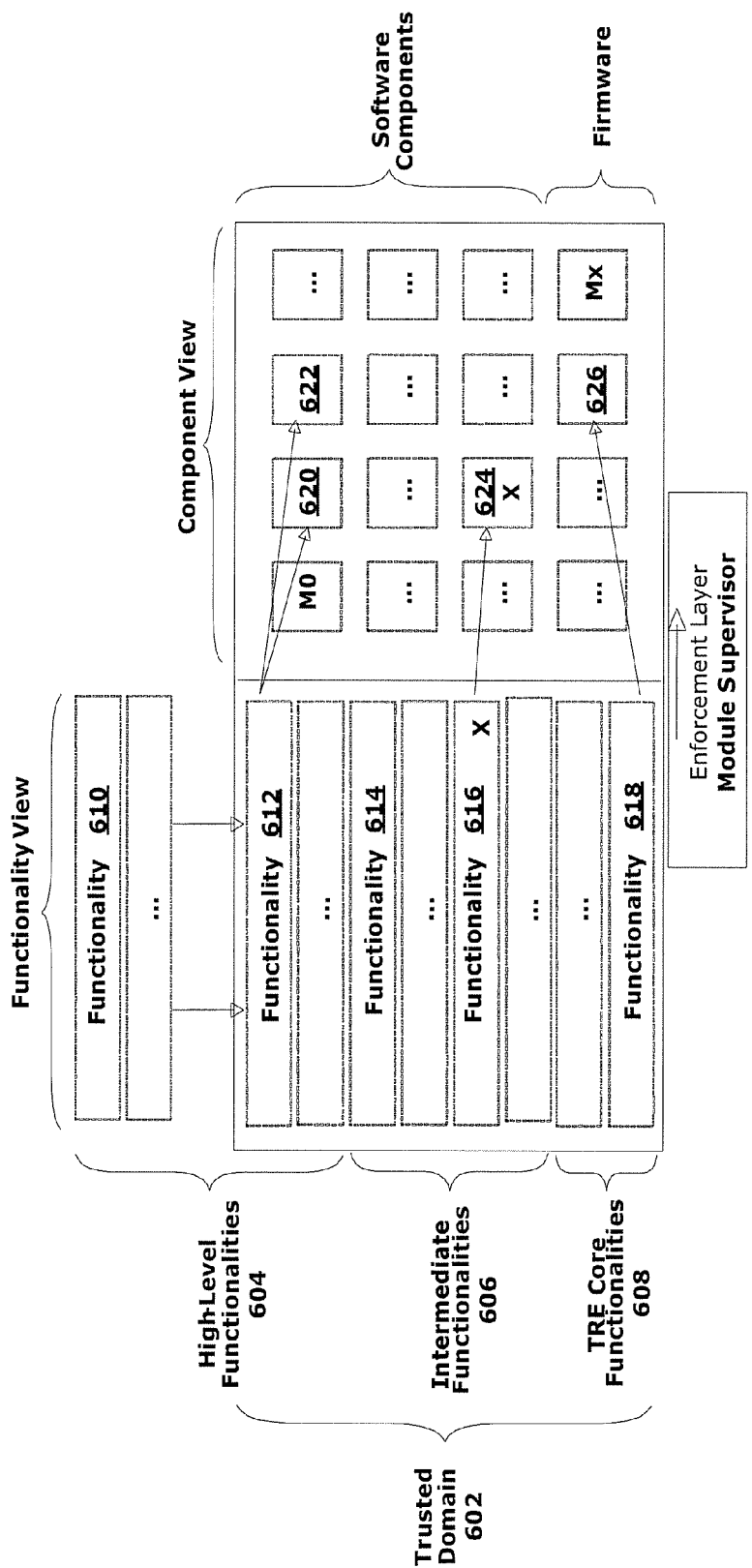
FIG. 6 is a diagram illustrating a mapping of components to network functionalities.

As illustrated in FIG. 6, a trusted domain 602 may include components and functionalities that map to one another. For example, trusted domain 602 may include high-level functionalities 604, intermediate functionalities 606, and/or trusted environment (TrE) core functionalities 608. High-level functionalities 604 may include functionality 610 and functionality 612. Intermediate functionalities 606 may include functionality 614 and functionality 616. TrE core functionalities 608 may include functionality 618, such as the RoT for example. Functionality 612 may map to components 620 and/or 622, which may be software components for example. Functionality 616 may map to component 624, which may also be a software component for example. Functionality 618 may map to component 626, which may be a firmware component for example. During an integrity check of the trusted domain 602, a fault may be determined at component 624. As component 624 maps to functionality 616, it may be determined that network functionality 616 is also faulty. As a result, the device may send the indication of faulty functionality 616 to the network for remediation.

The mappings between the functionalities and the components in FIG. 6 are illustrated as enforcement layer mappings. Alternative to, or in addition to, the embodiment illustrated in FIG. 6, mapping between a component and functionality may have more than one layer. A data structure that has more than two layers (e.g., one for components and the other for the functionality) may be used. In such structure, components may be mapped to a set of sub-functionalities, and sub-functionalities may be mapped to a set of even higher-level of sub-functionalities. The intermediate mapping may go on until the sub-functionalities at the final sub-functionality layer are mapped to the final functionalities at the final layer. A tree or tree-like data structure may be an example of a structure that may capture such a multi-layer component-to-functionality mapping relationship.

A developer may determine how components map to the standardized functionalities. According to an embodiment, the executable image may include the mapping of the components to functionalities. This may be accomplished at compile time, for example through a graphical tool that parses the compiled or source code and shows one or more of: the individual file layout, the interdependencies of the functions in the files, and allows mapping of components to functionalities. The functionalities may be textual fields and/or abbreviated ID numbers, which may be entered by the user and/or mapped manually to the components/file. The development tools may create a section that references the component to a functionality mapping table. The component names, functionality names, and IDs, together with a cross-reference inter-connect may be included as elements of the table.

Figure 7:
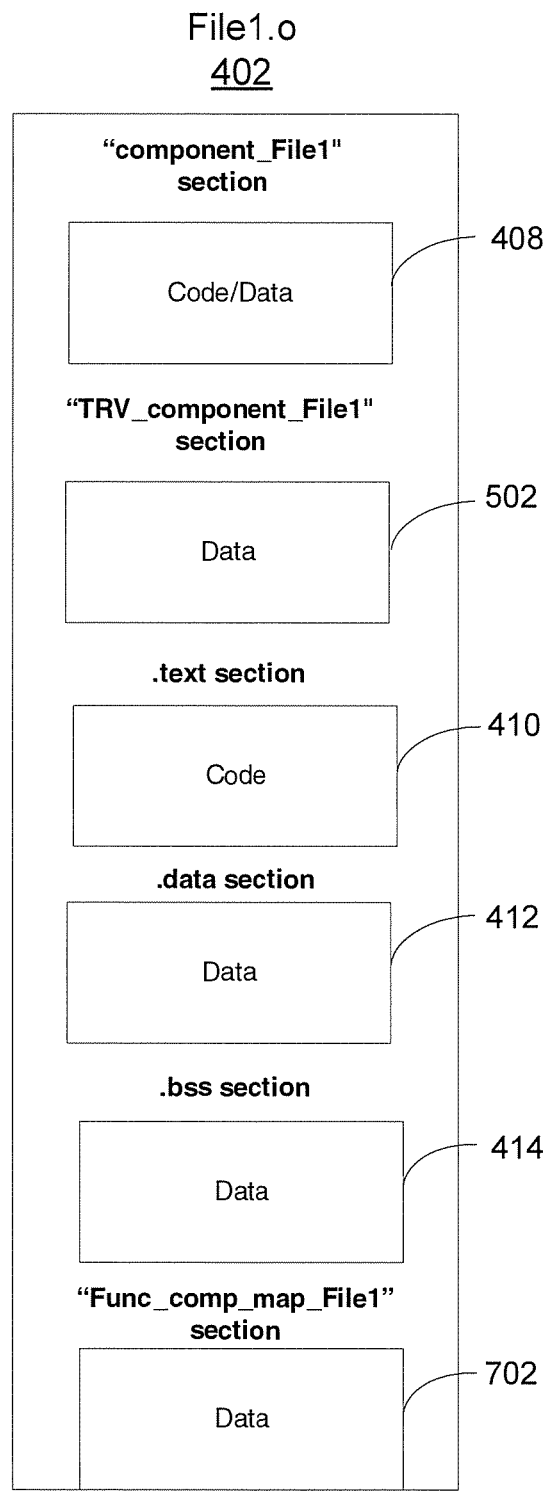
FIG. 7 illustrates an example of a component-to-functionality mapping section of a file.

FIG. 7 illustrates an example of a section that includes a mapping of components to functionalities. As illustrated in FIG. 7, function-to-component mapping section 702 may be included as a section in an object file, such as object file 402 for example. Function-to-component mapping section 702 may also link to a corresponding segment in an executable image, as described herein.

A function of the loader may be to bring the code in from external to internal memory. The chain of trust may rely on each loaded stage of code being verified by the previous stage starting from a RoT and the boot loader. The second stage loader may verify the next stage, which may include the core of the trusted environment and OS loader. Once the OS is initialized and running, remaining integrity checks may be performed as described herein by a standard OS loader. The executable image may be loaded into RAM without caching. These concepts disclosed herein may be extended to include more constrained implementations where the executable image is larger than the available RAM with additional modifications, e.g., where there may be use of cache memories and where the code may be executed directly from ROM.

The loader that brings the code in from external to internal memory may include the ability to perform cryptographic integrity checks. The integrity checking may reference back to cryptographic functions that may be securely held in a trusted environment. Under normal operation, the loader may copy the code and data in the combined text section, such as text section 410, and data section, such as data section 412, to internal memory as defined by the linker command script and the segment header information. Instead of bulk loading the text section 410 and data section 412, the loader may identify the user defined sections of code and/or data. Some of this supplemental section information may be used for integrity checking. The loader may compute an integrity measurement for a component and then locate the TRV for the component in its associated section. The section header may provide the start address of the section and the size. The measured value may be compared to the stored TRV for the same component. If the values match, then the code may be loaded into internal memory. If the integrity measurements do not match, the code may not be loaded and a failure may be recorded for that component and/or reported to the policy manager.

The loader verification results for each component may be stored in bit fields indicating that the component has been checked as well as a pass or fail bit indication. When the full code has been moved to internal memory, the policy manager may determine what access to grant to the device based on the completed integrity check results. One way to accomplish this is to provide that the loader has access to a secure memory location to track the integrity results. The procedure linkage table (PLT) may be enhanced with additional informational elements to track whether the integrity of a component has been checked and verified, and, the result of that integrity check and the information may be updated as each checked component is loaded into internal RAM.

In embedded systems with limited memory, code swapping may be used. Code swapping may involve loading functions, which may be used for execution into RAM. If a subcomponent is used, the PLT and GOT tables may be used to locate its address if it is not available in RAM. The subcomponent may be a small part of a larger component with an associated TRV. In a system that dynamically checks the subcomponents as they are loaded, an integrity check of the entire component may be used each time a subcomponent is to be loaded. Such a requirement may add unnecessary computational burden on the system.

A component may be divided into its subcomponents, and, an intermediate TRV may be computed that may be used to check the integrity for each subcomponent. Furthermore, a minimum block size may be implemented to compute the intermediate hash. This process of TRV hash generation of subcomponents may be referred to as TRV digestion. For example, a small subcomponents hash may be computed based on a memory page block size. This division of a component into subcomponents may occur when the component is integrity checked as part of the installation or startup process for example. The GOT may be enhanced to include the intermediate TRV of each subcomponent.

A Platform Integrity Policy Engine (PIPE) may be part of the overall platform trust system architecture. For example, the PIPE may prevent one or more of the following: the network from being attacked, a device from being misused, sensitive data from being communicated or manipulated on the platform in an unauthorized manner. The PIPE may rely on various operating system functions such as boot loaders, policy managers, and virtualization components to control and create a secure and trustworthy platform. The PIPE may control various functions including flow of the secure boot process, processing of integrity check measurements on software components, subsequent enforcement actions according to policies, and/or flow of subsequent software load control. The policies may be defined by an external stakeholder such as a manufacturer or operator and may be provisioned on the device. The policies may be updated in the field through remote update procedures.

The PIPE may reduce the risk of compromised software functionality being loaded through one or more of the following: controlled software data check and load operations, progressively installing more functional capabilities, or maintaining the dynamic loading of components during run time. Depending upon the stage of progress in the loading operations, actions may include one or more of the following: power down of the platform; prevent loading of compromised component(s) or quarantine the component(s); trigger alarms to external entities such as the security gateway or remediation manager in the network to notify a low level failure or compromised functionality; prevention of access to secure information on the platform such as authentication keys, etc.; prevention of access to secure functions on the platform such as authentication algorithms, etc.; perform bulk code or data reload/update procedures; replace compromised software components and/or configuration data; or investigate in greater detail, including integrity checking with a finer granular detail, a component suspected of tampering, to isolate the location of the fault in the component.

In some cases failure may be so severe that even the trusted environment may not be able to assure trust in the platform because the core TrE functionality has been compromised. Failure at a low level may trigger rudimentary operations such as generating a default root-of-trust signed alarm message, which may include integrity and replay protection and confidentiality protection. That is, upon occurrence of a critical low level security failure, a distress message may be released to the network by one or more communication channels that may be available.

As the loaded functionality is built and becomes more and more sophisticated, the device may perform more sophisticated actions such as acting as a secure and trustworthy proxy on behalf of the network entity, which may facilitate interrogative procedures to diagnose, report and/or replace compromised software or configuration data.

Varying access to resources on the platform may be provided (e.g., by the PIPE) depending upon the level of successfully verified functionality. If a component integrity check fails then it may not be trusted. This detected failure may be securely marked and indicated to the network (either explicitly or implicitly), and, the boot flow may branch due to this failed condition. This type of integrity check failure may be referred to as an execution flow failure, whereby the checked component may not be trustworthy and starting this component may result in the execution of malicious, compromised, faulty or misconfigured code and which may cause the device to perform network functions in an unspecified and/or unexpected manner. Thus, the loading of new components and the available functionality may be affected by the integrity of components loaded previously.

As a result, the execution environment may change depending on the controlling execution process and/or access privileges at each boot stage and each runtime process. For example, at each stage in the boot process, decisions may be made based on the integrity measurements made at that time. Subsequent stages and policies may use information passed from previous stages through any available secured means of information conveyance or storage that transcends the execution stages (states, variable, parameters, registers, files, etc.) to determine its' own operations. For example, an upper layer application authentication function may use information on the integrity of previously loaded components to determine its own operations, including gating of the release of keys used for successful authentication with an external entity for example.

An exemplary PIPE functional flow may be performed as described herein. For example, the RoT may be integrity checked and/or its integrity may be verified. The baseline TrE may be integrity checked by the RoT and/or its integrity may be verified. If there is a failure in the integrity check and/or verification of the baseline TrE, then the PIPE may prevent a release of keys used for attachment to the network, trigger an alarm to the network, and/or power down the device. If the PIPE triggers an alarm to the network, a fallback code may be loaded which may enable the alarm to be sent to the network. The alarm may trigger a remote bulk update procedure to replace the TrE.

If there is no failure in the integrity check and/or verification of the baseline TrE, basic communications connectivity code may be loaded. This may include performing an integrity check and loading baseline operating system modules, performing an integrity check and loading a baseline management client, and/or performing an integrity check and loading communications modules. If a failure is identified while checking the integrity of the operating system modules, the baseline management client, and/or the communications modules, then the PIPE may prevent a release of keys used for attachment to the network, trigger an alarm to the network, perform a remote bulk update procedure to replace components, perform a remote component update procedure, and/or power down the device. If the PIPE triggers a remote bulk update procedure, a fallback code may be loaded which may enable the alarm to be sent to the network. The alarm may trigger a remote bulk update procedure to replace the basic code.

If there is no failure in the integrity check and/or verification of the basic communications connectivity code, the remaining operating system and management client components may be integrity checked and/or loaded. This may include performing an integrity check and/or loading relocatable and/or reloadable functional modules. If there is a failure identified during the integrity check, then the PIPE may prevent release of keys used for attachment to network, send a failure report in protocol to the network, trigger an alarm and/or request a remote component update procedure, and/or power down the device. The failure report may indicate failed components that may be updated remotely by the network for example.

The action of the PIPE may vary depending upon the successfully verified boot chain. At each stage in the boot process, decisions may be made based on the assessed integrity of part or whole of the underlying platform that has been integrity-checked at that time (or by that time) and the policy that is to be applied. These policies may adapt or be replaced by other policies depending on the achieved trust level. The execution environment may change depending on the controlling policy at each boot stage. Subsequent stages and/or policies may use information passed from previous stages through available secured means of information conveyance or storage that transcends the execution stages (e.g., states, variable, parameters, registers, files, etc.).

Figure 8:
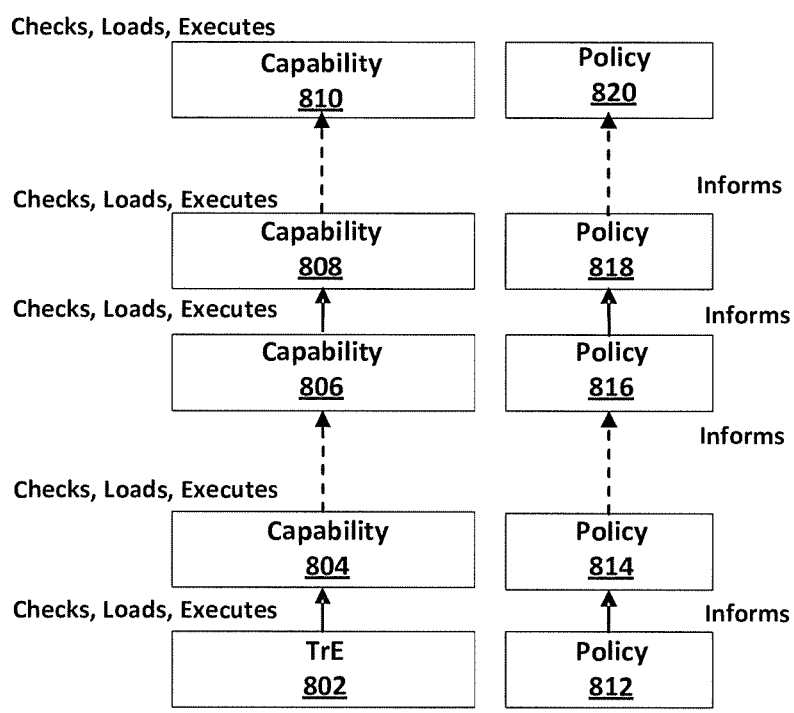
FIG. 8 is a diagram illustrating a platform bring-up of capabilities and policies used in a boot sequence.

As described herein, for example, the PIPE may provision policies on a platform where the policies may adapt or change depending upon the achieved level of platform bring-up and trust state, e.g., as shown in FIG. 8. As illustrated in FIG. 8, the TrE 802 may be integrity checked, loaded, and/or executed according to corresponding policy 812. After the TrE 802 is established as a trusted entity and executed, the device may move to a next stage of the boot sequence. For example, capability 804 may be integrity checked, loaded, and/or executed according to policy 814. The integrity check, loading, or executing of capability 804 may be based on information (e.g., a trust state) associated with the integrity check, loading, or executing of TrE 802. Policy 814, which may be implemented during the integrity check, loading, and/or execution of capability 904, may be informed by the policy 812, which was implemented in the previous stage of the boot sequence. After the capability 804 is established as a trusted entity and executed, the device may move to the next stage of the boot sequence. The boot sequence may continue by checking, loading, and/or executing capabilities 806, 808, and 810 according to their corresponding policies 816, 818, and 820, respectively. Each stage of the boot sequence may be informed by one or more of the prior stages of the boot sequence, as described herein.

The policies described herein may be provisioned by a trusted external entity such as an operator. The results of the achieved trust state of the platform may be communicable to external entities that may have a legitimate interest/right to know about the trust state of the platform such as an operator or a provider of a sensitive application or service for example. Note that there may be more than one external entity to which information about possibly different states of the platform, assessed at possibly different stages of the boot-up or operational cycle of the platform, may be communicated to.

Multi-layer integrity checking and binding of such integrity checking to the trust state of the platform may be performed as described herein. For example, such integrity checking and binding may use multi-layer integrity checking to ensure, by policy and enforcement, that a key on the device authenticates the device's achieved capability (e.g., device remediation functionality to an external verifier such as a server on the network that performs remediation tasks). A security-sensitive function that uses such a key for authentication may become available to the device if a certain pre-known set of software and/or configuration files to achieve the desired capability pass integrity checking. Such software and/or configuration files may include low level OS functions, drivers, configuration files, and/or some subset of communication stack code, for example.

The multi-layer integrity checking and binding of integrity checking may also include a policy that is used to protect the authentication key such that the key may be restricted to use by the authorized function or process. If the key is unprotected, then the software may be compromised to access the key. The device may provide trusted functionality to: protect the key such that it is restricted to use by a limited set of capabilities, functions, or a single function; protect the functions/programs that operate on that key; and/or restrict who (e.g., users, system, scripts, etc.) may call one of these privileged functions.

The embodiments described herein for multi-layer integrity checking and binding may include a set of pre-known software that may be used to allow a potentially compromised device to be able to authenticate its partial capability to an external entity (e.g., its capability to report faults and to perform remediation actions with a remediation server, or an AAA-entity for such a server). The external entity (e.g., remediation server) may be a logical entity and it may be hosted by a device management server, such as a H(e)MS in the case of a H(e)NB for example.

To provide a mechanism of specifying policies that may be independent of the actual implementation on a particular platform, the policies may be defined by specifying the functionalities which may be desired for a particular platform capability. Hence in a similar manner to the component-to-functionality mapping disclosed herein, the policies corresponding to a particular capability may also be mapped to the functionalities. An external stakeholder may specify a policy for a particular capability to a single functionality or several functionalities. It may be the responsibility of the PIPE to interpret the policy requirements in mapping the capabilities to a particular policy and to the stages of the platform bring-up.

If a particular capability uses a particular set of functionalities then those functionalities may be specified for the corresponding policy aligned to that particular capability. For example, if the capability to perform remediation is desired to be mapped to a policy, then the functionalities used to perform remediation may be mapped to the corresponding policy, e.g. a remediation capability may be covered by Functionalities 1, 2, and 3, so, the corresponding policy is specified to map to Functionalities 1, 2, and 3.

For some implementations there may be a reasonable level of correlation between the layered bring-up of the platform and the capabilities and functionalities. The capabilities may be brought up progressively layer upon layer, in tandem with the functionalities. For example, the remediation functionality and capability may be brought up in the early stages of platform bring-up.

Multi-layer integrity checking may not be a sequential determination of checked vs. not-checked status of different functionalities. Functionalities may be checked in a sequential manner. However, since different functionalities may be mapped to different components (that may subsequently be loaded in different stages) the process of functionality-wise determination of integrity may be done in a non-sequential manner, or, in a sequential manner that is not necessarily synchronized (either in time duration or in time order) to the sequence of the atomic process of component-wise integrity checking.

Serialization may be used for policy enforcement. Policy enforcement may determine whether, for a given platform capability, the corresponding functionality has been integrity checked and/or the policy that should be applied.

Multi-scope authentication may allow a platform to authenticate to one or more external entities based upon the achieved trust level of the platform. The authentication mechanism (e.g., the authentication challenge response mechanism) may be used as a means to convey the resulting scope of the integrity of a device, to an external entity. The external entity may authenticate, and at the same time, get an indication of the range/scope of integrity of the device.

The device's TrE, while going through a multi-layer integrity checking, may generate a different parameter or parameter value for an authentication challenge response, for different purposes. Such generation of parameters may be based on, or use, the same secret credential shared with the external authenticating entity depending on the scope of successful integrity checking. A common challenge-response computing algorithm may be used. However, the input to such an algorithm may be made to be different, depending on the scope of integrity checking and/or the purpose of authentication. For example, a text string such as "entire code basis successfully checked" may be used as an input to the authentication challenge response computing algorithm, if the TrE successfully checks the entire code base. Another string, such as "code base for distress remediation successfully checked," could be used as input if the TrE successfully checks the components used to realize distress remediation functionality, but not necessarily the entire code base.

The external authenticator, upon having sent its authentication challenge request to the device, may also compute two versions of the 'expected' challenge response. Since it may not know which input would have been used in computation of the challenge response at the device, it may have to compute both versions of responses. By comparing a received response from the device to the expected set of responses, the external authenticator may successively test out the 'scope' of the device integrity, implicitly. The entity may authenticate and/or verify, by way of induction, that a certain 'scope' of the device's integrity has been successfully checked on the device side. In the above example, the same, or similar, implementations may be used to authenticate another specific (e.g., partial) capability of a device, contingent upon checking the integrity of functionalities, and thus components, used to realize that capability.

As an example, a trust-verifiable external indication may be a secured release of signing credentials during a secure boot process that binds code integrity measurements to a specific boot cycle execution and configuration signature. A secure time stamp, secured monotonic counter that increments per boot cycle, or a boot cycle secret (e.g., hidden random value such as a nonce that is generated or introduced once per boot cycle) may be included. An authentication key may become available when pre-conditions are met and the present trustworthy process sets a protected one-time per boot programmable "pass" flag that may be limited to restore to a failed condition (e.g., upon detection of a failure after the initial measurement) until the next reset. Persistent trusted environments (e.g., into the runtime, not just boot-time), such as a TrE, may sign status information using an authentication protocol nonce before release to an external entity. Sections of the report may be signed by the presently verified trustworthy process with a temporary boot key so that later processes may present this status to an external entity for validation.

A modified random nonce(s) exchanged in the authentication protocol may be used, and, such modified nonce(s) may be used as an input to the challenge response and expected challenge response computations. That is, on the device itself, the device's TrE may attempt to compute its authentication response normally, using the random nonce(s) received from the authentication server in the input to the response computation (e.g., if integrity checks pass). If checking of the integrity of the entire device fails, but if integrity check of a partial functionality of the device, such as, for example, integrity check of the 'distress/remediation functionality' succeeds, then the TrE may compute another value for the response, this time using a modified version of the received nonce. Where/how such a modification is performed may be known to the authentication server. Examples of such modification may include changing a bit or a number of bits in known positions of the original nonce. This way, both the device and the authentication server may, in addition to computing the original 'device-authenticating' response, compute the response using the modified nonce input. At the receiver (e.g., the authentication server) the server may check if the response it receives from the device matches the 'device-authenticating' response. If they do not match, instead of announcing an authentication failure outright, the authentication server may compare the received response to another value response computed using the modified nonce. If they match, then the authentication server may determine that even though the device as a whole may not be authenticated, certain functionality, such as the 'distress/remediation functionality' in the example, may be authenticated.

During the secure boot process, the device may learn of integrity failures of components by comparing each software component against a corresponding TRV, which may help ensure the bit-accuracy and source authenticity of a component.

A detected component check failure may be captured in an integrity check status information element. The structure of this status data may take any of a variety of forms for security purposes and for efficiency in reporting and diagnosis. This information may be read by present and subsequent boot-stage and runtime processes that support policy management procedures. A component-to-functionality map may be used to determine the dependencies of components to network functionalities and other functionalities of the device. Functionalities may be those functionalities which may be relied upon by a connecting entity, e.g., a network operator, or by value added applications supported by the device, e.g., mobile payments. The operator and/or applications service provider may define which functionalities may be used for the trusted operation of a device for specific tasks, such as bearing traffic, remediation, management operations or value added application features, and may set policies on the device indicating which functionalities may be used for specific network operations.

A set of network functionalities may come from a standard set of capabilities that are expected from a network operator and/or applications service provider. Functionalities may include radio technologies, layers in protocol stacks, network protocols, management capabilities, security and trust mechanisms, value added application features, etc.

Figure 9:
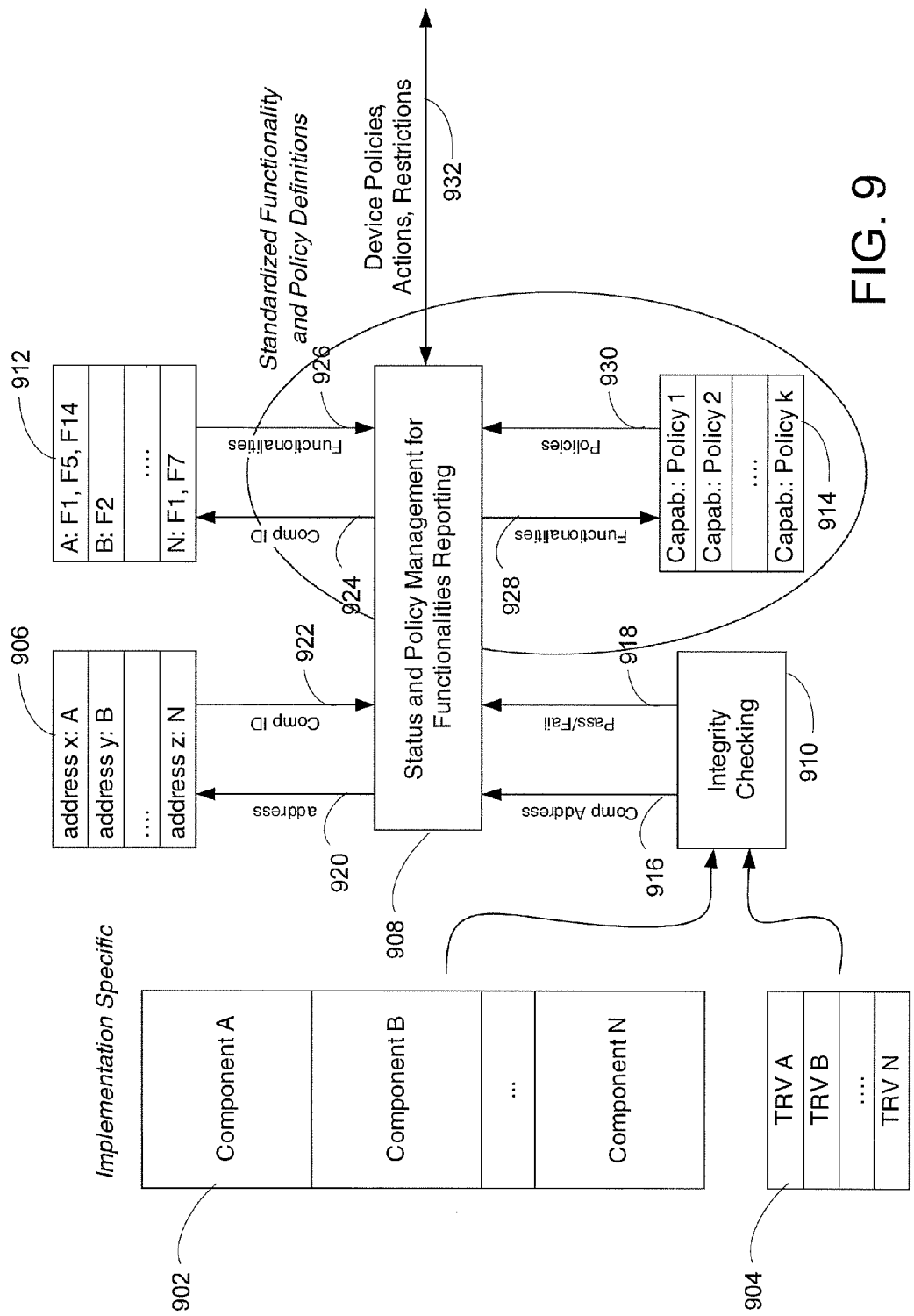
FIG. 9 is a diagram illustrating the use of tables or maps described herein during integrity checking and/or reporting.

The device's policy manager may use an embedded component-to-functionality table or map (as described herein) that may show the dependencies of network functionalities according to the device components. The use of such component-to functionality tables or maps during integrity checking and/or reporting is shown in FIG. 9. As illustrated in FIG. 9, a device may perform integrity checking at 910 by checking integrity measurements of components 902 with their corresponding TRVs 904. After the integrity check has been performed, a device policy management entity 908 may receive a component identifier (e.g., component address) at 916 of one or more components that have been integrity checked and an indication of whether each component passed or failed the integrity check at 918. The policy management entity 908 may determine the corresponding functionality associated with a component for sending to a network entity. For example, a failed functionality requiring remediation may be sent or indication of a validated functionality may be sent. For example, the policy management entity 908 may use the component address at 920 to retrieve the component identifier at 922 that corresponds to a given component. As illustrated in FIG. 9, the component identifier may be retrieved from a table 906 that includes a mapping of component addresses to component identifiers. The policy management entity 908 may use the component identifier at 924 to retrieve the component functionalities at 926 that correspond to a given component. The component functionalities may be retrieved from a table 912 that includes a mapping of component identifiers to component functionalities. The policy management entity 908 may use the determined functionalities (e.g., which have passed or failed the integrity check) to interact with a network entity at 932. For example, the policy management entity may perform integrity reporting, receive device policies, or receive actions and/or restrictions that correspond to one or more of the determined functionalities. Each functionality may be associated with one or more policies 930. The collection of one or more functionalities may collectively enable a specific capability within the device. These capabilities may be hierarchically layered. For example, a base layer capability may be a subset of the next capability layer which is a subset of the next capability layer, etc. Layering of capabilities may mirror a typical layer and chain of trust based secure boot sequence. A layer may be an arbitrary combination of functionalities which enable specific capabilities, or it may be a hybrid combination of a hierarchical layering and a specific combination of functionalities. The policy management entity 908 may use the component mapped functionalities at 928 to retrieve one or more policies at 930 that correspond to a given capability. The policies may be retrieved from a table 914 that includes a mapping of capabilities to various policies. The policies may be received from a network entity as illustrated at 932.

A failed component may result in one or more failed functionalities. The component-to-functionality map information embedded by the software development and build tools may support the policy manager in ascertaining a measure of the integrity check failure of functionalities and, thus, the reporting of failures in a standardized manner, which may be independent of implementation in terms of device and manufacturer, e.g., failure of an authentication function or a baseband radio protocol stack. On the device, this information may be protected against modification, assured by the immutable root of trust (RoT).

Policy management processes may utilize this information in the boot and run time environments. A policy management process on the device, using the results of the integrity checking process, may determine what network functionality has failed. Components may be identified by a reference (e.g., symbol table or memory address) that is available during boot time when the code is being checked by the loader. Code that is being checked may be quarantined from use in executable memory until after the integrity and source authenticity has been verified. Likewise, checked code may be protected (e.g., by secured execution and storage, hardware protection, cryptographic protection, virtualization, etc.) from the time it is loaded, checked, and during execution. Execution may be prevented by modification of the memory map, access privileges, etc. As an example, which is illustrated in tables 906 and 912 in FIG. 9, code at address location x may correspond to component A, which may map to network functionalities F1, F5, and F14. This code could be a primitive hashing function for instance, that several communication protocols rely upon. Integrity reporting and remediation may rely upon primitives that fail. So, these integrity reporting and remediation functionalities may be included in the network standardization list as underlying support functionalities.

A standardized list of functionality failures may provide fine-grained information to the network about the capabilities of the device. For remote devices, a reliable understanding of what the device may still accomplish may be useful in applying resources to remediate an issue. In the case of distress, having the ability to indicate failure in a secured and assured manner such that a network can validate the integrity of the distress indication itself (e.g., source, time, and accuracy) may prevent unnecessary use of expensive network resources under false alarms.

Figure 10:
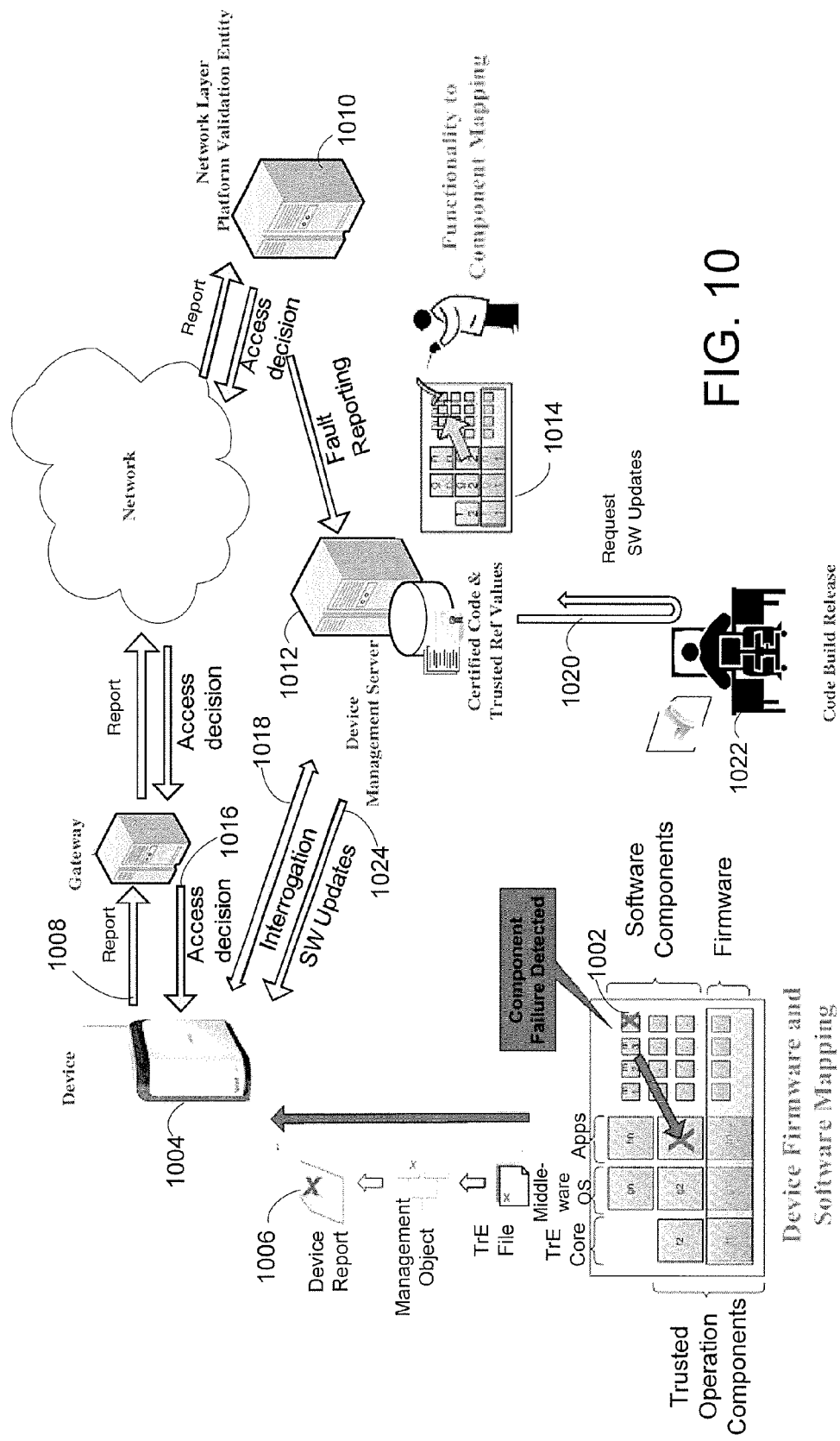
FIG. 10 is a diagram illustrating an exemplary overview of a reporting and remediation process as described herein.

FIG. 10 provides an exemplary overview of the reporting and remediation system, including exemplary system components. As illustrated in FIG. 10, a failure may be detected at 1002 on a component of device 1004. The failure may be indicated to the network. For example, the failure may be included in a device report 1006 that is reported to the network at 1008. The failure may be indicated as a failed network functionality associated with the failed component, for example. When a failure is reported to the network, the network may make fine-grained decisions on access control.

For example, the network platform validation entity 1010 may allow no access, partial access, or full access based upon the reported functionality check report 1006. The access decision may be received by device 1004 at 1016. If there are failures indicated in the device report 1006, the network platform validation entity may transfer the functionality report to the device management server 1012 which may determine the failed component(s) from the functionality-to-component mapping information 1014. This information may be used to remediate the device 1004 and reload the failed software component in the device 1004. For example, the device management server 1012 may interrogate the device 1004 at 1018 to narrow the scope of the failed functionality associated with the failed component. After the integrity failure is isolated to a section of the device 1004 for efficient remediation, the device management server 1012 may request a software update (e.g., a replacement component) at 1020, such as from the code build release entity 1022 for example. The device management server 1012 may provide the software updates at 1024 to the device 1004 to remediate the failed component. This form of abstraction of the specific failed code on a manufacturer's device reduces the burden on the operator to know the device (which it is connecting to) intimately, but at the same time may allow for granular access control and remediation decisions based upon the failed functionality.

Execution flow failures may be failures to components which may be invoked in the process chain. Execution of the components may maintain a high level of assurance, while expanding the capabilities of the device. Execution flow failures may be detected when the current verified process checks the integrity of the code (and possibly the configuration of the device) of the next process and finds that it fails. A failure in subsequent boot code may mean that the current trusted process may perform one or more of the following: lock down the current state as the last known good state; indicate the failure; maintain control of the process in a wait mode; pass control to a distress process; and/or pass control to the untrustworthy process. Authentication and identity keys for the failed stage may be locked out from further processes so the untrustworthy process may not be able to indicate a valid state to the network either through reporting (e.g., signed status) or authentication techniques (e.g., autonomous validation).

For efficiency, the failure report sent from the device to the network may comprise a minimal amount of information used to prompt action from the operator network validation function to perform fine-grained gateway access control and indicate device failure to the network's device management entity. The management entity may view manufacturer-specific information to determine the root cause of the failure and to determine what code may be remediated. The management entity may provide further information back to the network validation function to allow that entity to make further policy decisions on access control and/or remediation.

An example set of failed functionalities that may be included in a failure report is described below in Table 1.

TABLE 1

Example Integrity Violations for Failed Functionalities
(Failure Report Signed by TrE)
Failed Functionality List
(Code, Data, Parameters)

LTE
Baseband Domain

A functionality report may be sent of results, pass or fail. Table 2 provides an example of such a list.

TABLE 2

Example Integrity Violations for Functionalities
(Report Signed by a TrE)

| Functionality (Code, Data, Parameters) | Status (Failed or Passed) |
|---|---|
| Overall Result | |
| LTE | |
| UMTS | |
| Core Gateway Comms | |
| Management Comms | |
| WiFi | |
| UICC/Smartcard Channel | |
| Application | |
| Domain | |
| Baseband Domain | |

The functionality report may be transported in a payload during authentication on an alternate channel, such as that used for gateway authentication, so even if the gateway authentication fails the report may be sent as a payload in the authentication sequence. The payload may be signed by the trusted execution environment of the device.

The trusted execution environment (TrE) may have its own functionality field (e.g., for convenience or redundancy purposes). However, if the list of functionalities or distress payload is signed by the TrE or an authentication key is protected by the TrE, then integrity of the TrE may be known upon contact to the network. The signing key(s) of the TrE may be protected by a fail-secure sealing method. That is, if the TrE is compromised, then its key(s) may not be available (e.g., not to the device or its internal functions and interfaces, not to the I/O and test ports, and not to external network entities).

In the event of a failure or alarm, a serving network entity may verify that a distressed device has a feature to reliably report failures and the mechanism of a distressed device is not failing. Two forms of assurance may indicate to the network that a reporting mechanism is reliable. One may come in the static form of a trusted third party assurance, such as a certificate that a specific type of device complies with a certain set of trustworthy reporting capabilities. This assurance may provide information about the device capabilities and level of robustness (or trustworthiness) for handling and sending of alarms and messages of failure conditions. The network operator may use the certified capabilities to establish procedures to respond appropriately and automatically in the event of a failure alarm.

Another form of assurance may come through online transactions with the device. The mechanisms within the device may provide an indication of the integrity of the reporting mechanism at the time of the failure event. This internal capability may relate to the static form of assurance in that it may allow a third party to provide certificates of compliance.

Various protocol flows may be described herein for device distress and remediation in the context of an H(e)NB. However, the concepts described herein are not limited to such embodiments and may be applied to any communications device. According to an example embodiment, depicted in FIG. 16, device integrity information may be sent from a H(e)NB to a management server (H(e)MS) through the SeGW. According to another example embodiment, depicted in FIG. 17, the H(e)NB may connect directly to the management server (H(e)MS). According to another example embodiment, depicted in FIGS. 18A and 18B, device integrity checking may be augmented to allow fine-grained access control in the event of a partial failure. The procedures may allow for remediation of a code or data block under control of the DRF that may be changed by the DRF using the remediation data received from the remediation entity in the network. That may include changes of software and also software or hardware configuration data, if the system architecture allows for such changes. The illustrated flows may be directed towards software remediation, but are not limited thereto.

Interrogation may be performed between a network management entity and the device itself, during which detailed information about a device's failed integrity is extracted at a finer granularity than initially reported. This information may lead to the discovery of the cause of a failure, indicate what part of a component failed, and allow for finer grained repair of the code and/or configuration for efficient device management by reducing the size of the software download and thus balancing the need for network bandwidth and size of code download. According to an example embodiment, a managed network device using the IP internet protocol may utilize TR-069 (CPE WAN) for device management purposes. This protocol may provide access to an "auto configuration server" (ACS). The ACS application may use several capabilities in a protocol stack as illustrated in Table 3.

TABLE 3

| TR-069 Protocol Stack |
| --- |
| ACS |
| RPC Methods |
| SOAP |
| HTTP |
| SSL/TLS |
| TCP/IP |

This stack may be accessible to the RoT process, which may provide high assurance distress indication to a TR-069 connected management server. However, a complete list of features of each layer may not be used in a distress situation, so the stack may be trimmed to perform those procedures used to securely bootstrap the device back to full management and device functionality.

Figure 11:
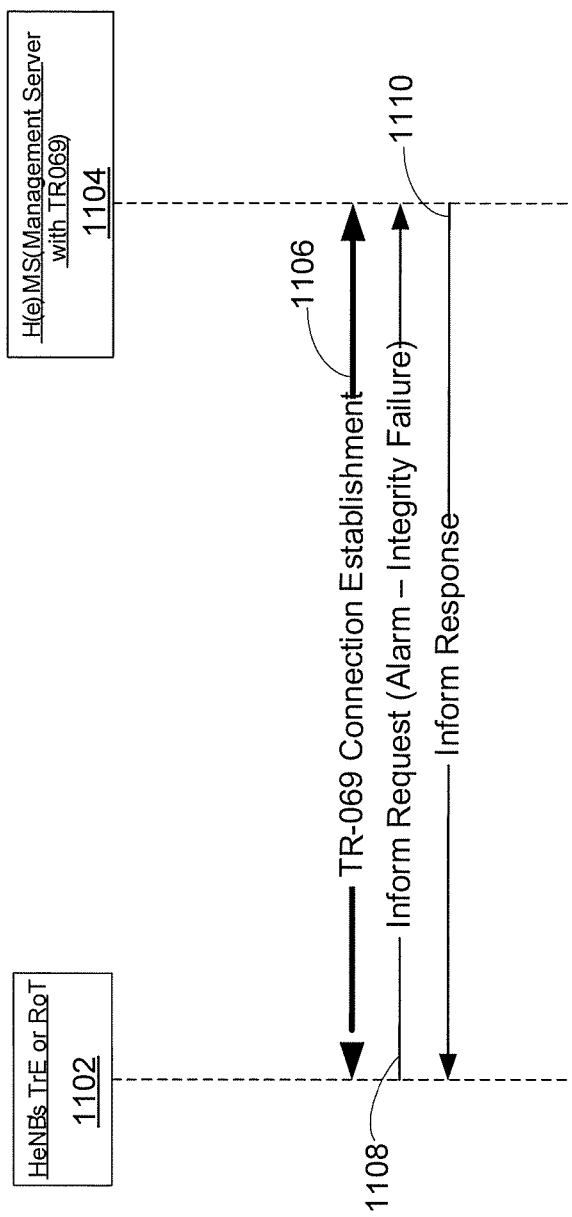
FIG. 11 illustrates an exemplary call flow diagram for gathering information at a device to determine actions that may be performed.

FIG. 11 illustrates an exemplary call flow diagram for gathering information at a device to determine actions that may be performed. When an integrity failure occurs the sequence illustrated in FIG. 11 may occur between a device (e.g., a TR-069 device), such as H(e)NB 1102, and a network entity, such as H(e)MS 1104. At 1106, a connection (e.g., TR-069 connection) may be established between the H(e)NB 1102 and the H(e)MS 1104. For example, the H(e)NB 1102 may establish the connection at 1106 using its TrE or RoT. At 1108, the H(e)NB 1102 may report the integrity failure(s) to the H(e)MS 1104, e.g., by using an Information Request and/or an alarm. The H(e)MS 1104 may receive the alarm at 1108, and it may respond to the H(e)NB 1102 with an Information Response message (e.g., a TR-069 inform response) at 1110.

Coarsely, each software component of a device may have a corresponding TRV. As described herein, when a component fails to match the reference, then the component may have an integrity failure. Some components may be quite large. For example, operating systems may be delivered as a single monolithic code block with a single TRV.

Figure 12:
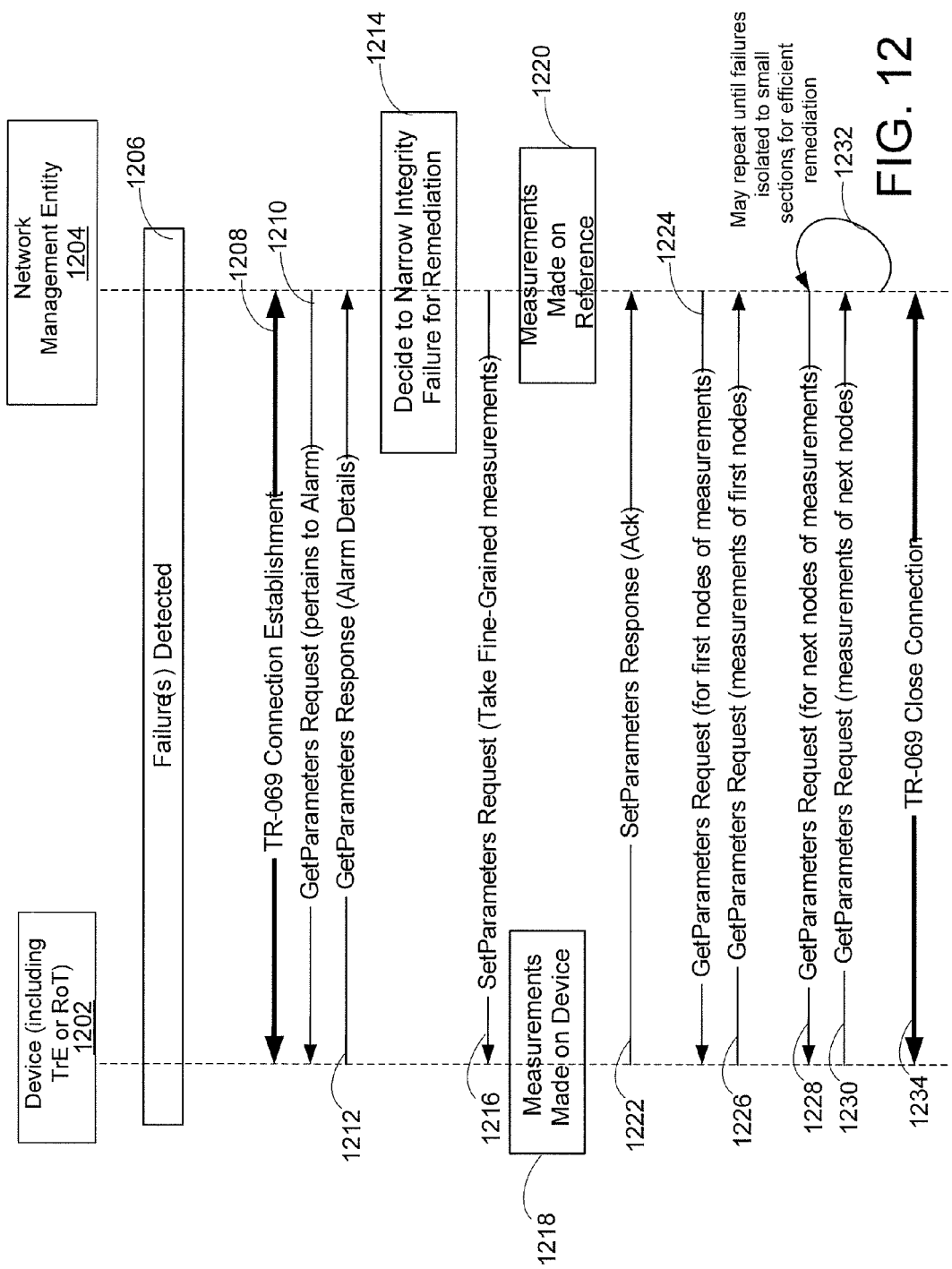
FIG. 12 illustrates an exemplary call flow diagram for interrogation between a device and a network entity.

FIG. 12 illustrates an exemplary call flow diagram for interrogation to isolate the location(s) of the fault(s) in a component. During the interrogation process, the network management entity 1204, such as an H(e)MS for example, may interact with the device 1202, such as an H(e)NB for example, to gather additional information to determine actions that may be performed to remediate detected failures. According to one exemplary embodiment, the device 1202 may use a TrE or an RoT to interact with the network management entity 1204.

The network management entity 1204 may decide to perform a monolithic download of an entire code image. The download may consist of a reload of the current code image or an updated code image. Since the entire image may be downloaded to the network management entity 1204, the TRVs (original or updates) may be included in the downloaded image. The network management entity 1204 may decide rather than make a monolithic download of the entire code image, to download components reported as failed. Since an entire component, including TRVs in the case of an update, may be downloaded to the device 1202, the image may be a reload of the current component or an updated component. In the case of an updated component, the client management entity may manage the existing code image to ensure the integrity and structure of the entire image remains intact.

As illustrated in FIG. 12, an integrity failure may be detected at 1206. For example, the integrity failure may be detected in a component of the device 1202 and an integrity check report may be sent to network management entity 1204, as described herein. At 1208, a connection (e.g., a TR-069 connection) may be established between the device 1202 and the network management entity 1204. At 1210, the network management entity 1204 may send a request to device 1202 for parameters that pertain to an alarm associated with an integrity failure at the device 1202. The device 1202 may send a parameter response to network management entity 1204 at 1212 that includes alarm details. At 1214, the network management entity 1204 may decide to narrow the integrity failure of a component on a device for remediation. To narrow the integrity failure, the network management entity 1204 may send a parameter request to device 1202, at 1216, to take more fine-grained measurements. At 1218, device 1202 may make measurements of components on the device 1202. At 1220, the network management entity 1204 may make measurements on reference. For example, the network management entity 1204 may generate reference values on-the-fly, as the measurements of the components might not be provided by a component maker and may be made by the device 1202 with dynamic granularity. The measurements on reference made by network entity 1204, for example, may be compared to the measurements of components made by device 1202. The device 1202 may send a parameter response at 1222, indicating to the network management entity 1204 that the device 1202 has taken, or will take, more fine-grained integrity measurements.

At 1224 the network management entity may send a parameter request for integrity measurements of a first node(s) (e.g., component(s)). At 1226, the device 1202 may send a parameter response to the network management entity 1204, indicating the integrity measurements of the first node(s). The network management entity 1204 may send a parameter request at 1228 for measurements of a next node(s) (e.g., component(s)) from device 1202. The measurements of the next node(s) may be requested based on the measurements of the first node(s) received from the device 1202 for example. Additionally, the next node(s) may be portions or subcomponents of the first node(s). At 1230, the device 1202 may send a parameter response to network management entity 1204 that includes the requested measurements of the next node(s). The parameter requests from the network management entity 1204 and the parameter responses from the device 1202 may repeat, as indicated at 1232 for example, until an integrity failure is isolated to a section (e.g., component, function, or portion thereof) of the device 1202, for efficient remediation. After the integrity failure is identified and isolated, the connection (e.g., TR-069 connection) between the device 1202 and the network management entity 1204 may be closed at 1234.

Figure 13:
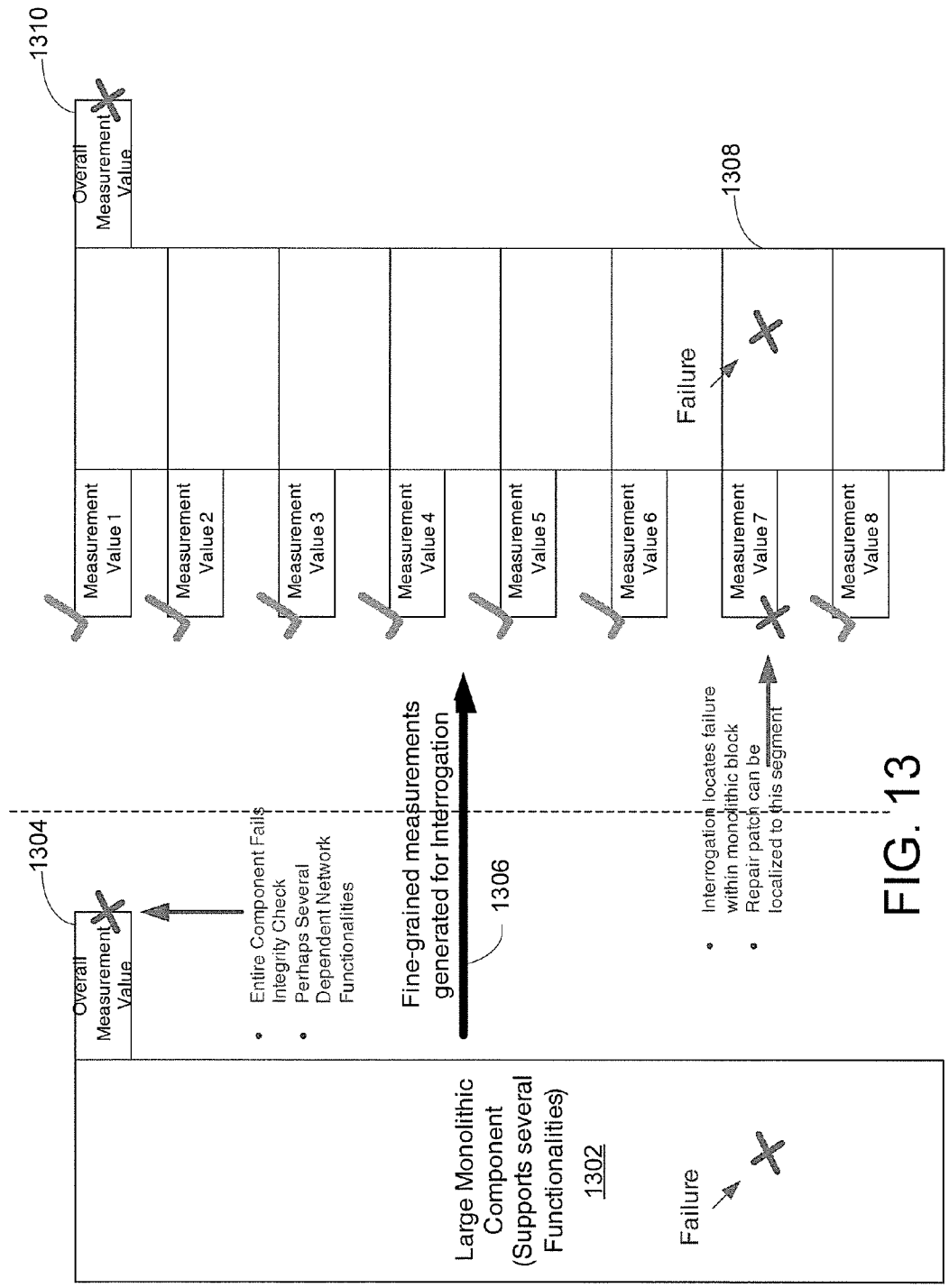
FIG. 13 illustrates an example of an interrogation performed on a component of a wireless communications device.

The network management entity 1204 may decide to interrogate even further after detecting a failure and make multiple measurements of the monolithic block or component. The device 1202 may perform the integrity measurements and/or arrange them in a data structure for quick reference, e.g., a binary tree. The network management entity 1204 may do the same. Such a structure may reveal multiple failures in a single block so that the network management entity 1204 may quickly determine what pieces of the monolithic block or component failed integrity checking, which may narrow the scope of the impact and potentially reduce the software download traffic. As illustrated in FIGS. 12 and 13, the details of a modified block may be checked to isolate where it has been corrupted with finer granularity than the TRV for a component or monolithic block.

With the fine-grained information narrowing the range for a component failure, the network management entity may create a download image for that segment of code, rather than for the entire block. For example, as illustrated in FIG. 13, a failure may occur within a large monolithic component 1302 that supports several functionalities. The overall measurement value 1304 may be associated with the entire component 1302, as the entire component 1302 may fail the integrity check. Fine grained measurements may be generated at 1306 through interrogation between the device and the network management entity. Interrogation may cause more fine grained integrity measurements to locate the failure of a segment within the large monolithic component 1302, such as segment 1308 for example. After interrogation, the overall measurement value 1310 that results from integrity checking may include measurement value 7 of segment 1308, rather than the measurement value 1304 associated with the entire large monolithic component 1302 for example. After the failure is identified at segment 1308, a repair patch may be localized to this segment. The repair patch may include instructions on repairing the failure at segment 1308 using other segments within the large monolithic component 1302 that passed the integrity check.

The number of integrity measurements generated may be limited based on the type of device. When the subcomponent downloaded is a reload of a current component, no additional information may be used by the device to perform the reload. However, if the subcomponent download is an update to the existing component, then an updated TRV for that subcomponent may be included in the download. The device client and the network management entity may be synchronized to produce the same updated component image, such that the updated TRV matches the hash of the updated component image. The device management client may manage the existing code image to ensure the integrity of the entire image remains intact.

The interrogation process may result in a modification of the network's version of the reported failed functionality list which may be fed back to the network validation, authentication, and/or gateway entities to modify the network access controls on the device.

Figure 14:
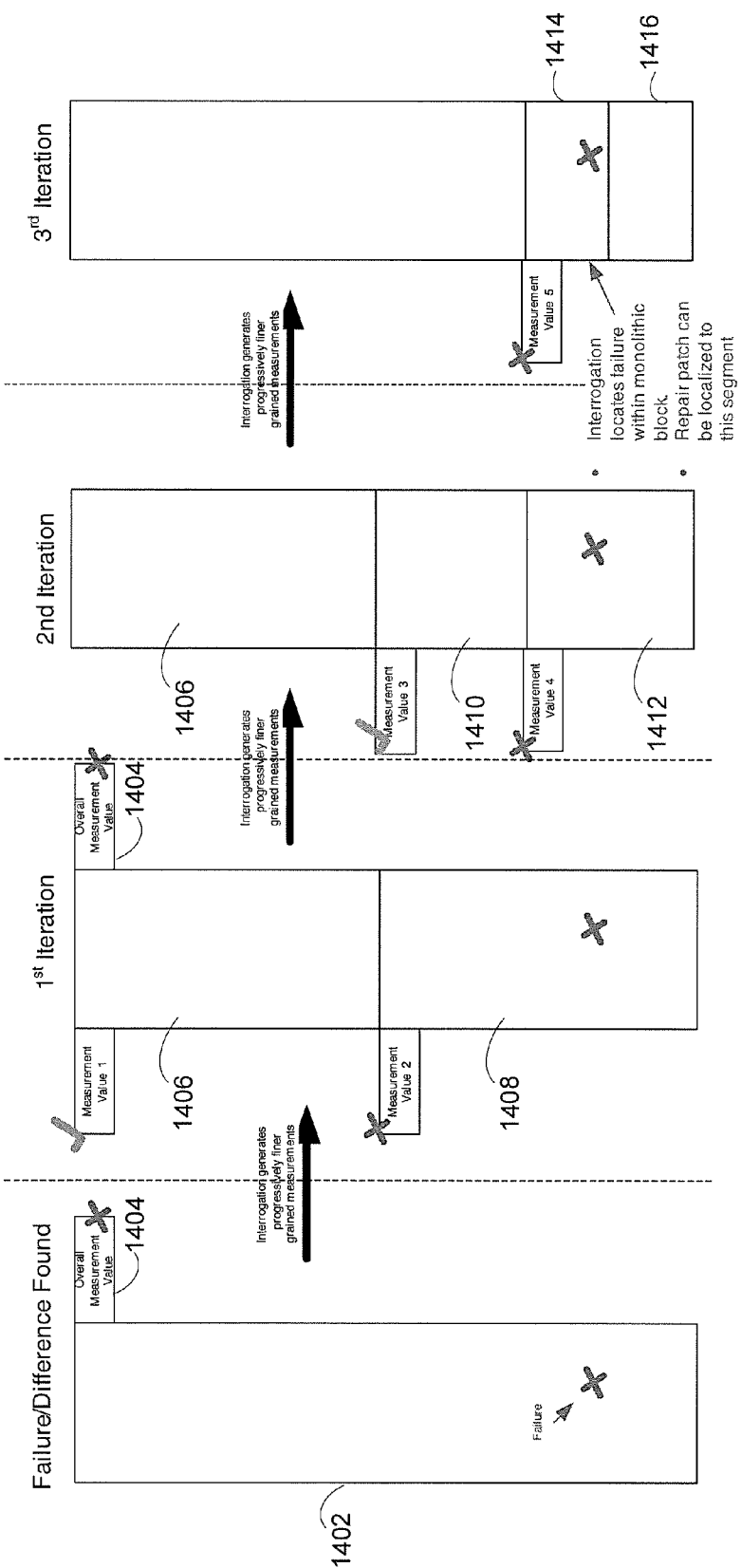
FIG. 14 illustrates another example of an interrogation performed on a component of a wireless communications device.

The interrogation process may isolate component failure by using an iterative measurement approach whereby the network management entity and device may progressively generate measurements, narrowing the field of view on the image on those subsections that indicate a failure. This method may reduce the number of measurement values used for a given resolution thereby allowing for a trade-off between measurements and resolution for memory constrained devices. One example embodiment of this interrogation process may be illustrated in FIG. 14 for example. As illustrated in FIG. 14, a failure may be found in component 1402, and the overall measurement value 1404 may be associated with the entire component 1402. The device and the network may perform an interrogation after the failure is found in component 1402 and, based on the interrogation, the device may perform a first iteration of measurements on component 1402. For example, in the first iteration of measurements, the device may perform independent measurements on subsection 1406 and subsection 1408 of component 1402. As a result, the device may determine that subsection 1406 passes the integrity check, while subsection 1408 comprises the cause of the integrity failure. This may be indicated by measurement value 1, associated with subsection 1406, and measurement value 2, associated with subsection 1408. As subsection 1408 still fails the integrity check, the overall measurement value 1404 may still indicate that the component 1402 comprises an integrity failure.

While the integrity failure is narrowed down to subsection 1408, the device and the network may perform additional interrogation procedures to generate progressively finer grained measurements for remediation. As a result of the interrogation, the device may perform a second iteration of measurements on component 1402. As illustrated in FIG. 14, the second iteration of measurements may be performed on subsection 1408, as this was the subsection determined to be the cause of the integrity failure. The device may perform independent measurements on subsections 1410 and 1412 in the second iteration, which may produce measurement value 3 and measurement value 4, respectively. Subsections 1410 and 1412 may be subsections of subsection 1408. Measurement value 3 may indicate that subsection 1410 of subsection 1408 passes the integrity check. However, measurement value 4 may indicate that subsection 1412 fails the integrity check, and comprises the cause of the integrity check failure of component 1402.

While the integrity failure is narrowed down into subsection 1412, the device and the network may perform additional interrogation procedures to generate progressively finer grained measurements for remediation. For example, the device may perform a third iteration of measurements. The third iteration of measurements may be performed on subsection 1412, as subsection 1412 was the subsection determined to be the cause of the integrity failure after the second iteration of measurements. As illustrated in FIG. 14, the device may perform independent measurements on subsections 1414 and 1416. The device may determine that subsection 1414 comprises the cause of the integrity failure. This may be indicated by measurement value 5 for example. After the third iteration of measurements, the functionality associated with subsection 1414 may be sent to the network as corresponding to the fine-grained subsection of component 1402 that comprises the cause of the integrity failure. As a result of the interrogation, the network may determine a repair patch (e.g., replacement or repair of the subcomponent) that may be localized to subsection 1414 and send the repair patch to the device for replacement or repair of subsection 1414. While FIG. 14 illustrates three iterations of measurements performed at the device as a result of the interrogation between the network and the device, any number of iterations of measurements may be performed to isolate the portion of the component comprising the integrity failure. In an example embodiment, the number of iterations is based on the service provider. In another example embodiment, the device management server maintains a database of failures corresponding to various criteria including device identifications and software release numbers. The failure information, for example, may allow the device management server to assess interrogation strategies.

Comparisons between the cost of the network communication, measurement computation, and loading of values for measurement computation may be weighed in determining the value of this progressive approach versus other algorithms such as complete generation of a tree.

In the progressive method, the measurements may be taken as the field of failure is narrowed. Code/data may be measured repeatedly. Hybrid approaches may be used to reduce the amount of code/data that may be re-measured, which may for example initially divide the image into some optimal number of subsections. The failed section(s) may be resolved further, progressively, by dividing the image by some factor. The factor may be determined per iteration and based upon the other time delays and performance considerations to optimize the rate of failure isolation and determination over the network using the least bandwidth and least power consumption. To expedite the failure isolation process, the network may pre-generate a set of expected hashes in a data structure such as a hash tree for a given component failure and send the device this tree of sub-TRV measurements. This may allow the device to make comparisons in this progressive approach up to the tree's highest resolution. The network may determine if more resolution is needed to optimize the remediation procedure (e.g., based on the number of devices that need to be corrected). If more resolution is needed, then a new tree starting at a more accurate location may be generated and sent by the network, or, the comparison may be performed interactively.

In the case of a software or data update, a software management server may perform a code/data update on a simple binary difference in files to perform updates. The device management client may receive the binary update and perform modifications to the complete code image to ensure its integrity. The same principles of binary differences may be extended to include interrogation techniques for software management entities to reduce the amount of traffic during a software update. That is, the software update procedure may encompass many of the same remediation techniques described herein, including the binary tree search.

Figure 15:
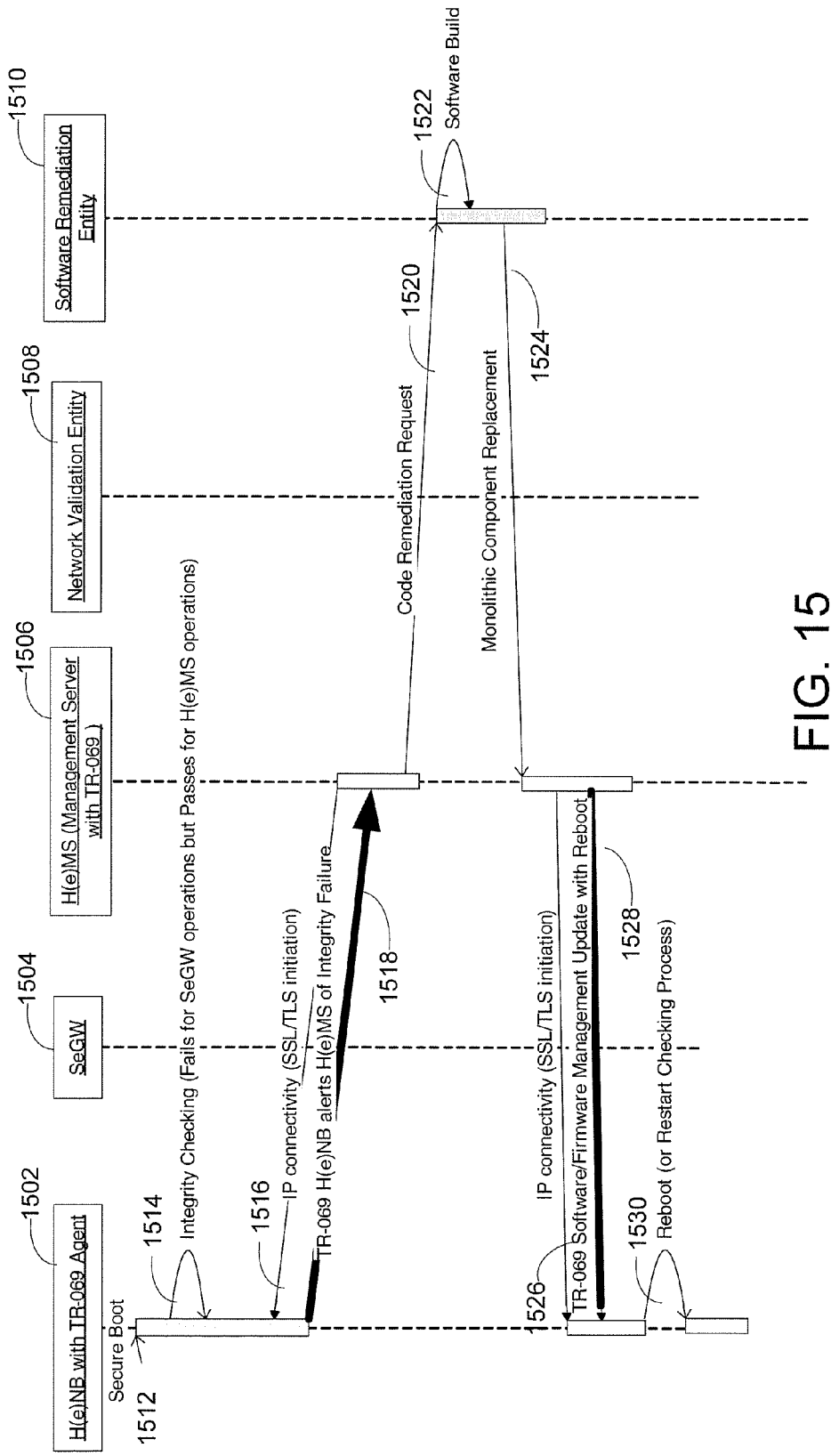
FIG. 15 illustrates an exemplary call flow diagram relating to a distress alarm and monolithic code replacement.

FIG. 15 illustrates an exemplary call flow diagram relating to a distress alarm and monolithic code replacement. While the call flow is described using a H(e)NB, other network devices may be used. The call flow sequence may include one or more of the steps described herein. For example, as illustrated in FIG. 15, the H(e)NB 1502 may perform a secure boot sequence at 1512. During the integrity checking phase 1514, the H(e)NB 1502 may find an integrity failure in the code used for operation, and therefore, the H(e)NB's 1502 TrE may not make available the private key for SeGW 1504 authentication. However, the TrE may recognize that the H(e)NB 1502 passes for H(e)MS 1506 operations. For example, the H(e)NB 1502 may be able to send an alarm to the H(e)MS 1506 and/or may make available the private key for H(e)MS 1506 authentication for procedures of which the H(e)NB 1502 is capable. H(e)MS 1506 may establish IP connectivity (e.g., SSL/TLS initiation) with H(e)NB 1502 at 1516. At 1518, H(e)NB 1502 may alert the H(e)MS 1506 of integrity failure. For example, the H(e)MS 1506 may receive a distress alarm from H(e)NB 1502 and send a code remediation request at 1520 (e.g., for a reload or an update), to a software remediation entity 1510. The software remediation entity 1510 may perform a software build at 1522. At 1524, the software remediation entity 1510 may provide a monolithic component replacement to H(e)MS 1506. For example, the software remediation entity 1510 may provide a monolithic remediation image to the H(e)MS 1506. The H(e)MS 1506 may establish a secure connection with the H(e)NB 1502. For example, the H(e)MS 1506 may establish a secure IP connection (e.g., via SSL/TLS initiation) with the H(e)NB 1502 at 1526. The H(e)NB 1502 and H(e)MS 1506 may authenticate to allow for a software/firmware download to repair the H(e)NB 1502. At 1528, the H(e)MS 1506 may update the software/firmware of the H(e)NB 1502 and may reboot the H(e)NB 1502. H(e)NB 1502 may reboot and/or restart integrity checking at 1530.

Figure 16:
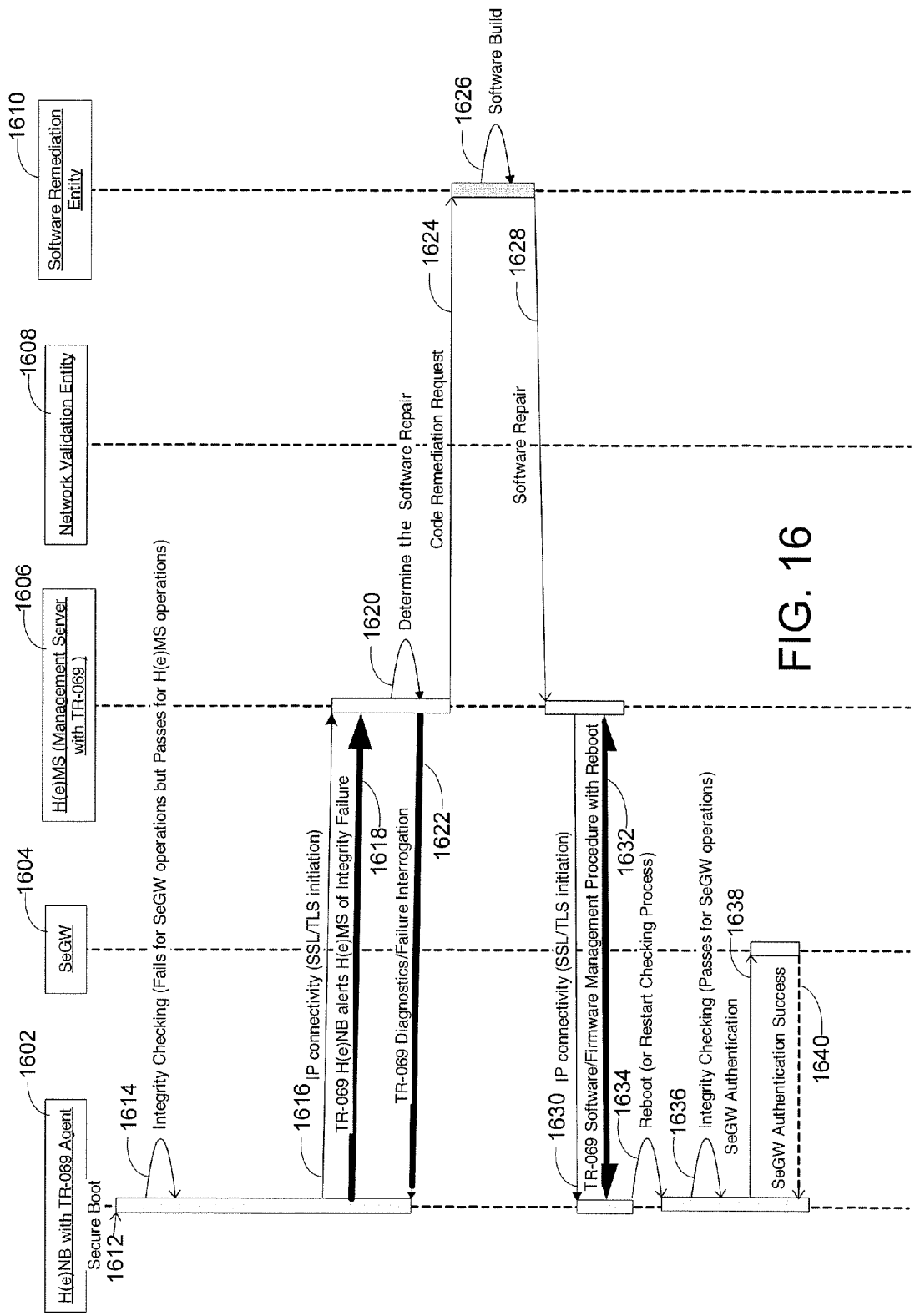
FIG. 16 illustrates an exemplary call flow diagram relating to remote software distress/remediation.

FIG. 16 illustrates an exemplary call flow diagram relating to remote software distress/remediation, where the H(e)NB 1602 notifies the H(e)MS 1606 of distress. The call flow sequence may include one or more of the steps described herein. Additionally, while the call flow is described using a H(e)NB, other network devices may be used. As illustrated in FIG. 16, the H(e)NB 1602 may perform a secure boot sequence at 1612. During the integrity checking phase at 1614, the H(e)NB's 1602 TrE may find a failure in the code for normal operation, and therefore, the H(e)NB's 1602 TrE may not make available the private key for SeGW 1604 authentication. However, the TrE may recognize that the H(e)NB 1602 may be able to connect to the H(e)MS 1606 securely and so the TrE may make available the private key for H(e)MS 1606 authentication for procedures of which the H(e)NB 1602 is capable. The H(e)NB 1602 may not (or in some failures cannot) attempt to authenticate with the SeGW 1604. At 1616, the H(e)NB 1602 may establish IP connectivity (e.g., a secure SSL/TLS session) with the H(e)MS 1606. At 1618, the H(e)NB 1602 may alert the H(e)MS 1606 of the H(e)NB 1602 integrity checking status (e.g., integrity failure). The H(e)MS 1606 may verify the authenticity of the H(e)NB 1602 integrity information by authentication or by signature verification of the TrE-signed integrity status payload information for example. If the integrity checking status indicates that there is an integrity failure at the H(e)NB 1602, the H(e)MS 1606 may determine, at 1620, a software repair for the indicated failure. This software repair may include further interrogation of the integrity failure. For example, at 1622 the H(e)MS 1606 may diagnose and/or interrogate the H(e)NB 1602. The H(e)MS 1606 may determine in detail the cause (e.g., location) of the failure and at 1624 the H(e)MS 1606 may send a code remediation request, that may be for either a reload or an update, to a software remediation entity 1610. The software remediation entity 1610 may perform a software build at 1626 and send the software repair information to the H(e)MS 1606. For example, the software repair information may include a remediation image. The H(e)MS 1606 may establish a secure connection (e.g., via IP connectivity) with the H(e)NB 1602 at 1630. The H(e)NB 1602 and H(e)MS 1606 may authenticate to allow for a software/firmware download to repair the H(e)NB 1602. At 1632, the H(e)MS 1606 may download the software/firmware of the H(e)NB 1602 and/or restart the H(e)NB 1602. At 1634, the H(e)NB 1602 may perform a secure boot sequence and/or restart the integrity checking process. During the integrity checking phase at 1636, the H(e)NB's 1602 TrE may find that the integrity checks pass for SeGW 1604 operations and make available the private key used for SeGW 1604 authentication. The H(e)NB 1602 and SeGW 1604 may mutually authenticate at 1638 and the SeGW 1604 may indicate to H(e)NB 1602 that authentication was successful at 1640.

Figure 17:
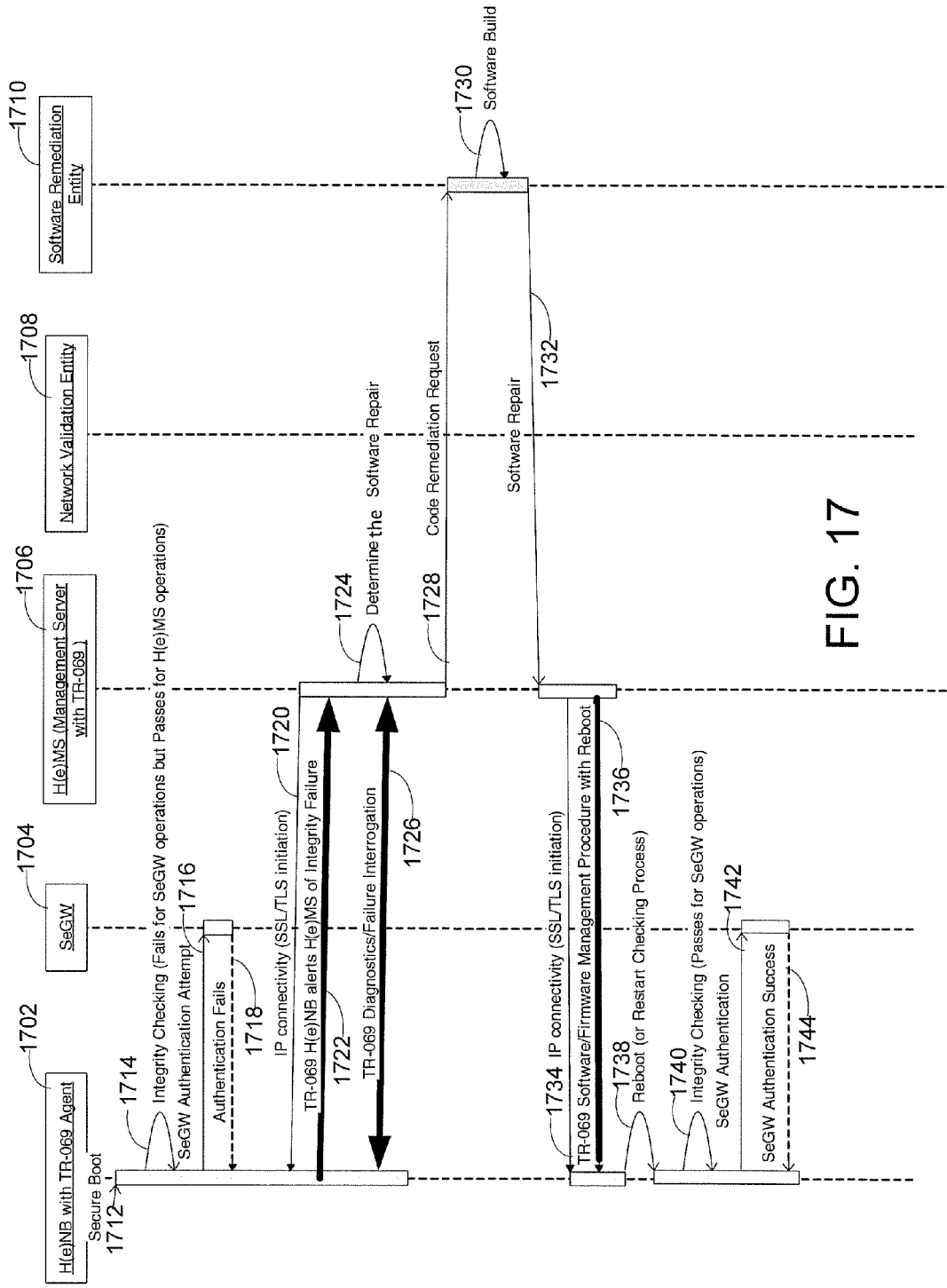
FIG. 17 illustrates an exemplary call flow diagram relating to remote software distress/remediation, with a SeGW authentication attempt.

FIG. 17 illustrates an exemplary call flow diagram relating to remote software distress/remediation, with a SeGW authentication attempt. The call flow sequence may include one or more of the steps described herein. Additionally, while the call flow is described using a H(e)NB, other network devices may be used. As illustrated in FIG. 17, the H(e)NB 1702 may perform a secure boot sequence at 1712. During the integrity checking phase at 1714, the H(e)NB 1702 may find an integrity failure in the code used for SeGW 1704 operation, and therefore, the H(e)NB's 1702 TrE may not make available the private key for SeGW 1704 authentication. However, the TrE may recognize that the H(e)NB 1702 may be able to connect to the H(e)MS 1706 securely and may make available the private key(s) for H(e)MS 1706 authentication for procedures of which the H(e)NB 1702 is capable. The H(e)NB 1702 may attempt to authenticate to the SeGW 1704 at 1716, such as by using the IKEv2 protocol for example, but may fail (e.g., because the private authentication key is not available). At 1718, an indication may be provided to H(e)NB 1702 that authentication with SeGW 1704 has failed. The H(e)NB 1702 may establish a secure IP connection (e.g., via SSL/TLS initiation) with the H(e)MS 1706 at 1720. For example the secure IP connection may be established based on the failed authentication attempt between the H(e)NB 1702 and the SeGW 1704. At 1722, the H(e)NB 1702 may alert the H(e)MS 1706 of the H(e)NB 1702 integrity checking status (e.g., integrity success or failure). The H(e)MS 1706 may verify the authenticity of the H(e)NB 1702 integrity information by authentication or by signature verification of the TrE-signed integrity status payload information. If the integrity checking status indicates that there is an integrity failure of a component at the H(e)NB 1702, the H(e)MS 1706 may determine a software repair for the indicated failure at 1724. This software repair may include further interrogation of the integrity failure. For example, the H(e)MS 1706 may diagnose and/or interrogate the H(e)NB 1702 at 1726. The H(e)MS 1706 may determine in detail the cause of the failure and send a code remediation request (e.g., for a reload or an update) at 1728 to software remediation entity 1710. The software remediation entity 1710 may perform a software build at 1730 and provide the software repair (e.g., remediation image) to the H(e)MS 1706 at 1732. At 1734, the H(e)MS 1706 may establish a secure IP connection (e.g., SSL/TLS initiation) with the H(e)NB 1702. The H(e)NB 1702 and H(e)MS 1706 may authenticate to allow for a software/firmware download to repair the H(e)NB 1702. The H(e)MS 1706 may download the software/firmware of the H(e)NB 1702 at 1736 and restart the H(e)NB 1702. The H(e)NB 1702 may perform a secure boot sequence and/or restart integrity checking at 1738. During the integrity checking phase at 1740, the H(e)NB 1702 may find that the integrity checks pass and make available the private key for SeGW 1704 authentication. The H(e)NB 1702 and SeGW 1704 may mutually authenticate at 1742 and the SeGW 1704 may indicate successful authentication at 1744.

Figure 18A:
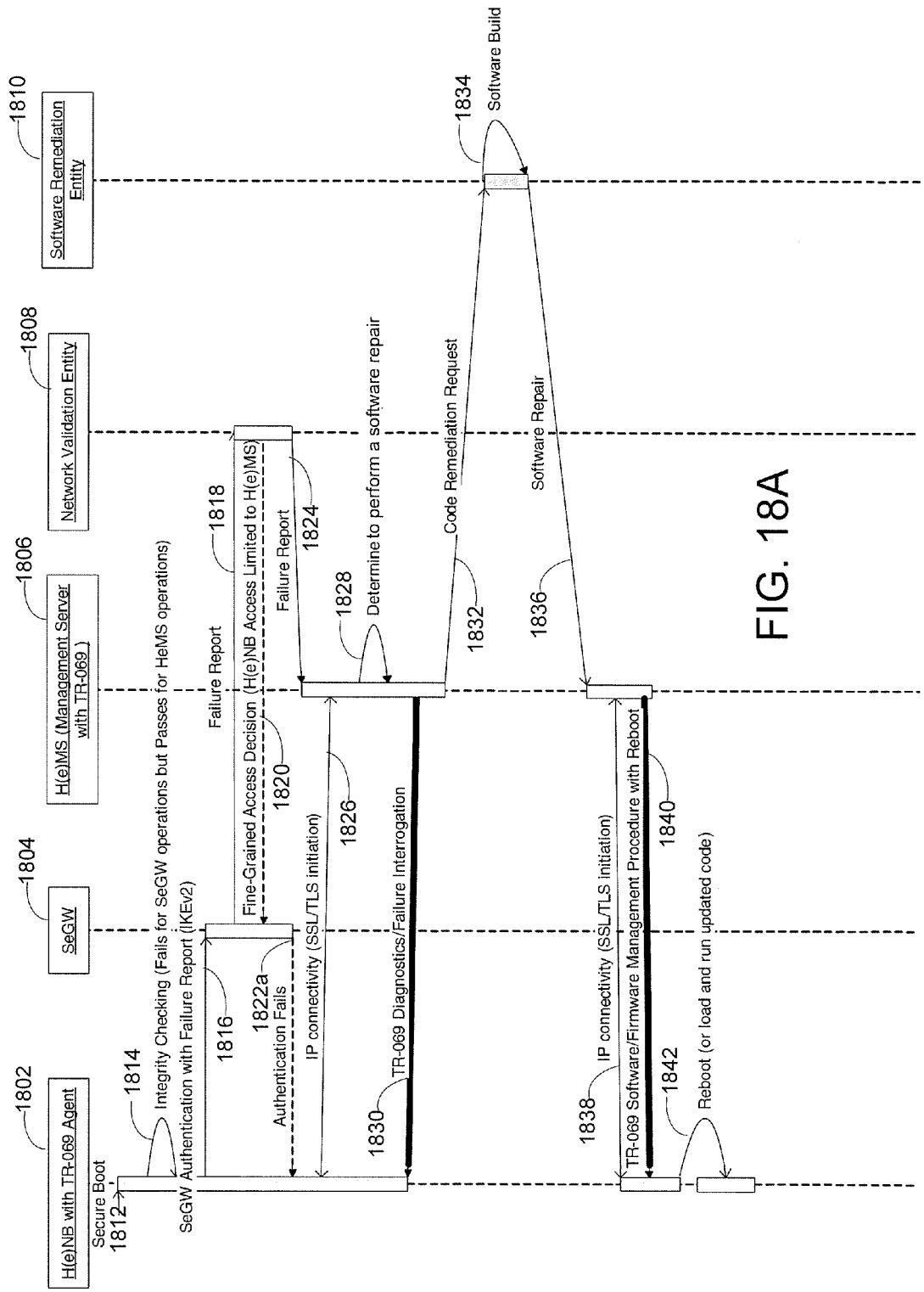
FIG. 18A illustrates an exemplary call flow diagram relating to remote software distress/remediation, where the network may disallow authentication through a SeGW.

FIG. 18A illustrates an exemplary call flow diagram relating to remote software distress/remediation, where the network may disallow authentication through the SeGW. The call flow sequence may include one or more of the steps described herein. Additionally, while the call flow is described using a H(e)NB, other network devices may be used. As illustrated in FIG. 18A, the H(e)NB 1802 may performs a secure boot sequence at 1812. During the integrity checking phase at 1814, the H(e)NB 1802 may find a failure in the code used for operation, and therefore, the H(e)NB's 1802 TrE may not make available the private key for SeGW 1804 authentication. However, the TrE may recognize that the H(e)NB 1802 may be able to connect to the H(e)MS 1806 securely and so makes available the private key(s) for H(e)MS 1806 authentication for procedures of which the H(e)NB 1802 is capable. At 1816, the H(e)NB 1802 may attempt to authenticate to the SeGW 1804 (e.g., using the IKEv2 protocol) but fails (e.g., because private key is unavailable). The H(e)NB 1802 may provide TrE-signed information about the integrity of the H(e)NB 1802 during the authentication attempt. At 1818, the SeGW 1804 may forward the integrity information (e.g., a failure report) to the network validation entity 1808. The network validation entity 1808 may decide, based on the information it receives to disallow some H(e)NB 1802 traffic through the SeGW 1804 and send a fine-grained access decision at 1820 indicating that some, or all, of the H(e)NB 1802 traffic is limited to the H(e)MS 1806. At 1822a, the SeGW 1804 may send an indication of the authentication failure. At 1824, the network validation entity 1808 may send H(e)NB 1802 integrity information to the H(e)MS 1806 for remediation purposes. The H(e)MS 1806 may establish a secure IP connection (e.g., via SSL/TLS initiation) with the H(e)NB 1802 at 1826. At 1828, the H(e)MS 1806 may determine to perform a software repair, for example, based on the authentication failure. The H(e)NB 1802 and the H(e)MS 1806 may authenticate to allow for diagnostics and interrogation by the H(e)MS 1806 at 1830. The H(e)MS 1806 may determine in detail the cause of the failure and send a code remediation request at 1832 (e.g., for a reload or an update) to a software remediation entity 1810. The software remediation entity 810 may perform a software build at 1834 to build a replacement software component (e.g., or portion thereof) for H(e)NB 1802. At 1836, the software remediation entity 1810 may provide the software repair information (e.g., remediation image) to the H(e)MS 1806. The H(e)MS 1806 may establish a secure IP connection (e.g., via SSL/TLS initiation) at 1838 with the H(e)NB 1802. The H(e)NB 1802 and H(e)MS 1806 may authenticate to allow for a software/firmware download to repair the H(e)NB 1802. The H(e)MS 1806 may download the software/firmware of the H(e)NB 1802 at 1840. At 1842, the H(e)NB 1802 may reboot and/or load and run the downloaded code.

Figure 18B:
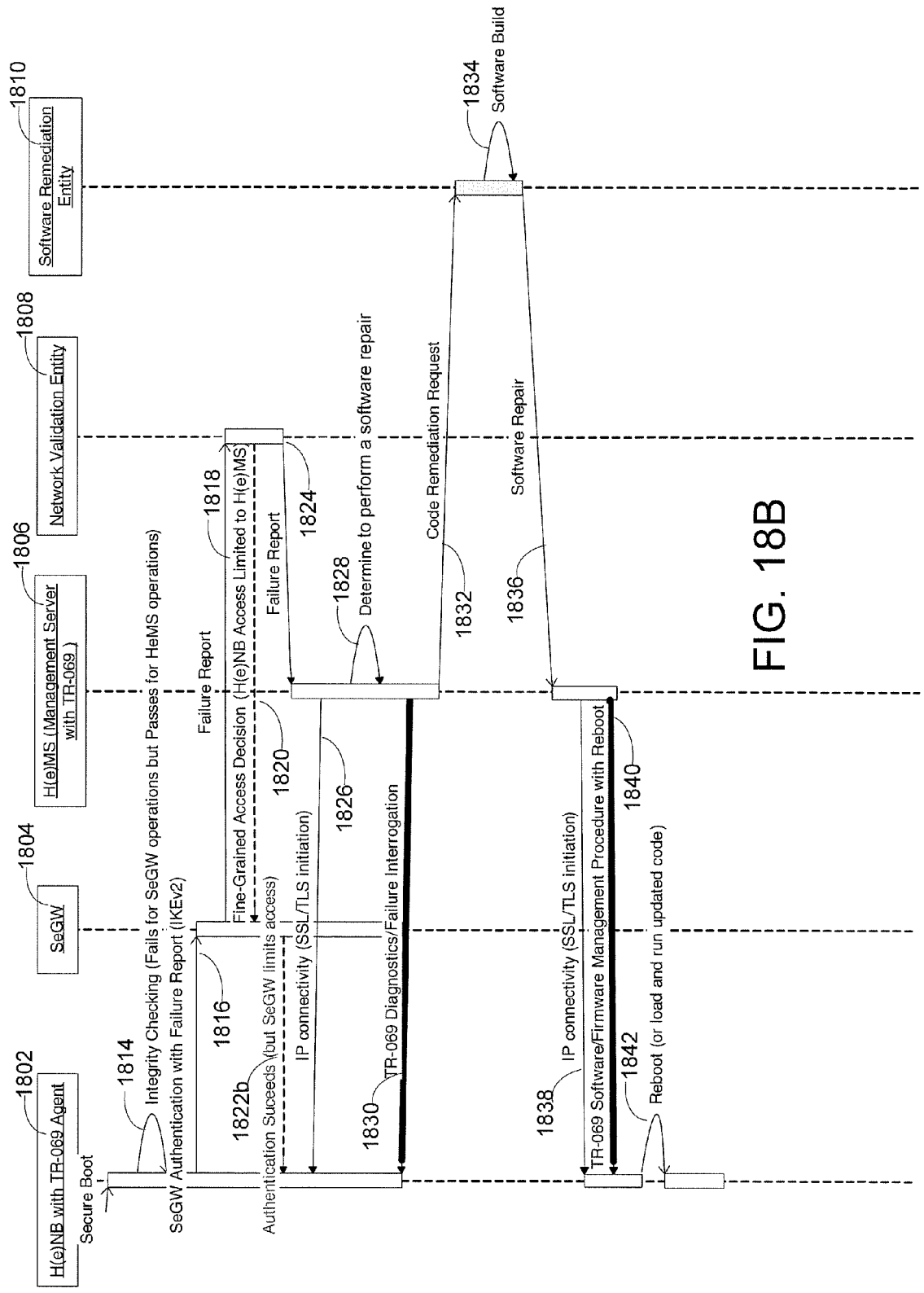
FIG. 18B illustrates an exemplary call flow diagram relating to remote software distress/remediation, with immediate limited access and refined access control.

FIG. 18B illustrates an exemplary call flow diagram relating to remote software distress/remediation, with immediate limited access and refined access control. While the call flow is described using a H(e)NB, other network devices may be used. The call flow sequence of FIG. 18B may include many steps that are the same, or similar, to the call flow illustrated in FIG. 18A. However, as illustrated in FIG. 18B, authentication of the H(e)NB 1802 with the SeGW 1804 may succeed, but the SeGW 1804 may limit access to the H(e)NB 1802. For example, during the integrity checking phase at 1814, the H(e)NB 1802 may find a failure in the code used for operation, and therefore, the H(e)NB's 1802 TrE may not make available the private key for SeGW 1804 authentication. However, the TrE may recognize that the H(e)NB 1802 may be able to connect to the H(e)MS 1806 securely and so makes available the private key(s) for H(e)MS 1806 authentication for procedures of which the H(e)NB 1802 is capable. At 1816, the H(e)NB 1802 may attempt to authenticate to the SeGW 1804 (e.g., using the IKEv2 protocol). The H(e)NB 1802 may provide TrE-signed information about the integrity of the H(e)NB 1802 during the authentication attempt. At 1818, the SeGW 1804 may forward the integrity information to the network validation entity 1808. The network validation entity 1808 may make a decision for authentication with H(e)NB 1802 access based on the received information and may send this to the SeGW 1804. The SeGW 1804, based on information from the network validation entity 1808, may authenticate the H(e)NB 1802 but may limit the H(e)NB 1802 access. At 1822*b*, SeGW 1804 may send an indication to H(e)NB 1802 that authentication succeeded, but the SeGW 1804 has limited access. The rest of the steps illustrated in the protocol flow of FIG. 18B may be the same, or similar, to the steps illustrated in the protocol flow of FIG. 18A.

Figure 19:
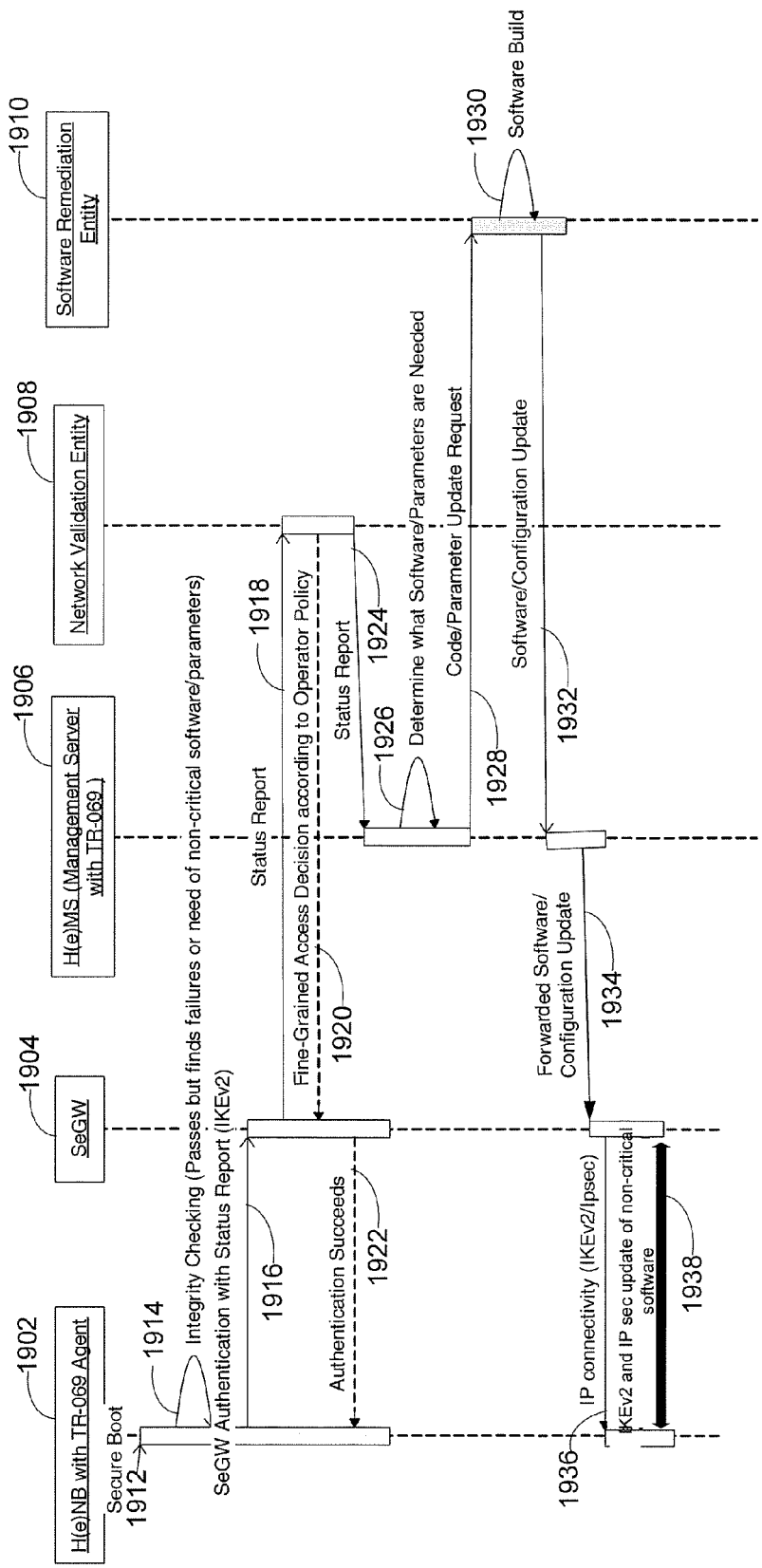
FIG. 19 illustrates an exemplary call flow diagram relating wireless communication device software component remediation with SeGW access.

FIG. 19 illustrates an exemplary call flow diagram relating to H(e)NB software component remediation with SeGW access. The call flow sequence may include one or more of the steps described herein. Additionally, while the call flow is described using a H(e)NB, other network devices may be used. As illustrated in FIG. 19, the H(e)NB 1902 may perform a secure boot sequence at 1912. During the integrity checking phase at 1914, the H(e)NB 1902 may not find a failure in the device code but may find a failure, missing component, or lack of configuration in the map. The H(e)NB's 1902 TrE may make available the private key for SeGW 1904 authentication. For example, the H(e)NB 1902 may send a status report (e.g., using IKE) at 1916 that includes the private key to the SeGW 1904. The SeGW 1904 may forward the integrity information at 1918 to the network validation entity 1908. The network validation entity 1908 may make a decision for authentication with H(e)NB 1902 access based on the received information, and may send this to the SeGW 1904. For example, the network validation entity 1908 may send a fine-grained access decision according to an operator policy to SeGW 1904 at 1920. The SeGW 1904, based on the network validation information, may authenticate the H(e)NB 1902 and/or set access permissions according to the operator policy. At 1922, the SeGW 1904 may send an indication of successful authentication to the H(e)NB 1902. The network validation entity 1908 may send the H(e)NB integrity information to the H(e)MS 1906 at 1924. For example, the integrity information may be sent for reconfiguration purposes. The H(e)MS 1906 may determine, at 1926, remediation information (e.g., software/parameters) that may be used for remediating the failures and may send a remediation request (e.g., for a reload or an update) to a software remediation entity 1910 at 1928. The software remediation entity 1910 may perform a software build at 1930 to build a replacement software component (e.g., or portion thereof) for H(e)NB 1802. At 1932, the software remediation entity 1910 may provide the remediation information (e.g., a remediation image or a software/configuration update) to the H(e)MS 1906. The H(e)MS 1906 may forward the remediation information to the SeGW 1904 at 1934. The SeGW 1904 and H(e)NB 1902 may authenticate and establish a secure IP connection (e.g., using IKEv2 or IPsec) at 1936. At 1938, the SeGW 1904 may download the remediation information (e.g., a remediation image or software/firmware update) to the H(e)NB 1902. For example, the SeGW 1904 may send an update (e.g., IKE and/or IPsec update) of the failed non-critical software/parameters.

A device may have both legacy and advanced capabilities. Network services for legacy capabilities may be generally available. Network services for advanced capabilities may be sparse and/or not fully supported. To ease deployment issues, an operator may leverage the legacy capabilities to ease into the advanced capabilities. Such leverage may be used as described herein. For example, a device may attach to a network as a legacy device at a location. The network may authenticate the device and recognize in its subscription that the device may have advanced capabilities and/or the ability to securely support advanced capabilities. If the network for the location supports the advanced capabilities, a network management entity may provide the device's access point with fine-grained access to an update server. The device may access the update server through the legacy access point. In some implementations, the device's subscription may limit access to the advance feature and not the legacy service, so, the access point may restrict the device's access to the update server and not to the legacy network generally. The update server and device may mutually authenticate. The update server may validate (e.g., implicitly through authentication or explicitly) the device's advanced capabilities and/or supply the device with access credentials, configuration information, access point addresses, and/or code, to allow the device to re-connect directly as a new type of device. The device may have the capability to generate shared or asymmetric key pairs for network access authentication. The network may update the device subscription data base with the new device credential. The device may have the capability to incorporate the access credentials for the advanced network location into a protected region. Online certification generation may allow for future pre-validated connections to the advanced network. The network may inform the access points to the advanced network (those supporting the advanced capabilities) that a device of certain credentials may attach to the advanced network. The device may access the advanced network using the updated credentials. The advanced network entity may authenticate the device as an advanced device.

There may be at least two stages of procedures for management authentication. One may be for configuration and the other for remediation. In the case of configuration, the network management entity may authenticate the relay node's capability as a device to confidently install an operator certificate for subsequent authentication procedures with the operator's core network. The relay may provide implicit proof to the network entity through the means of autonomous validation of the platform using platform authentication. The management entity may know by authenticating the device and/or validating the RN manufacturer certificate that the RN's integrity is not compromised (because autonomous validation may release the private authentication key when the internal verification of the integrity of the device is successful for example).

In the case of remediation, the RN may perform remote repair procedures with the management entity because some non-critical failure has caused the full device integrity check to fail. In this case, if the management capabilities of the RN are intact, then the RN may send a management capability certificate to the management entity for authentication purposes and not the full device integrity certificate. The network management entity may authenticate the device and verify the certificate. Upon success, the network management entity may perform remote procedures to bootstrap the capabilities of the relay.

The latter procedure may be used to boot strap the capabilities of the RN in the case of initial limited scope. In this case, the first certificate may represent the ability to perform basic operations with the management entity. The second certificate may represent the ability to perform broader operations with the management entity. In this case, a relay may not detect an integrity failure with the scope of the increased functionality. The scope of the integrity checking may be increased by also provisioning additional updated policies to accommodate the enhanced functionalities. In this way, the capabilities of the device may grow along with the extent of the integrity checking.

This technique may be applied generally to Security Gateway authentication. Certificates that represent the limited scope of the device may be used in the case of gateway authentication to a core network so that the network may determine during authentication the privileges of the authentication. The gateway (e.g., a SeGW in HeNB authentication, or a DeNB for RN authentication) may authenticate the device and verify the certificate. Based on the information on the certificate and the successful authentication of a particular device identity, the gateway may restrict access to the network management entity for remediation or enrollment purposes. Once a relay has been successfully configured, updated, and/or remediated, authentication keys may be made available for authentication based enhancements.

Figure 20:
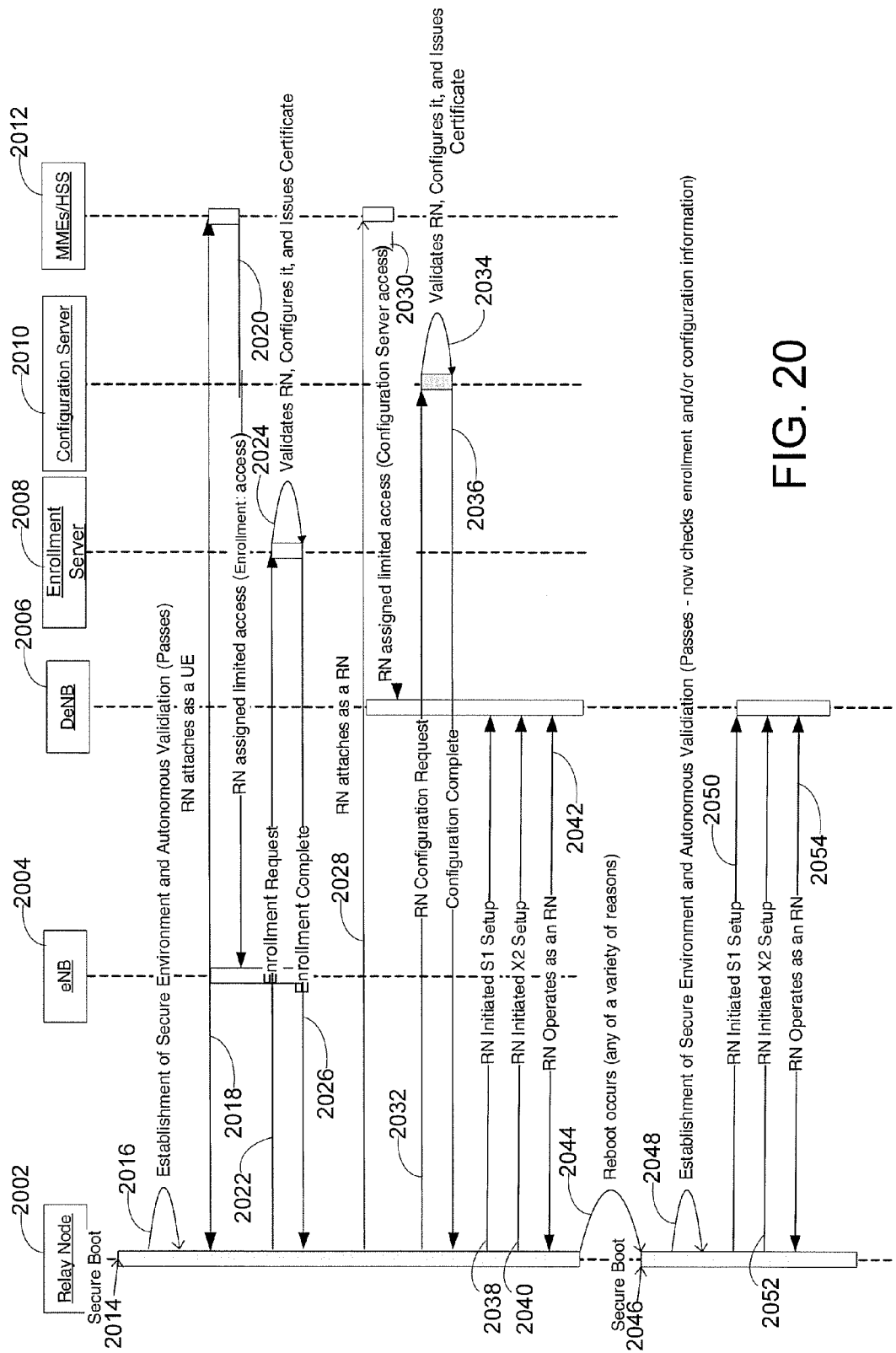
FIG. 20 illustrates an exemplary call flow diagram relating to relay node bootstrapping of capabilities.

FIG. 20 illustrates an exemplary call flow diagram relating to relay node bootstrapping of capabilities. The call flow sequence may include one or more of the steps described herein. For example, as illustrated in FIG. 20, the Relay Node (RN) 2002 may perform a secure boot sequence at 2014. At 2016, RN 2002 may establish a secure environment and/or perform autonomous validation. During autonomous validation, the RN 2002 may not find a failure. At 2018, the RN 2002 may attach to the network, such as at MMEs/HSS 2012 for example, as a UE through eNB 2004. The MME 2012 may assign the RN 2002 limited access to an enrollment server 2008 at 2020. As illustrated in FIG. 20, the limited access may be assigned through the eNB 2004. The RN 2002 and the enrollment server 2008 may mutually authenticate. At 2022, the RN 2002 may send an enrollment request to the enrollment server 2008. At 2024, the enrollment server may validate, configure, and/or issue a certificate to the RN 2002. The enrollment server 2008 may validate the RN 2002 either implicitly through the RN 2002 secure environment's release of the use of the RN's 2002 private enrollment server authentication key or the enrollment server 2008 may validate the RN 2002 by interrogation of the RN reports. The enrollment server 2008 may configure the validated RN 2002 for DeNB 2006 attachment and may issue a certificate. The enrollment server 2008 may update an RN policy on the device to bypass the enrollment step on future reboots and to include the enrollment information in the autonomous validation process (e.g., add TRVs that cover the enrollment information). A new private key may be installed on the RN 2002 or activated at this stage. The RN 2002 may have key generation capability, in which case a key pair may be generated on the RN 2002. The RN 2002 may install the private key in its secure environment and may bind the release of this key to the enrollment configuration and lower level secure boot stages. At 2026, enrollment server 2008 may indicate to relay node 2002 that enrollment has completed. At 2028, the RN 2002 may attach to the network as an RN through DeNB 2006. The MME 2012 may assign the RN 2002 limited access, through the DeNB 2006, to a configuration server 2010 at 2030. At 2032, the RN 2002 may send an RN configuration request to the configuration server 2010. Configuration server 2010 may validate, configure, and/or issue a certificate to RN 2002 at 2034. For example, the configuration server 2010 may configure the validated RN 2002 for operation and may issue the certificate. The configuration server 2010 may update an RN policy on the device to bypass the configuration step on future reboots and to include the configuration information in the autonomous validation process (e.g., add TRVs that cover the configuration information). A new private key for DeNB 2006 authentication may be installed or activated at this stage. The configuration server 2010 may indicate to RN 2002 at 2036 that the configuration is complete. At 2038, the RN 2002 may initiate the S1 setup with DeNB 2006. At 2040, the RN 2002 may initiate the X2 setup with the DeNB 2006. The RN 2002 may operate as a relay node at 2042.

At 2044, a reset may occur on the RN 2002. This reset may be initiated by, for example, the network, device, or power outage. At 2046, the RN 2002 may perform a secure boot sequence. During establishment of a secure environment and/or autonomous validation at 2048, the RN 2002 may not find a failure. As the enrollment server 2008 information and/or configuration server 2010 information may be included in the autonomous validation process at 2048, the RN 2002 may proceed to setup the S1 and X2 interfaces at 2050 and 2052, respectively, without need to engage with the servers. The RN 2002 may also operate as an RN at 2054. If a failure occurs on the enrollment server information or configuration server information, then a policy may or may not allow for the release of private authentication keys or execution for subsequent network processes until re-configuration occurs.

Figure 21:
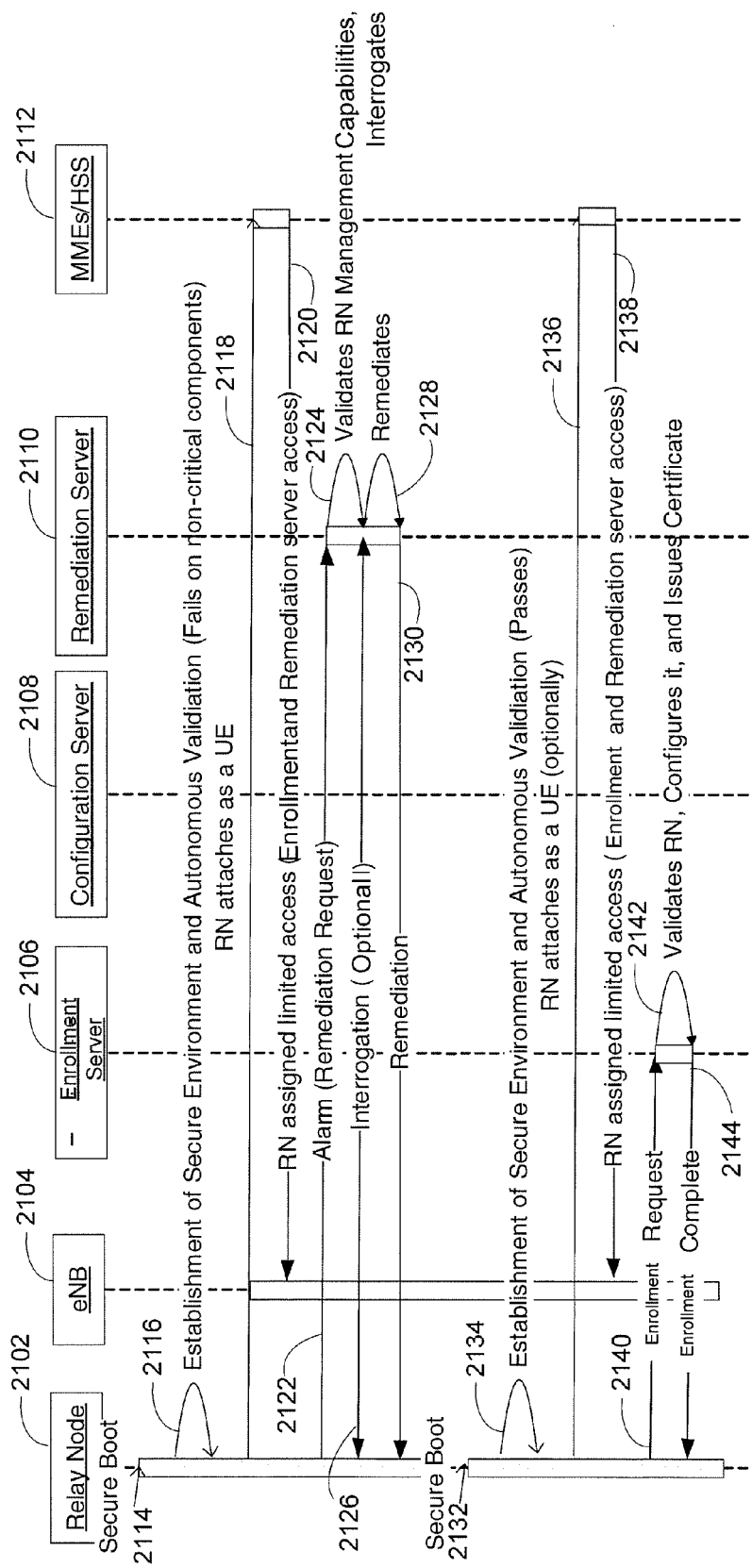
FIG. 21 illustrates an exemplary call flow diagram relating to relay node remediation with authenticated management capabilities.

FIG. 21 illustrates an exemplary call flow diagram relating to relay node remediation with authenticated management capabilities. The call flow sequence may include one or more of the steps described herein. For example, as illustrated in FIG. 21, the Relay Node (RN) 2102 may perform a secure boot sequence at 2114. At 2116, RN 2102 may establish a secure environment and/or perform autonomous validation. During the autonomous validation at 2116, the RN 2102 may find a failure to the non-critical components of the device. At 2118, the RN 2102 may attach to the network (e.g., MME/HSS 2112) as a UE through an eNB 2104. At 2120, the MME 2112 may assign the RN 2102 limited access to enrollment server 2106 and/or remediation server 2110. The MME 2112 may assign the limited access through the eNB 2104 for example. The RN 2102 and the remediation server 2110 may mutually authenticate. At, 2122, the RN 2102 may send an alarm (e.g., remediation request) to the remediation server 2110. The remediation server 2110 may validate the RN management capability at 2124, either implicitly through the RN 2102 secure environment's release of the use of the RN's 2102 private remediation server authentication key, and/or, the remediation server 2110 may validate the RN 2102 by interrogation of the RN 2102 integrity status report(s). At 2126, the RN 2102 and remediation server 2110 may (optionally) perform interrogation of the RN 2102. The remediation server 2110 may remediate (e.g., re-configure, repair, or reprogram) the RN 2102 at 2128 and send the remediation information to the RN 2102 at 2130 to fix the failure.

The remediation server 2110 may remotely command the RN 2102 to securely reboot at 2132, or, as the RN 2102 has already performed the first phase of the power up stage and the device integrity check now succeeds for platform authentication, rather than just management authentication for example, the RN 2102 may proceed directly to the next step in the RN 2102 power up sequence. For example, at 2134, RN 2102 may establish a secure environment and/or perform autonomous validation. At 2136, the RN 2102 may attach to the network (e.g., MME/HSS 2112) as a UE through eNB 2104. At 2138, the MME 2112 may assign the RN 2102 limited access to enrollment server 2106 and/or remediation server 2110. The RN 2102 may make an enrollment request at 2140 to the enrollment server 2106. At 2142, the enrollment server 2106 may validate, configure, and/or issue a certificate to the RN 2102. The enrollment server 2106 may indicate at 2144 to RN 2102 that enrollment is complete.

The procedures, systems, and instrumentalities described herein for integrity checking, reporting, and remediation may not be limited to software failures, TR-069, software remediation, H(e)NBs, etc., as described herein. Further, described actions are meant to be exemplary. It is to be understood that other actions may be used, omitted if not used, and/or actions may be added.

In some implementations, the failure may not be to software but to configuration data or some other measurable component on the device. In such an implementation, the management entity may not receive an update from the software remediation entity, but rather a network device configuration database for example. Not all failure scenarios may use interrogative procedures. In these cases, information sent as an alarm or report from the device initially may be enough to determine the cause of the failure, or at least enough to determine that some action may be performed whereby the management entity may initiate a remediation procedure without interrogation. For example, the management entity may recognize the failed component measurement from previous failures of similar devices and therefore immediately submit the update to the device. The trade-off in time and traffic load between interrogation and update, perhaps due to a small component, may trigger a full component update.

In the following example, a device architecture and a remediation update procedure described. This exemplary device architecture and remediation update procedure may be used with small-footprint devices with limited complexity and resources. Constraints associated with the present example may be described herein. For example, Application Codebase and Trusted Codebase of the device may be separate with regard to their development and/or deployment lifecycles, as well as their operation. These two code bases may be developed and/or deployed by separate parties. The application code base of the device which may provide productivity functions of the device, may be deployed as a single code and data block into a part of non-volatile memory of the device. The application code base may be minimally involved in remediation and/or may not be involved in integrity validation. Service cycles (e.g., the up-time between updates of parts of the device's code base, which may be used by the application of the device) may be long. That may mean for example that a re-boot for remediation may not be forced, indiscriminately at any time. Normal operation of the device may not be interrupted for remediation or device update procedures. Communication for Integrity Validation and Remediation may occur at an early stage of the device start-up, during which severe restrictions on device-internal resource usage and communication bandwidth may apply. There may be no complex system start-up in the sense of a typical boot cycle in which components (e.g., programs and data) may be loaded and then started one by one, separately.

An exemplary system model may be described as a version of the general split of a system into TrE and normal components, taking into account the above limitations. The functional elements of the system architecture may include one or more of the following:

An RoT (Root of Trust), which may be the immutable element on which device integrity validation relies in the chain of trust;

An SEE (Secure Execution Environment), which may be a special execution environment with hardware and/or software protection of executable code and data, isolated from the rest of a system. A possible realization may be a secure execution mode of a processor or a separate kernel in a processor. Restrictions on the SEE may include restrictions on run-time memory and available (exclusive to the SEE) non-volatile storage (NVS);

A Comm IF (Communications Interface) component, which may expose basic communication capabilities to the SEE and/or the NEE; and/or An NEE (Normal Execution Environment), which may be the execution environment of the application code, e.g., the code not belonging to the TrE, in the device. The NEE may have certain interfaces to capabilities of the SEE, for example to Comm IF to re-use this communication capability.

The functional elements may be used by several code bases comprising the capabilities and components of the device. Separation may be into TrECB (TrE Code Base) and DACB (Device Application Code Base). TrECB may be allocated to SEE and DACB may be allocated to NEE. If DACB components are to access capabilities of the TrE, such access may be performed via the mentioned interfaces between NEE and SEE. There may be no execution control at run-time, e.g., after secure start-up, from SEE on NEE, or vice versa. TrECB and DACB may be stored in separate parts of NVS.

Figure 22:
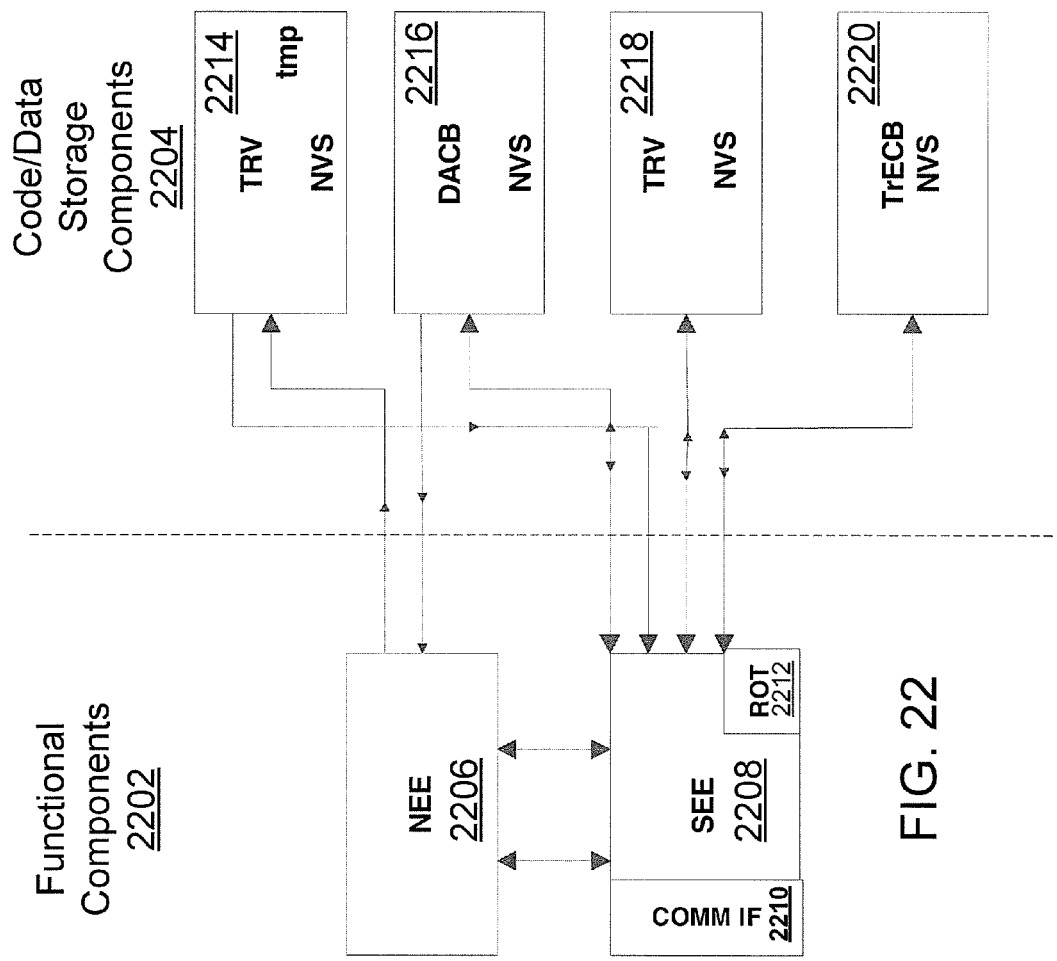
FIG. 22 illustrates exemplary system of functional components and code/data storage components.

FIG. 22 illustrates exemplary system of functional components 2202 (left hand side) and code/data storage components 2204 (right hand side). The functional components 2202 may include NEE 2206 and SEE 2208. SEE 2208 may include communication interface 2210 and/or ROT 2212. The code/data storage components 2204 may include NVS components. NVS component TRV_tmp 2214 may include TRVs associated with NEE 2206. NVS component DACB 2216 may include a DACB. NVS component TRV NVS 2218 may include TRVs associated with SEE 2208. NVS component TrECB NVS 2220 may include a TrECB. Different security measures may apply to the NVS compartments, separately. Arrows may indicate read/write access between the entities shown in FIG. 22. TrECB NVS 2220 may provide various capabilities such as an integrity validation capability (IVC), a device generic communication capability (DGC), a fall back/distress capability (FB/DC), and a remediation capability (RC). These capabilities are discussed herein with respect to FIG. 22 and FIG. 23.

As illustrated in FIG. 22, NEE 2206 may be in communication with (e.g., read from and/or write to) an SEE 2208. The SEE 2208 may communicate using communication interface 2210. The SEE 2208 may use the ROT 2212 for integrity validation performed with code/data storage components. NEE 2206 may write to NVS component 2214 and read from NVS component 2216. SEE 2208 may read from NVS component 2214. SEE 2208 may also read from and write to NVS components 2216, 2218, and 2220.

Figure 23:
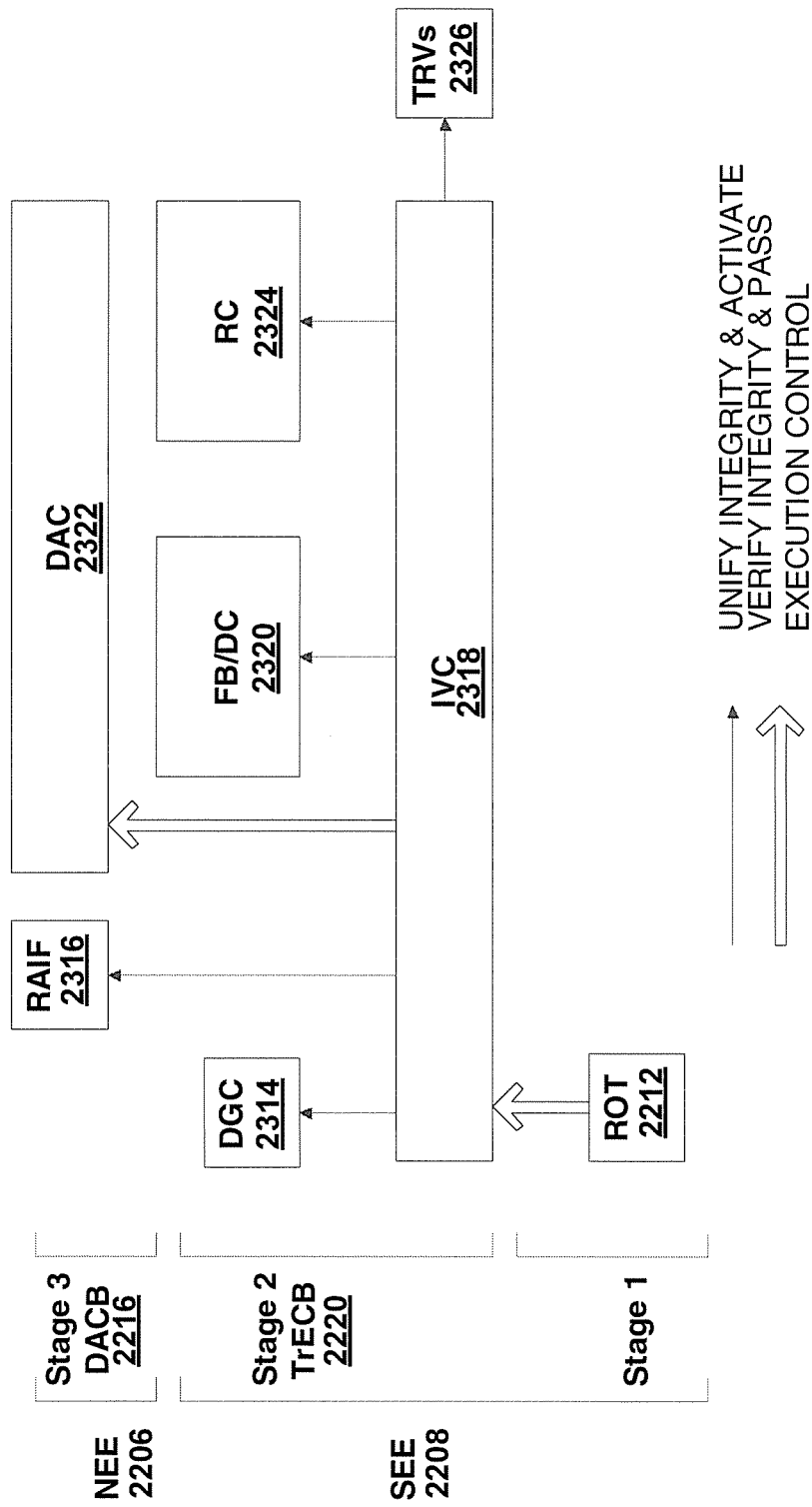
FIG. 23 illustrates an example embodiment of stages of a boot sequence and the interaction between various entities implemented in each stage.

FIG. 23 illustrates an example embodiment of stages of a boot sequence and the interaction between various entities implemented in each stage. As illustrated in FIG. 23, the NEE 2206 and SEE 2208 may be implemented in the boot sequence. SEE 2208 may be used for the first and second stages of a boot sequence. The first stage may incorporate RoT 2212. The second stage may incorporate a TrECB NVS 2220 that may include an integrity validation capability (IVC) 2318, a device generic communication capability (DGC) 2314, a fall back/distress capability (FB/DC) 2320, a remediation capability (RC) 2324, and/or TRVs 2326. IVC 2318 may be tasked with taking measurements of components and comparing them to reference values contained in TRVs, such as TRVs 2326 for example. DGC 2314 may provide basic communication functions to the SEE 2208 (which in turn may be exposed to the NEE 2206). DGC 2314 may be used for remediation and/or distress indication by FB/DC 2320 and RC 2324. DGC 2314 may also be exposed via an interface to DAC 2322. FB/DC 2320 may be activated if certain conditions are met to perform pertinent functionality, i.e., replacement of the DACB 2216 by a fall back code base, respectively, indicating a distress conditions to the network or device user. RC 2324 may be the authority tasked with planned changes and/or corrections of code bases. The RC 2324 may also be the manager of TRVs 2326, and the RC 2324 may be able to check the authenticity of TRVs 2326.

NEE 2206 may be used for the third stage of the boot sequence. The third stage may incorporate a DACB 2216 that includes remediation application IF (RAIF) 2316 and/or device application capabilities (DAC) 2322. RAIF 2316 may be a pass-through interface for incoming new TRVs from the network. The RAIF 2316 may recognize TRVs in incoming communications, and store them in TRV temporary non-volatile storage. DAC 2322 may embody the application-specific functionalities of the device. If the DAC wants to use communication capabilities from the Comm IF, access to it may be mediated through a special NEE-SEE IF.

TRVs 2326 may be stored in two different places in the system. TRV_tmp 2214 may be a temporary storage for new TRVs received by the RAIF 2316, e.g., TRV_tmp 2214 may be writable from the NEE 2206. TRV_tmp may be readable from the SEE 2208, from where the RC 2324 may read new TRVs and put them into TRV NVS 2218 once they are authenticated.

The start-up sequence illustrated in FIG. 23 may relate to a normal start-up with integrity checking in a simplified system architecture, e.g., a start-up in which no failure conditions arise that may necessitate distress/fall back or remediation actions. In the first stage of the secure start-up, the RoT 2212 may be activated. Differently from previous descriptions of the second stage of secure start-up, the RoT 2212 may not verify and activate a trusted boot loader that may then perform further integrity checks on loaded and started components. Such a loader/execution controller may not be available in the simplified system architecture. Instead, the RoT 2212 may check the IVC 2318 code and data block in the TrECB NVS 2220. In this construction, IVC 2318 code may be immutable, since the RoT 2212 may not have the ability to read TRVs 2326. Therefore, it may check IVC 2318 against a fixed, built in (into RoT 2212) reference value.

In an embodiment, the RoT 2212 may check IVC 2318 code and data block using a fixed root certificate. For this, the IVC 2318 part of the TrECB NVS 2220 may be stored together with a signature over this latter IVC 2318 part of TrECB NVS 2220. The key with which the RoT 2212 may check the signature may be in the mentioned fixed root certificate. Changes of the IVC 2318 code may be implemented by downloading new IVC 2318 code together with a new signature over the new code using the same, fixed key, and storing the latter data in TrECb NVS 2220. IVC 2318 may be executed inside SEE 2208. IVC 2318 may check that TRV_tmp NVS 2214 is empty (which may be assumed for a normal start-up with integrity checking in a simplified system architecture). IVC 2318 may load a designated TRV for the code of DGC 2314 from TRV NVS 2218.

IVC 2318 may check the integrity of each loaded TRV of TRVs 2326 by verifying a signature over the TRV reference value and any additional data. This signature may be in the TRV and the key with which IVC 2318 may check the signature is in the IVC 2318 code/data block. IVC 2318 may then measure DGC 2314 code, loaded from TrECB NVS 2220 into SEE 2208 and compare the measurement to the reference value in the latter TRV. Upon success, DGC 2314 may be activated. Activation may mean that DGC 2314 is made available for execution, for example by setting a flag 'executable' on the run-time memory portion of the SEE 2304 in which DGC 2314 resides, assuming that the SEE 2208 processor, and the NEE 2206 processor, wherever NEE 2206 code is checked, respect this flag.

IVC 2318 may load a designated TRV for the code of RAIF 2316 from TRV NVS 2218. IVC 2318 and measure RAIF 2316 code, loaded from DACB NVS 2216 into NEE 2206, and compare the measurement to the reference value contained in the latter TRV. Upon success, RAIF 2316 may be activated.

IVC 2318 may load each TRV associated with parts of the DACB 2216 in a pre-determined sequence. IVC 2318 may measure the parts of the DAC 2322 code and data designated by the loaded TRV, loaded from DACB NVS 2216 into NEE 2306 and compare the measurement to the reference value contained in the latter TRV.

When the checks in DACB 2216 are performed (e.g., by exhausting the sequence of available TRVs for DACB 2216 code and data), IVC 2318 may activate DAC 2322 and pass execution to the NEE 2206 processor (or starts it, when it is possible that SEE 2208 and NEE 2206 processor run concurrently). FB/DC 2320 and RC 2324 code and data blocks may neither be checked nor activated, if no special condition (e.g., an integrity check failure) occurs in the start-up procedure.

A difference to secure start-up in more complex systems, such as secure boot, may include that IVC 2318 may be driven by the TRV data. That is, the TRV may have information on which pieces of code and data of the various code bases to check. TRVs 2326 may be read sequentially by the IVC 2318, which may evaluate them to find the pieces of code and data to which the TRV reference integrity value applies, and, read and/or measure this data and compare the collated measurement to the reference value.

Figure 24B:
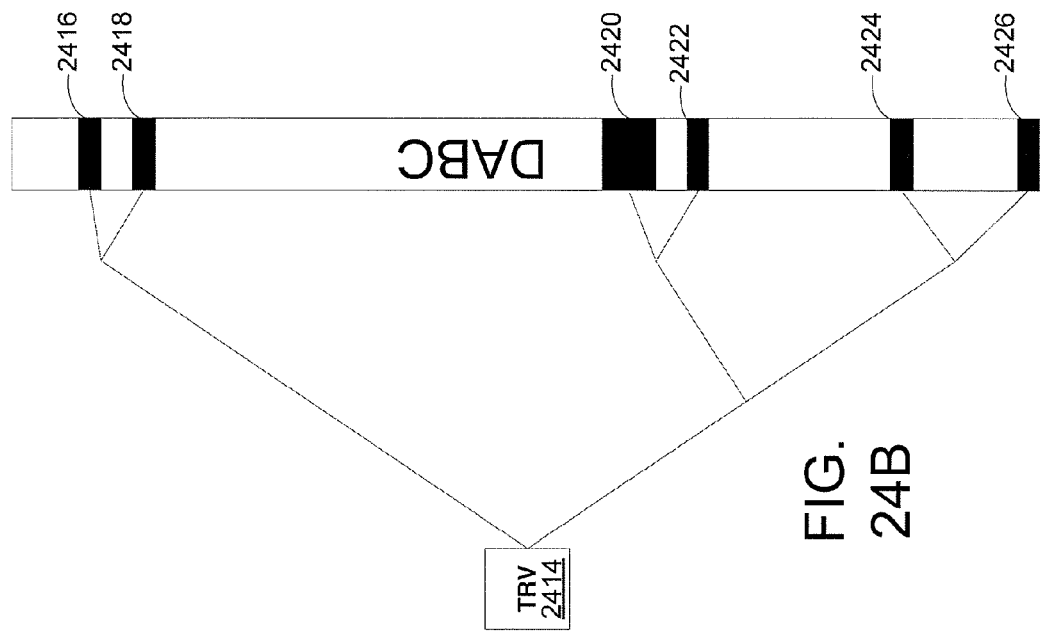
FIG. 24B is a diagram illustrating a combination of values using a Merkle hash tree to create a TRV.
Figure 24A:
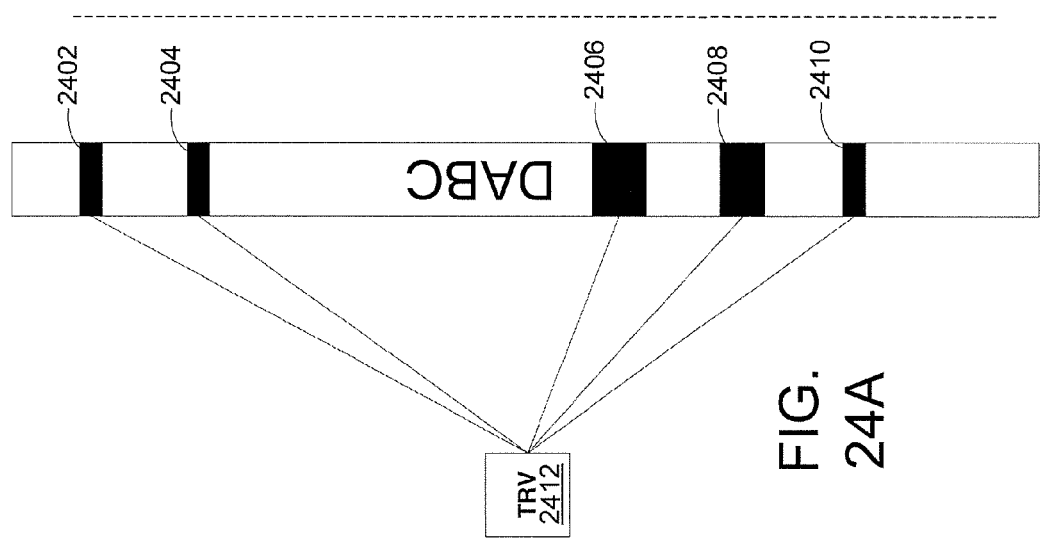
FIG. 24A is a diagram illustrating a sequence of measurements being combined linearly to create a TRV.

Since a single TRV reference value may correspond to multiple pieces of code and data in a code base, the TRV may comprise a mapping, e.g., indicators of the location and length of those pieces in the code base, and prescription on how to combine the measurements of the pieces to the compound measurement value. FIGS. 24A and 24B illustrate example implementations of mappings of a TRV to pieces of code and/or data in a code base.

FIG. 24A is a diagram showing a sequence of partial measurements which may be combined linearly to create a TRV. As illustrated in FIG. 24A, code measurements 2402, 2404, 2406, 2408, and 2410 of the DACB may be combined linearly to create TRV 2412. According to an example embodiment, the code measurements 2402, 2404, 2406, 2408, and 2410 may be combined by applying hash-chaining as realized with the TPM-Extend command of the Trusted Platform Module specified by TCG.

FIG. 24B is a diagram illustrating a combination of values using a Merkle hash tree to create a TRV. As illustrated in FIG. 24B, code measurements 2416, 2418, 2420, 2422, 2424, and 2426 of the DACB may be combined using a Merkle hash tree to create TRV 2414.

Interactive interrogation procedures between the device entities performing remediation and/or updates and the corresponding network entities (e.g., H(e)MS) may make use of the mapping of TRVs to code/data pieces described herein. Such procedures, as described herein, may be special instances of the general device interrogation procedures described herein.

Each piece of code may be measured and the measurement may be sent to the network entity one by one, where it may be compared to the corresponding piece reference value, e.g., in a sequential list of pieces reference values, from which the TRV reference value may have been previously calculated by some method, such as hash-chaining for example.

Efficiency may be increased in the case of a large number of pieces through detection via a Merkle hash tree. This may be performed in the form of an interactive interrogation procedure by descending the levels of the tree. Herein, the reference value contained in the TRV and the measurement value taken of the code/data may both represent the root of (graph-theoretically) identical, binary trees. If they do not match, the device may send the two child node values to the network entity, which may decide which one is faulty, e.g., do not match the same nodes in the reference tree which the network has used to build the TRV reference value (which may be the root of that reference tree). The network may send a message to the device which may state which branch(es) is (are) mismatches. This procedure may be iterated until the pieces of code, the measurement values of which constitute the leaves of the measurement tree, are determined, for which there is mismatch to reference (leaf) values.

Referring again to FIG. 23, functions and procedures may be performed based on the TrECB 2220 capabilities used for device remediation. In an embodiment, a planned code update may be performed by updating one or more TRVs 2326 during operation and performing the actual code updates at the time of the next start-up.

The following may relate to a planned code update. It may be assumed that the device has performed a start-up as described herein. The RAIF 2316 may receive, via Comm IF 2210 and/or DGC 2314 for example, a new TRV from an external party, e.g., the H(e)MS. RAIF 2316 may store this newly received TRV in TRV_tmp NVS 2214. At a later time, the device may restart. IVC 2318 may be integrity checked and started inside the SEE 2208 as described herein. IVC 2318 may check and find that TRV_tmp NVS 2214 is not empty and may proceed as described herein.

TRV_tmp 2214 may have a single new TRV. In a first implementation, the new TRV in TRV_tmp may refer to code and/or data in DACB 2216. In a second implementation, the new TRV in TRV_tmp may refer to code and/or data in TrECB 2220, e.g., DGC 2314, FB/DC 2320, or RC 2324 code/data.

In the first implementation, the IVC 2318 may verify the authenticity of the TRV as described above. Upon success, the IVC 2318 may store the new TRV in TRV NVS 2218. The IVC 2318 may delete one or more old TRVs in TRV NVS 2218 which may be considered to be replaced by the new TRV. How these deprecated TRVs are determined, may depend on the implementation. Unique identifiers may be assigned to TRVs, as part of the additional data in the TRV. The process described in this paragraph may be referred to as ingestion of a TRV for example.

The IVC 2318 may measure DGC 2314 code, loaded from TrECB 2220 NVS into SEE 2208, and compare the measurement to the reference value contained in the latter TRV. Upon success, DGC 2314 may be activated. The IVC 2318 may load and/or verify TRVs 2326 from TRV NVS, and may perform IV for the designated pieces of code and data for each of them, e.g., starting with RAIF 2316 and proceeding to other parts of DACB 2216. When a newly ingested TRV is encountered in the IV sequence, the IV performed on the designated parts of code and data of DACB 2216 may fail necessarily (e.g., assuming that the new TRV has a different reference value from the deprecated one(s)).

The IVC 2318 may load a designated TRV for the code of RC from TRV NVS 2218. The IVC 2318 may then measure DGC 2314 code, loaded from TrECB 2220 NVS into SEE 2208, and may compare the measurement to the reference value in the latter TRV. Upon success, RC may be activated.

By an interrogation procedure with the corresponding network entity, e.g., H(e)MS, RC 2324 may determine those pieces of code and/or data that may be in need of update, e.g., contribute to the failure of integrity measurement to reproduce the reference value of the newly ingested TRV. The interrogation procedure may be performed as described herein for example.

With the new TRV, the device may also have received the details of which parts of the code and/or data may be in need of replacement. This may avoid the interrogation procedure between RC 2324 and the network. The interrogation may be performed to minimize the amount of data for device management and/or remediation that is downloaded during the normal operation of the device. The interrogation may also be performed to allow for the possibility that a device 'misses' some intermediate updates of that (one, new) TRV and/or its designated pieces of code. If such subsequent updates are cumulative, they may tend to affect a larger number of code pieces, which may be found in the interrogation procedure (but may not be guaranteed to be in a list of pieces designated for update limited to the last TRV, after a sequence of updates of the same TRV, which may have been missed by the device).

The RC 2324 may download the determined pieces of code and/or data determined from the corresponding network entity. According one example, the network entity may compile a TR-069 signed data package and/or send it to the device. The received data may be checked for authenticity by the RC 2324 (or alternatively, the IVC 2318), for instance by verifying a package signature using a signature certificate in the newly ingested TRV, the root certificate used to check TRVs 2326 (e.g., by IVC 2318), or a dedicated certificate for remediation purposes (e.g., in RC 2324 code/data base).

After authentication of the downloaded pieces of code and/or data, the RC 2324 may write them to DACB 2216 NVS, to the previously determined pieces' locations. The DGC 2314 may hand back execution to the IVC 2318 which may recommence IV at the same TRV, e.g., the newly ingested TRV, in the TRV sequence.

The above-described procedure may become cyclic. This may occur for one of at least two reasons. First, an attacker may have inserted its own code in the update process, which may not conform to the TRV reference value. Additionally, there may be an inadvertent mismatch of TRV reference value and/or downloaded code, due to a malfunction of the network-side code build for example. In both implementations, the situation may be detected and signaled to the network. This may be achieved by IVC 2318 using repeat counters on TRV usage. For high security, those counters may be monotonic hardware counters which may be incremented by read accesses to TRV NVS. If too many repetitions (how many may depend on policy) of IV on a single TRV are detected, IVC 2318 may check and activate FB/DC 2320 and/or pass control to that capability to send an according signal to the network.

In relation to the second implementation described above (regarding the new TRV in TRV_tmp 2214 referring to code and/or data in TrECB 2220), the first implementation (regarding the new TRV in TRV_tmp 2214 referring to code and/or data in DACB 2216) may not be used since update/remediation may be requested for components themselves involved and active in update/remediation. In such a case one or more steps in the following procedure may be applied. IVC 2318 may ingest the new TRV, but may keep the corresponding old TRV in TRV NVS 2218. The new TRV may be marked with some data flag indicating that it is new, e.g., the string "NEW_DGC_TRV." The IVC 2318 may check and/or activate the RC 2324 using the old TRVs. The RC 2324 may perform an update of the TrECB 2220 parts that may be used in the same way as described in the first implementation, but in the second implementation updates may be written into TrECB 2220 NVS. IVC 2318 may check the updated parts of TrECB 2220 using the new TRVs. Upon success, the old TRV may be deleted from TRV NVS 2218 and the mark attached to the new TRV may be removed. This may be deferred until after the next re-start of the device for example.

The first failure condition of integrity checking may arise when RoT 2212 checks the IVC 2318 code. If this check fails, the RoT 2212 may halt the system, and, may additionally send a signal (e.g., optical signal) to the user.

According to an embodiment, the RoT 2212 may have the ability to check an immutable part of FB/DC 2320 (or a variable part, the integrity of which may be protected by a signature as described in the analogous variant for IC code) and/or invoke such limited parts of distress/fallback procedures, which may be available via this autonomously checked code, e.g., by loading it to and executing it in SEE 2208.

The next integrity checks that may fail may be those of DGC 2314 and/or RAIF 2316. The former may mean that the device has no trustworthy communication capabilities. In this case, IVC 2318 may try to verify and activate FB/DC 2320. FB/DC 2320 may be able to restore trustworthy communication to a certain extent and be able to send a distress signal to the network. If not, it may signal the user and halt the system. The same procedures may apply if IV of RC 2324 fails in the remediation procedure described above.

If, in the second implementation described above, IV of RAIF 2316 fails, this may means that the device may have lost the ability to receive TRV updates. The device may then first attempt to remedy the situation as described above. If this is unsuccessful, IVC 2318 may verify and/or activate FB/DC 2320, which in turn may take specific action, e.g., replace RAIF 2316 by some default code.

It may be seen from the foregoing descriptions that RAIF 2316, as the part of the code that is exposed in the NEE 2206 and part of the normal code base, may be the weakest link in device remediation. Although this may not pose direct threats to device integrity, since RAIF 2316 may not be involved in integrity checking, it may open inroads to indirect and denial-of-service attacks by disabling updates/remediation and therefore keeping the device in a deprecated (e.g., faulty) state. According to an embodiment, the functionality embodied by RAIF 2316 may be provided as part of the TrECB 2220 and executed in SEE 2208. This may pose advanced configurations on the system architecture, since it may mean that a part of the SEE 2208 is active and ready to receive new TRVs. Such persistent activity of the SEE may be realized in the Comm IF 2210 and DGC 2314, for example.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless device comprising a processor, a memory, and communication circuitry, the wireless device configured to connect to a communications network via the communication circuitry, the wireless device including computer-executable instructions stored in the memory of the wireless device which, when executed by the processor of the wireless device, perform operations comprising:
   performing a first integrity check on a component of the wireless device;
   determining that the component has failed the first integrity check;
   in response to determining that the component has failed the first integrity check, preventing a release of a key used for attachment to the communications network;
   determining a functionality that corresponds to the failed component; and
   sending, to a network entity, an indication of the functionality that corresponds to the failed component.

2. The wireless device claim 1, the operations further comprising:
   storing a component-to-functionality map; and
   determining the functionality that corresponds to the failed component based on the component-to-functionality map.

3. The wireless device of claim 1, the operations further comprising:
   performing a second integrity check on the failed component to isolate a portion of the failed component for remediation by a network entity.

4. The wireless device of claim 3, the operations further comprising:
   sending, to a network entity, an indication of the functionality that corresponds to the failed component, the indication comprising an alarm configured to trigger a remote update procedure with the network entity to replace the portion of the failed component.

5. The wireless device of claim 3, the operations further comprising:
receiving a request from the network entity to perform the second integrity check on the failed component to determine the portion of the failed component that caused the component to fail the first integrity check.

6. The wireless device of claim 3, the operations further comprising:
receiving a replacement component associated with the portion of the failed component; and
replacing the portion of the failed component with the replacement component.

7. The wireless device of claim 3, the operations further comprising:
performing one or more iterations of the second integrity check on the portion of the failed component to further isolate the portion of the failed component for remediation by the network entity.

8. The wireless device of claim 7, the operations further comprising:
sending, to a network entity, an indication of a functionality that corresponds to the portion of the failed component that caused the component to fail the first integrity check; and
receiving a request from the network entity to perform the one or more iterations of the second integrity check on the portion of the failed component.

9. The wireless device of claim 1, wherein determining that the component has failed the first integrity check further comprises:
determining an integrity measurement associated with the component;
comparing the integrity measurement with a trusted reference value associated with the component; and
determining that the integrity measurement does not match the trusted reference value.

10. In a system that comprises a wireless device and a network entity configured to communicate with each other directly or via a communications network, a method performed by the wireless device, the method comprising:
performing a first integrity check on a component of the wireless device;
determining that the component has failed the first integrity check; and
in response to determining that the component has failed the first integrity check, preventing a release of a key used for attachment to the communications network;
determining a functionality that corresponds to the failed component; and
sending, to the network entity, an indication of the functionality that corresponds to the failed component.

11. The method of claim 10, the method further comprising:
storing a component-to-functionality map; and
determining the functionality that corresponds to the failed component based on the component-to-functionality map.

12. The method of claim 10, the method further comprising:
performing a second integrity check on the failed component to isolate a portion of the failed component for remediation by a network entity.

13. The method of claim 12, the method further comprising:
sending, to the network entity, an indication of the functionality that corresponds to the failed component, the indication comprising an alarm configured to trigger a remote update procedure with the network entity to replace the portion of the failed component.

14. The method of claim 12, the method further comprising:
receiving a request from the network entity to perform the second integrity check on the failed component to determine the portion of the failed component that caused the component to fail the first integrity check.

15. The method of claim 12, the method further comprising:
receiving a replacement component associated with the portion of the failed component; and
replacing the portion of the failed component with the replacement component.

16. The method of claim 12, the method further comprising:
performing one or more iterations of the second integrity check on the portion of the failed component to further isolate the portion of the failed component for remediation by the network entity.

17. The method of claim 16, the method further comprising:
sending, to the network entity, an indication of a functionality that corresponds to the portion of the failed component that caused the component to fail the first integrity check; and
receiving a request from the network entity to perform the one or more iterations of the second integrity check on the portion of the failed component.

18. The method of claim 10, wherein determining that the component has failed the first integrity check further comprises:
determining an integrity measurement associated with the component;
comparing the integrity measurement with a trusted reference value associated with the component; and
determining that the integrity measurement does not match the trusted reference value.

19. A method comprising:
performing, in a wireless communication device, an integrity check on at least one component associated with the wireless communication device;
determining whether the at least one component has failed the integrity check;
when the at least one component is determined to have failed the integrity check, determining functionalities that correspond to the at least one failed component;
accessing a policy, at the wireless communication device, that maps the functionalities determined to correspond to the at least one failed component to at least one capability of the wireless communication device; and
enforcing a policy on the wireless communication device based on the determined at least one capability.

20. The method of claim 19, wherein the capability is a platform capability.

21. The method of claim 19, wherein a component-to-functionality map is used to determine the functionalities of a component.

22. The method of claim 21, wherein at least one functionality from the component-to-functionality map is used to determine the at least one capability.

23. The method of claim 22, wherein the capability corresponds to at least one policy to enforce.

24. The method of claim 19, wherein the policy enforces restrictions to access resources on the device.

25. The method of claim 19, wherein the policy changes the order in which components may be loaded by a loader of the device.

26. The method of claim 19, wherein the policy enforces control on execution of the at least one capability which is enabled by a loader of the device.

27. A wireless communication device comprising:
a processor adapted to execute computer-readable instructions;
a memory communicatively coupled to the processor, the memory having stored therein computer-readable instructions that, when executed by the processor, cause the processor to perform operations, the operations comprising:
performing, in a wireless communication device, an integrity check on at least one component associated with the wireless communication device;
determining whether the at least one component has failed the integrity check;
when the at least one component is determined to have failed the integrity check, determining functionalities that correspond to the at least one failed component;
accessing a policy, at the wireless communication device, that maps the functionalities determined to correspond to the at least one failed component to at least one capability of the wireless communication device; and
enforcing a policy on the wireless communication device based on the determined at least one capability.

28. The device of claim 27, wherein the capability is a platform capability.

29. The device of claim 27, wherein a component-to-functionality map is used to determine the functionalities of a component.

30. The device of claim 29, wherein at least one functionality from the component-to-functionality map is used to determine the at least one capability.

31. The device of claim 30, wherein the capability corresponds to at least one policy to enforce.

32. The device of claim 27, wherein the policy enforces restrictions to access resources on the device.

33. The device of claim 27, wherein the policy changes the order in which components may be loaded by a loader of the device.

34. The device of claim 27, wherein the policy enforces control on execution of the at least one capability which is enabled by a loader of the device.

* * * * *